(12) United States Patent
Yeo et al.

(10) Patent No.: US 12,284,651 B2
(45) Date of Patent: Apr. 22, 2025

(54) METHOD AND DEVICE FOR TRANSMITTING AND RECEIVING DATA BY TERMINAL IN COMMUNICATION SYSTEM

(71) Applicant: Samsung Electronics Co., Ltd., Gyeonggi-do (KR)

(72) Inventors: Jeongho Yeo, Gyeonggi-do (KR); Seho Myung, Gyeonggi-do (KR); Hyunseok Ryu, Gyeonggi-do (KR); Cheolkyu Shin, Gyeonggi-do (KR)

(73) Assignee: Samsung Electronics Co., Ltd (KR)

( * ) Notice: Subject to any disclaimer, the term of this patent is extended or adjusted under 35 U.S.C. 154(b) by 269 days.

(21) Appl. No.: 17/796,732

(22) PCT Filed: Feb. 10, 2021

(86) PCT No.: PCT/KR2021/001775
§ 371 (c)(1),
(2) Date: Aug. 1, 2022

(87) PCT Pub. No.: WO2021/162444
PCT Pub. Date: Aug. 19, 2021

(65) Prior Publication Data
US 2023/0089655 A1 Mar. 23, 2023

(30) Foreign Application Priority Data

| Feb. 14, 2020 | (KR) | 10-2020-0018627 |
| Feb. 27, 2020 | (KR) | 10-2020-0024417 |
| Apr. 10, 2020 | (KR) | 10-2020-0044319 |

(51) Int. Cl.
*H04W 4/00* (2018.01)
*H04W 72/20* (2023.01)

(52) U.S. Cl.
CPC ................... *H04W 72/20* (2023.01)

(58) Field of Classification Search
None
See application file for complete search history.

(56) References Cited

U.S. PATENT DOCUMENTS

| 2019/0182859 A1 | 6/2019 | Khoryaav et al. |
| 2020/0100230 A1 | 3/2020 | Lee et al. |
| | (Continued) | |

FOREIGN PATENT DOCUMENTS

| KR | 1020190123787 | 11/2019 |

OTHER PUBLICATIONS

Apple, "On NR V2X Physical Layer Structure", R1-1912810, 3GPP TSG RAN WG1 #99, Nov. 18-22, 2019, 15 pages.

(Continued)

*Primary Examiner* — Zewdu A Beyen
(74) *Attorney, Agent, or Firm* — The Farrell Law Firm, P.C.

(57) ABSTRACT

According to an embodiment of the disclosure, a method performed by a first user equipment (UE) for transmitting sidelink data within a physical sidelink shared channel (PSSCH) in a wireless communication system may be provided. The method performed by the first UE may include identifying a number of resource elements (REs) allocated for the PSSCH within a physical resource block (PRB) based on configuration information and the scheduling information for the sidelink data; identifying a total number of RES allocated for the PSSCH within a slot based on the number of REs allocated within the PRB and a number of PRBs allocated for the PSSCH; identifying a size of a transport block based on the total number of REs; and transmitting, to the second UE, the sidelink data based on the size of the transport block.

16 Claims, 39 Drawing Sheets

(56) References Cited

U.S. PATENT DOCUMENTS

2020/0404624 A1* 12/2020 Roth ................... H04L 5/0044
2021/0211219 A1* 7/2021 Sarkis .................. H04L 1/0041

OTHER PUBLICATIONS

3GPP, 3rd Generation Partnership Project; Technical Specification Group Radio Access Network; NR; Physical Layer Procedures for Data (Release 16), 3GPP TS 38.214 V16.0.0, Dec. 2019, 147 pages.
Intel Corporation, "Summary#1 for AI 7.2.4.2.2 Mode-2 Resource Allocation", R1-1913232, 3GPP TSG RAN WG1 Meeting #99, Nov. 18-22, 2019, 40 pages.
International Search Report dated May 14, 2021 issued in counterpart application No. PCT/KR2021/001775, 13 pages.

* cited by examiner

FIG. 10A

METHOD AND DEVICE FOR TRANSMITTING AND RECEIVING DATA BY TERMINAL IN COMMUNICATION SYSTEM

PRIORITY

This application is a National Phase Entry of PCT International Application No. PCT/KR2021/001775, which was filed on Feb. 10, 2021, and claims priority to Korean Patent Application Nos. 10-2020-0018627, 10-2020-0024417, and 10-2020-0044319, which were filed on Feb. 14, 2020, Feb. 27, 2020, and Apr. 10, 2020, respectively, the entire content of each of which is incorporated herein by reference.

TECHNICAL FIELD

The disclosure generally relates to a wireless communication system, and more particularly, to a data transmitting or receiving method and apparatus of user equipment (UE) in a wireless communication system.

BACKGROUND ART

To meet ever-increasing demand with respect to wireless data traffic since the commercialization of the 4th generation (4G) communication system, there have been efforts to develop an advanced 5th generation (5G) or pre-5G communication system. For this reason, the 5G or pre-5G communication system is also called a beyond 4th-generation (4G) network communication system or post long term evolution (LTE) system.

Implementation of the 5G communication system using ultrahigh frequency (millimeter wave (mmWave)) bands, e.g., 60 giga hertz (GHz) bands, is being considered to attain higher data transfer rates. To reduce propagation loss of radio waves and increase a transmission range in the ultra-high frequency bands, beamforming, massive multiple-input multiple-output (MIMO), full dimensional MIMO (FD-MIMO), array antenna, analog beamforming, and large-scale antenna techniques are under discussion.

To improve system networks, technologies for advanced small cells, cloud radio access networks (RANs), ultra-dense networks, device to device (D2D) communication, wireless backhaul, moving networks, cooperative communication, coordinated multi-points (COMP), reception-end interference cancellation and the like are also being developed in the 5G communication system.

In addition, in the 5G system, an advanced coding modulation (ACM) method, e.g., hybrid FSK and QAM modulation (FQAM), sliding window superposition coding (SWSC), and advanced access technology, e.g., filter bank multi carrier (FBMC), non-orthogonal multiple access (NOMA), and sparse code multiple access (SCMA) are being developed.

With the advancement of the wireless communication system such as the 5G system, various services are expected to be provided. Accordingly, a method of determining a transport block size (TBS) and a scheme for seamlessly providing associated services are required for sidelink communication.

DESCRIPTION OF EMBODIMENTS

Solution to Problem

The disclosure provides a method and apparatus for transmitting or receiving control information and data in a wireless communication system.

In a wireless communication system according to an embodiment of the disclosure, a method performed by a first user equipment (UE) for transmitting sidelink data via a physical sidelink shared channel (PSSCH) may be provided. The method performed by the first UE may include transmitting, to a second UE, sidelink control information (SCI) including scheduling information for the sidelink data via a physical sidelink control channel (PSCCH); identifying a number of resource elements (REs) allocated for the PSSCH within a physical resource block (PRB) based on configuration information and the scheduling information for the sidelink data; identifying a total number of REs allocated for the PSSCH within a slot based on the number of REs allocated within the PRB and a number of PRBs allocated for the PSSCH; identifying a size of a transport block based on the total number of REs; and transmitting, to the second UE, the sidelink data based on the size of the transport block.

BRIEF DESCRIPTION OF DRAWINGS

FIG. 10A illustrates positions of symbols available for transmission of an SSB based on subcarrier spacing in a wireless communication system, according to various embodiments of the disclosure.

BEST MODE

Figure 1:
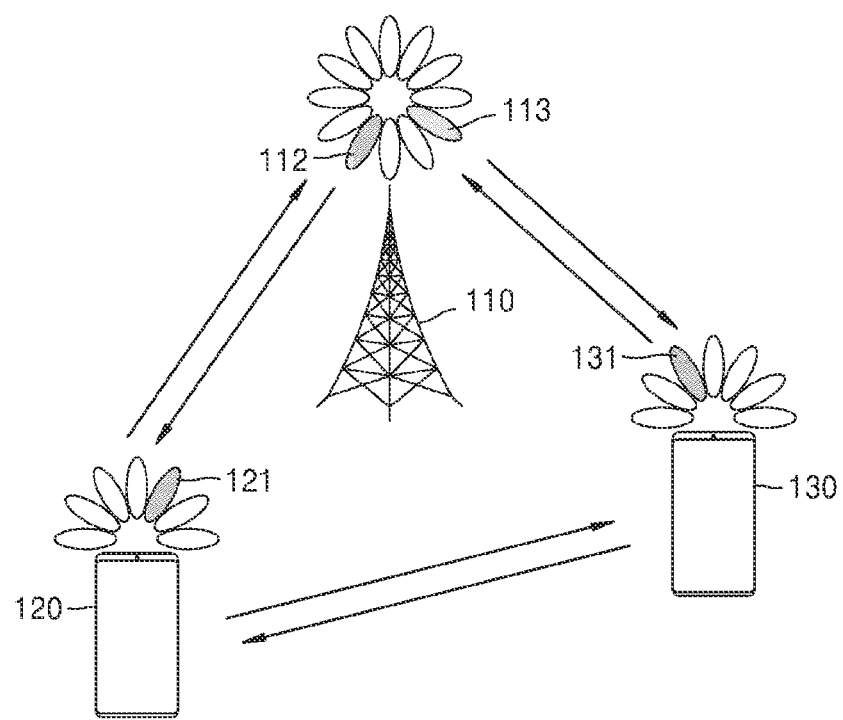
FIG. 1 illustrates a wireless communication system, according to various embodiments of the disclosure.

According to an embodiment of the disclosure, a method performed by a first user equipment (UE) for transmitting sidelink data via a physical sidelink shared channel (PSSCH) in a wireless communication system may be provided. The method performed by the first UE may include transmitting, to a second UE, sidelink control information (SCI) including scheduling information for the sidelink data via a physical sidelink control channel (PSCCH); identifying a number of resource elements (REs) allocated for the PSSCH within a physical resource block (PRB) based on configuration information and the scheduling information for the sidelink data; identifying a total number of REs allocated for the PSSCH within a slot based on the number of REs allocated within the PRB and a number of PRBs allocated for the PSSCH; identifying a size of a transport block based on the total number of REs; and transmitting, to the second UE, the sidelink data based on the size of the transport block.

In an embodiment of the disclosure, the number of REs allocated for the PSSCH within the PRB may be identified based on a number of sidelink symbols for transmitting the PSSCH within the slot.

In an embodiment of the disclosure, the number of sidelink symbols may correspond to a number of symbols except a first symbol and a last symbol among all symbols within the slot.

In an embodiment of the disclosure, the identifying of the number of REs allocated for the PSSCH within the PRB based on the configuration information and scheduling information for the sidelink data may include Determining whether the slot includes an RE corresponding to a resource configured to transmit or receive a physical sidelink feedback channel (PSFCH); and identifying a number of REs allocated for the PSSCH within the PRB based on the RE corresponding to the resource configured to transmit or receive the PSFCH.

In a wireless communication system according to an embodiment of the disclosure, a method performed by a second user equipment (UE) for receiving sidelink data via a physical sidelink shared channel (PSSCH) may be provided. The method performed by the second UE may include receiving, from a first UE, sidelink control information (SCI) including scheduling information for the sidelink data via a physical sidelink control channel (PSCCH); identifying a number of resource elements (REs) allocated for the PSSCH within a physical resource block (PRB) based on configuration information and the scheduling information for the sidelink data; identifying a total number of REs allocated for the PSSCH within a slot based on the number of REs allocated within the PRB and a number of PRBs allocated for the PSSCH; identifying a size of a transport block based on the total number of REs; and receiving, from the first UE, the sidelink data based on the size of the transport block.

In an embodiment of the disclosure, the number of REs allocated for the PSSCH within the PRB may be identified based on a number of sidelink symbols for receiving the PSSCH within the slot.

In an embodiment of the disclosure, the number of sidelink symbols may correspond to a number of symbols except a first symbol and a last symbol among all symbols within the slot.

In an embodiment of the disclosure, the identifying of the number of REs allocated for the PSSCH within the PRB based on the configuration information and scheduling information for the sidelink data may include determining whether the slot includes an RE corresponding to a resource configured to transmit or receive a physical sidelink feedback channel (PSFCH); and identifying a number of REs allocated for the PSSCH within the PRB based on the RE corresponding to the resource configured to transmit or receive the PSFCH.

In a wireless communication system according to an embodiment of the disclosure, a first user equipment (UE) for transmitting sidelink data via a physical sidelink shared channel (PSSCH) may be provided. The first UE may include a transceiver; and at least one processor operating in combination with the transceiver, wherein the at least one processor may be configured to control the transceiver to transmit, to a second UE, sidelink control information (SCI) including scheduling information for the sidelink data via a physical sidelink control channel (PSCCH), identify a number of resource elements (REs) allocated for the PSSCH within a physical resource block (PRB) based on configuration information and the scheduling information for the sidelink data, identify a total number of REs allocated for the PSSCH within a slot based on the number of REs allocated within the PRB and a number of PRBs allocated for the PSSCH, identify a size of a transport block based on the total number of REs, and control the transceiver to transmit, to the second UE, the sidelink data based on the size of the transport block.

In an embodiment of the disclosure, the at least one processor may be configured to identify a number of REs allocated for the PSSCH within the PRB based on a number of sidelink symbols for transmitting the PSSCH within the slot.

In an embodiment of the disclosure, the number of sidelink symbols may correspond to a number of symbols except a first symbol and a last symbol among all symbols within the slot.

According to an embodiment of the disclosure, the at least one processor may be configured to determine whether the slot includes an RE corresponding to a resource configured to transmit or receive a physical sidelink feedback channel (PSFCH), and identify a number of REs allocated for the PSSCH within the PRB based on the RE corresponding to the resource configured to transmit or receive the PSFCH.

In a wireless communication system according to an embodiment of the disclosure, a second user equipment (UE) for receiving sidelink data via a physical sidelink shared channel (PSSCH) may be provided. The second UE may include a transceiver; and at least one processor operating in combination with the transceiver, wherein the at least one processor may be configured to control the transceiver to receive, from a first UE, sidelink control information (SCI) including scheduling information for the sidelink data via a physical sidelink control channel (PSCCH), identify a number of resource elements (REs) allocated for the PSSCH within a physical resource block (PRB) based on configuration information and the scheduling information for the sidelink data, identify a total number of REs allocated for the PSSCH within a slot based on the number of REs allocated within the PRB and a number of PRBs allocated for the PSSCH, identify a size of a transport block based on the total number of REs, and control the transceiver to receive, from the first UE, the sidelink data based on the size of the transport block.

In an embodiment of the disclosure, the at least one processor may be configured to identify a number of REs allocated for the PSSCH within the PRB based on a number of sidelink symbols for receiving the PSSCH within the slot.

According to an embodiment of the disclosure, the at least one processor may be configured to determine whether the slot includes an RE corresponding to a resource configured to transmit or receive a physical sidelink feedback channel (PSFCH), and identify a number of REs allocated for the PSSCH within the PRB based on the RE corresponding to the resource configured to transmit or receive the PSFCH.

Mode of Disclosure

Embodiments of the disclosure will be described in detail with reference to accompanying drawings. Technological content well-known in the art or not directly related to the disclosure is omitted in the following description. Through the omission of content that might otherwise obscure the subject matter of the disclosure, the subject matter will be understood more clearly.

For the same reason, some parts in the accompanying drawings are exaggerated, omitted or schematically illustrated. The size of the respective elements may not fully reflect their actual size. Like or corresponding reference numerals refer to like elements throughout the drawings.

Advantages and features of the disclosure, and methods for achieving them will be understood more clearly when the following embodiments are read with reference to the accompanying drawings. The embodiments of the disclosure may, however, be embodied in many different forms and should not be construed as limited to the embodiments set forth herein; rather, these embodiments of the disclosure are provided so that this disclosure will be thorough and complete, and will fully convey the scope of the embodiments of the disclosure to those of ordinary skill in the art. Throughout the specification, like reference numerals refer to like elements.

It will be understood that each blocks and combination of the blocks of a flowchart may be performed by computer program instructions. The computer program instructions may be loaded on a processor of a universal computer, a special-purpose computer, or other programmable data processing equipment, and thus they generate means for performing functions described in the block(s) of the flowcharts when executed by the processor of the computer or other programmable data processing equipment. The computer program instructions may also be stored in computer-executable or computer-readable memories oriented for computers or other programmable data processing equipment to function in a particular manner, so it is possible to manufacture a product that contains instruction stored in the computer-executable or computer-readable memories for performing functions described in the block(s) of the flowchart. The computer program instructions may also be loaded on computers or programmable data processing equipment, so it is possible for the instructions to generate a process executed by the computer or the other programmable data processing equipment to provide steps for performing functions described in the block(s) of the flowchart.

Furthermore, each block may represent a part of a module, segment, or code including one or more executable instructions to perform particular logic function(s). It is noted that the functions described in the blocks may occur out of order in some alternative embodiments. For example, two successive blocks may in fact be executed substantially concurrently or the blocks may sometimes be executed in the reverse order, depending upon the functionality involved.

The term "module" (or sometimes "unit") as used herein refers to a software or hardware component, such as field programmable gate array (FPGA) or application specific integrated circuit (ASIC), which performs some functions. However, the module is not limited to software or hardware. The module may be configured to be stored in an addressable storage medium, or to execute one or more processors. For example, the modules may include components, such as software components, object-oriented software components, class components and task components, processes, functions, attributes, procedures, subroutines, segments of program codes, drivers, firmware, microcodes, circuits, data, databases, data structures, tables, arrays, and variables. Functions served by components and modules may be combined into a smaller number of components and modules, or further divided into a larger number of components and modules. Moreover, the components and modules may be implemented to execute one or more central processing units (CPUs) in a device or security multimedia card. In embodiments, the module may include one or more processors.

Herein, the terms to refer to signals, the terms to refer to channels, the terms to refer to control information, the terms to refer to network entities, the terms to refer to components of a device, the terms to refer to access nodes, the terms to refer to messages, the terms to refer to interfaces among network entities, the terms to refer to various types of identification information, etc., are examples for convenience of explanation. Accordingly, the disclosure is not limited to the terms as herein used, and may use different terms to refer to the items having the same meaning in a technological sense.

In the disclosure, a physical channel and a signal may be interchangeably used with data or a control signal. For example, a physical downlink shared channel (PDSCH) is a term to refer to a physical channel on which to transmit data, but may also be used to refer to data. In other words, in this specification, an expression "transmit a physical channel" may be equally interpreted as an expression "transmit data or a signal via a physical channel".

Throughout the specification, higher layer signaling refers to a method of transferring a signal to a UE from a BS on a downlink data channel of a physical layer or to the BS from the UE on an uplink data channel of the physical layer. The higher layer signaling may be understood as radio resource control (RRC) signaling or a media access control (MAC) control element (CE).

In the disclosure, the expression like 'exceeding or greater (larger) than' or 'smaller (less) than' is used to determine whether a particular condition (or criterion) is satisfied or fulfilled, but the expression may not exclude meaning of 'equal to or greater (larger) than' or 'equal to or smaller (less) than'. A condition written with 'equal to or greater (larger) than' may be replaced with 'exceeding', a condition with 'equal to or smaller (less) than' may be replaced with 'smaller (less) than', and a condition with 'equal to or greater (larger) than ~ and smaller (less) than ~' may be replaced with 'exceeding ~ and equal to or smaller (less) than ~'.

For convenience of explanation, the terms and names defined by the 3rd generation partnership project long term evolution (3GPP LTE) or new radio (NR) standard or their derivatives will be used hereinafter. The disclosure is not, however, limited to the terms and definitions, and may be equally applied to any systems that conform to other standards. Especially, the disclosure may be applied to the 3GPP new radio (NR) (which is the 5G mobile communication standard). The disclosure may be applied to intelligent services based on the 5G communication and IoT related technologies, e.g., smart homes, smart buildings, smart cities, smart cars, connected cars, health care, digital education, smart retail, and security and safety services.

The disclosure relates to an apparatus and method for managing a soft buffer in a wireless communication system. Specifically, the disclosure describes a technology by which a receiver determines a soft buffer for storing received signals or modifications of the received signals when the signals transmitted after being channel-coded arrive at the receiver and a transmitting UE determines parity bits to be transmitted based on the determination of the soft buffer.

FIG. 1 illustrates a wireless communication system, according to various embodiments of the disclosure.

In FIG. 1, as certain nodes that use wireless channels in a wireless communication system, a base station (BS) 110, a user equipment (UE) 120, and a UE 130 are illustrated. Although there is one BS in FIG. 1, another BS, which is identical or similar to the BS 110, may be further included.

The BS 110 is a network infrastructure that provides wireless access for the UEs 120 and 130. The BS 110 has coverage defined to be a certain geographical area based on a range within which a signal may be transmitted from the BS 110. The BS 110 may also be referred to as an access point (AP), an eNodeB (eNB), a fifth generation (5G) node, a next generation nodeB (gNB), a wireless point, a transmission/reception point (TRP), or other terms having equal technical meaning.

Each of the UEs 120 and 130 is a device used by a user, which performs communication with the BS 110 through a wireless channel. A link directed from the BS 110 to the UE 120 or the UE 130 is called a downlink (DL), and a link directed from the UE 120 or the UE 130 to the BS 110 is called an uplink (UL). The UE 120 and the UE 130 may perform communication with each other on a wireless channel. In this case, the link between the UE 120 and the UE 130, i.e., a device-to-device link (D2D) may be referred to as a sidelink, which is interchangeably used with a PC5 interface. In some cases, at least one of the UE 120 or the UE 130 may be operated without intervention of the user. For example, at least one of the UE 120 or the UE 130 is a device for performing machine type communication (MTC), which may not be carried by the user. Each of the UEs 120 and 130 may also be referred to as a terminal, a mobile station (MS), a subscriber station, a remote terminal, a wireless terminal, a user device, or other terms having equal technical meaning.

The BS 110, the UE 120, and the UE 130 may transmit and receive wireless signals in a millimeter wave (mmWave) band (e.g., 28 GHZ, 30 GHZ, 38 GHZ, or 60 GHZ). In this case, to increase channel gains, the BS 110, the UE 120, and the UE 130 may perform beamforming. Herein, the beamforming may include transmit beamforming and receive beamforming. That is, the BS 110, the UE 120, and the UE 130 may give directivity to a signal to be transmitted or received. For this, the BS 110 and the UEs 120 and 130 may select serving beams 112, 113, 121 and 131 through a beam search or beam management procedure. Communication after the serving beams 112, 113, 121 and 131 are selected may be performed with resources quasi co-located (QCL) with resources in which the serving beams 112, 113, 121 and 131 have been transmitted.

When large-scale characteristics of a channel that has transferred a symbol on a first antenna port may be inferred from a channel that has transferred a symbol on a second antenna port, the first and second antenna ports may be estimated as being QCLed. For example, the large-scale characteristics may include at least one of delay spread, Doppler spread, Doppler shift, an average gain, an average delay, or a spatial receiver parameter.

Figure 2:
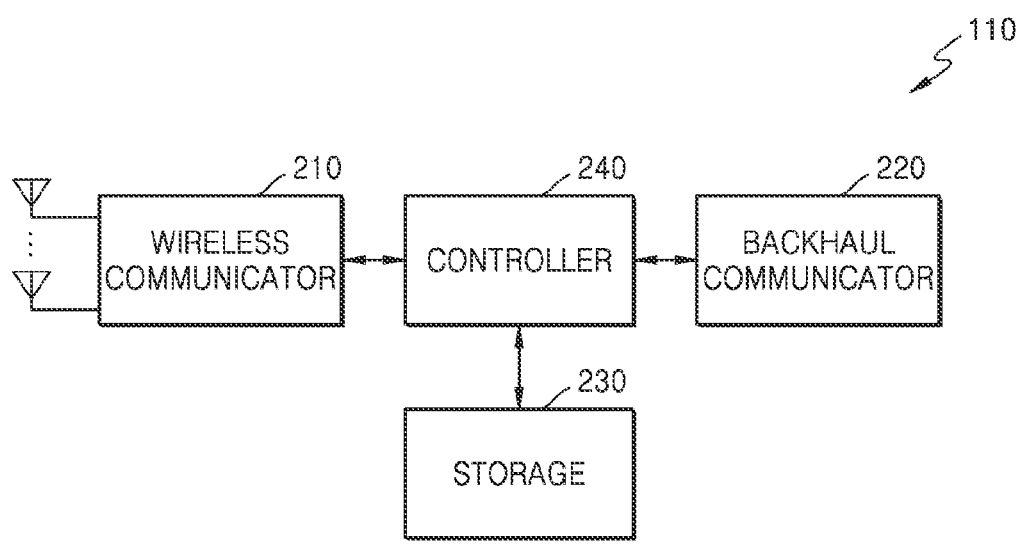
FIG. 2 illustrates a configuration of a base station (BS) in a wireless communication system, according to various embodiments of the disclosure.

FIG. 2 illustrates a configuration of a base station (BS) in a wireless communication system, according to various embodiments of the disclosure.

The configuration illustrated in FIG. 2 may be understood as a configuration of the BS 110. "Unit", "module", "block", etc., as used herein each represent a unit for handling at least one function or operation, and may be implemented in hardware, software, or a combination thereof.

Referring to FIG. 2, the BS includes a wireless communicator 210, a backhaul communicator 220, a storage 230, and a controller 240.

The wireless communicator 210 performs functions for transmitting or receiving signals on a wireless channel. For example, the wireless communicator 210 performs a conversion function between a baseband signal and a bitstream according to a physical layer standard of the system. For example, for data transmission, the wireless communicator 210 may generate complex symbols by encoding and modulating a bitstream for transmission. For data reception, the wireless communicator 210 reconstructs a received bitstream by demodulation and decoding of the baseband signal.

Furthermore, the wireless communicator 210 performs up-conversion on the baseband signal to a radio frequency (RF) band signal and transmit the resultant signal through an antenna, and may perform down-conversion on an RF band signal received through an antenna to a baseband signal. For this, the wireless communicator 210 may include a transmit filter, a receive filter, an amplifier, a mixer, an oscillator, a digital to analog converter (DAC), an analog to digital converter (ADC), etc. The wireless communicator 210 may also include a number of transmission and reception paths. Furthermore, the wireless communicator 210 may include at least one antenna array comprised of multiple antenna elements.

From a perspective of hardware, the wireless communicator 210 may include a digital unit and an analog unit, and the analog unit may include multiple sub-units depending on operation power, operating frequency, etc. The digital unit may be implemented with at least one processor (e.g., a digital signal processor (DSP)).

The wireless communicator 210 transmits and receives signals as described above. All or part of the wireless communicator 210 may be referred to as a transmitter, a receiver, or a transceiver. In the following description, transmission and reception performed through a wireless channel is used as having meaning that the aforementioned processes are performed by the wireless communicator 210.

The backhaul communicator 220 provides an interface for communicating with other nodes in the network. Specifically, the backhaul communicator 220 converts a bitstream to be transmitted from the BS to another node, e.g., another access node, another BS, a higher node, a core network, etc., into a physical signal, and converts a physical signal received from another node into a bitstream.

The storage 230 stores a basic program for operation of the NR BS, an application program, data such as configuration information. The storage 230 may include a volatile memory, a non-volatile memory, or a combination of the volatile memory and the non-volatile memory. The storage 230 may provide data stored therein at the request of the controller 240.

The controller 240 may control general operations of the BS. For example, the controller 240 may transmit and receive signals through the wireless communicator 210 or the backhaul communicator 220. The controller 240 may also record or read data onto or from the storage 230. The controller 240 may also perform functions of a protocol stack requested by a communication standard. In another implementation, the protocol stack may be included in the wireless communicator 210. For this, the controller 240 may include at least one processor. In various embodiments, the controller 240 may control the BS to perform operations according to various embodiments, which will be described later.

Figure 3:
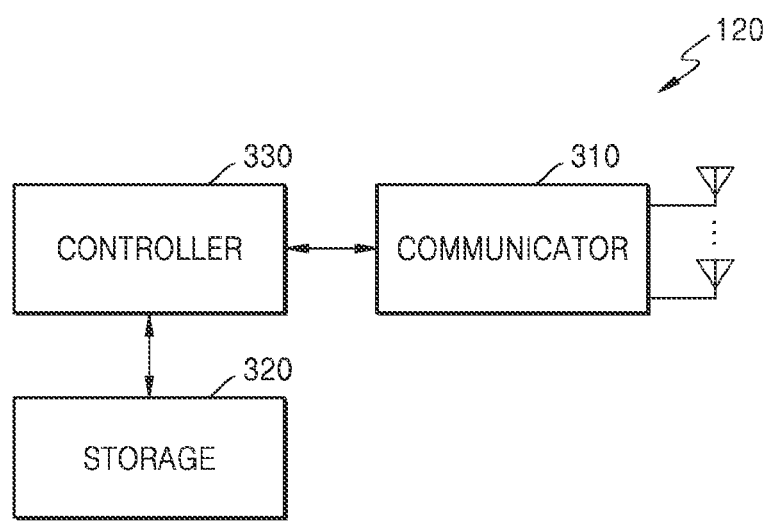
FIG. 3 illustrates a configuration of a user equipment (UE) in a wireless communication system, according to various embodiments of the disclosure.

FIG. 3 illustrates a configuration of a user equipment (UE) in a wireless communication system, according to various embodiments of the disclosure.

A configuration illustrated in FIG. 3 may be understood as a configuration of the UE 120. "Unit", "module", "block", etc., as used herein each represent a unit for handling at least one function or operation, and may be implemented in hardware, software, or a combination thereof.

Referring to FIG. 3, the UE includes a communicator 310, a storage 320, and a controller 330.

The communicator 310 performs functions for transmitting and receiving signals on a wireless channel. For example, the communicator 310 performs a conversion function between a baseband signal and a bitstream according to a physical layer standard of the system. For example, for data transmission, the communicator 310 may generate complex symbols by encoding and modulating a bitstream for transmission. For data reception, the communicator 310 reconstructs a received bitstream by demodulation and decoding of the baseband signal. Furthermore, the communicator 310 performs up-conversion on the baseband signal to a radio frequency (RF) band signal and transmit the resultant signal through an antenna, and may perform down-conversion on an RF band signal received through an antenna to a baseband signal. For example, the communicator 310 may include a transmit filter, a receive filter, an amplifier, a mixer, an oscillator, a digital-to-analog converter (DAC), an analog-to-digital converter (ADC), etc.

The communicator 310 may also include a number of transmission and reception paths. Furthermore, the communicator 310 may include at least one antenna array comprised of multiple antenna elements. From the perspective of hardware, the communicator 310 may be comprised of a digital circuit and an analog circuit (e.g., a radio frequency integrated circuit (RFIC)). In this case, the digital circuit and the analog circuit may be implemented in a single package. The communicator 310 may include multiple RF chains. Furthermore, the communicator 310 may perform beamforming.

The communicator 310 transmits and receives signals as described above. All or part of the communicator 310 may be referred to as a transmitter, a receiver, or a transceiver. In the following description, transmission or reception performed through a wireless channel is used as having meaning that the aforementioned processes are performed by the communicator 310.

The storage 320 stores a basic program for operation of the UE, an application program, data such as configuration information. The storage 320 may include a volatile memory, a non-volatile memory, or a combination of the volatile memory and the non-volatile memory. The storage 320 may provide data stored therein at the request of the controller 330.

The controller 330 controls general operations of the UE. For example, the controller 330 transmits and receives signals through the communicator 310. The controller 330 may also record or read data onto or from the storage 320. The controller 330 may further perform functions of a protocol stack requested by a communication standard. For this, the controller 330 may include at least one processor or microprocessor, or may be part of the processor. Furthermore, part of the communicator 310 and the controller 330 may be referred to as a communication processor (CP). In various embodiments, the controller 330 may control the UE to perform operations according to various embodiments, which will be described later.

Figure 4:
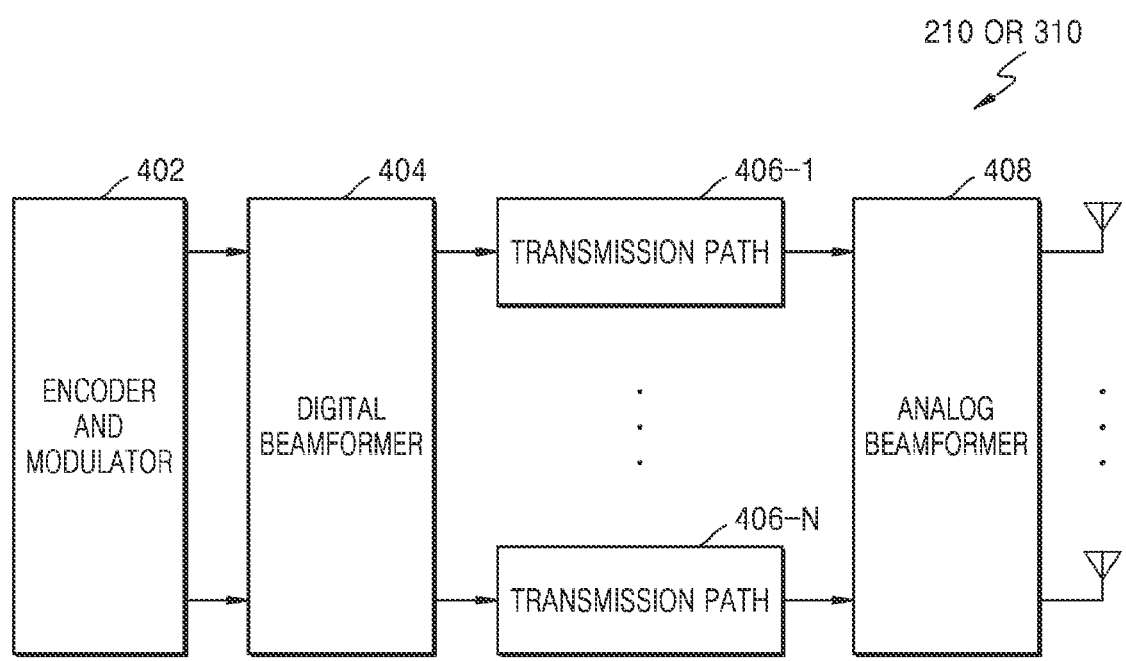
FIG. 4 illustrates a configuration of a communicator in a wireless communication system, according to various embodiments of the disclosure.

FIG. 4 illustrates a configuration of a communicator in a wireless communication system, according to various embodiments of the disclosure.

In FIG. 4, an example of a detailed configuration of the wireless communicator 210 of FIG. 2 or the communicator 310 of FIG. 3 is illustrated. Specifically, components, which are part of the wireless communicator 210 of FIG. 2 or the communicator 310 of FIG. 3, involved in performing beamforming are illustrated in FIG. 4.

Referring to FIG. 4, the wireless communicator 210 or the communicator 310 may include an encoder and modulator 402, a digital beamformer 404, multiple transmission paths 406-1 to 406-N, and an analog beamformer 408.

The encoder and modulator 402 may perform channel encoding. For channel encoding, at least one of low density parity check (LDPC) codes, convolution codes, or polar codes may be used. The encoder and modulator 402 may generate modulated symbols by performing constellation mapping.

The digital beamformer 404 performs beamforming on a digital signal (e.g., modulated symbols). For this, the digital beamformer 404 multiplies the modulated symbols by beamforming weights. The beamforming weights may be used to change magnitude and phase of a signal, and referred to as a precoding matrix, a precoder, etc. The digital beamformer 404 may output digitally beamformed modulated symbols on the multiple transmission paths 406-1 to 406-N. In this case, according to a multiple input multiple output (MIMO) transmission scheme, the modulated symbols may be multiplexed or the same modulated symbols may be provided on the multiple transmission paths 406-1 to 406-N.

The multiple transmission paths 406-1 to 406-N may convert digitally beamformed digital signals to analog signals. For this, the multiple transmission paths 406-1 to 406-N may each include an inverse fast Fourier transform (IFFT) operator, a cyclic prefix (CP) inserter, a DAC, and an up-converter. The CP inserter is for an OFDM scheme, and may be omitted when a different physical layer scheme (e.g., a filter bank multi-carrier (FBMC) scheme) is applied. In other words, the multiple transmission paths 406-1 to 406-N provide independent signal processing processes on multiple streams generated through digital beamforming. However, depending on implementation methods, some of the components of the multiple transmission paths 406-1 to 406-N may be shared.

The analog beamformer 408 may perform beamforming on an analog signal. For this, the digital beamformer 404 multiplies analog signals by beamforming weights. The beamforming weights may be used to change magnitude and phases of the signal. Specifically, depending on a coupling structure between the multiple transmission paths 406-1 to 406-N and antennas, the analog beamformer 440 may be variously configured. For example, each of the multiple transmission paths 406-1 to 406-N may be connected to an antenna array. For example, the multiple transmission paths 406-1 to 406-N may be connected to an antenna array. In another example, the multiple transmission paths 406-1 to 406-N may be adaptively connected to one, two, or more antenna arrays.

Wireless communication systems are evolving from early systems that provide voice-oriented services to broadband wireless communication systems that provide high data rate and high quality packet data services such as 3GPP high speed packet access (HSPA), long term evolution (LTE) or evolved universal terrestrial radio access (E-UTRA), LTE-advanced (LTE-A), 3GPP2 high rate packet data (HRPD), ultra-mobile broadband (UMB), and IEEE 802.16e communication standards. Furthermore, for the fifth generation (5G) wireless communication system, communication standards for 5G or NR are being made.

The NR system employs OFDM schemes for DL and UL. Specifically, a cyclic prefix OFDM (CP-OFDM) scheme is employed for DL, and together with the CP-OFDM, discrete Fourier transform spreading OFDM (DFT-S-OFDM) scheme is employed for UL. The UL refers to a wireless link on which the UE transmits data or a control signal to the BS, and the DL refers to a wireless link on which the BS transmits data or a control signal to the UE. A multiple access scheme allocates and operates time-frequency resources for carrying data or control information for respective users not to overlap each other, i.e., to maintain orthogonality, thereby differentiating each user's data or control information.

The NR system adopts a Hybrid Automatic Repeat request (HARQ) scheme that retransmits corresponding data at the physical layer in a case that decoding fails at the initial stage of transmission. By the HARQ scheme, when a receiver fails to correctly decode data, the receiver transmits information indicating the decoding failure (NACK; Negative Acknowledgment) to a transmitter so that the transmitter may re-transmit the corresponding data at the physical layer. The receiver may increase data reception capability by combining the data retransmitted by the transmitter with the data for which decoding has failed. Further, in a case that the receiver correctly decodes data, the receiver may transmit information indicating decoding success, ACK (acknowledgment) to the transmitter so that the transmitter may transmit new data.

Figure 5:
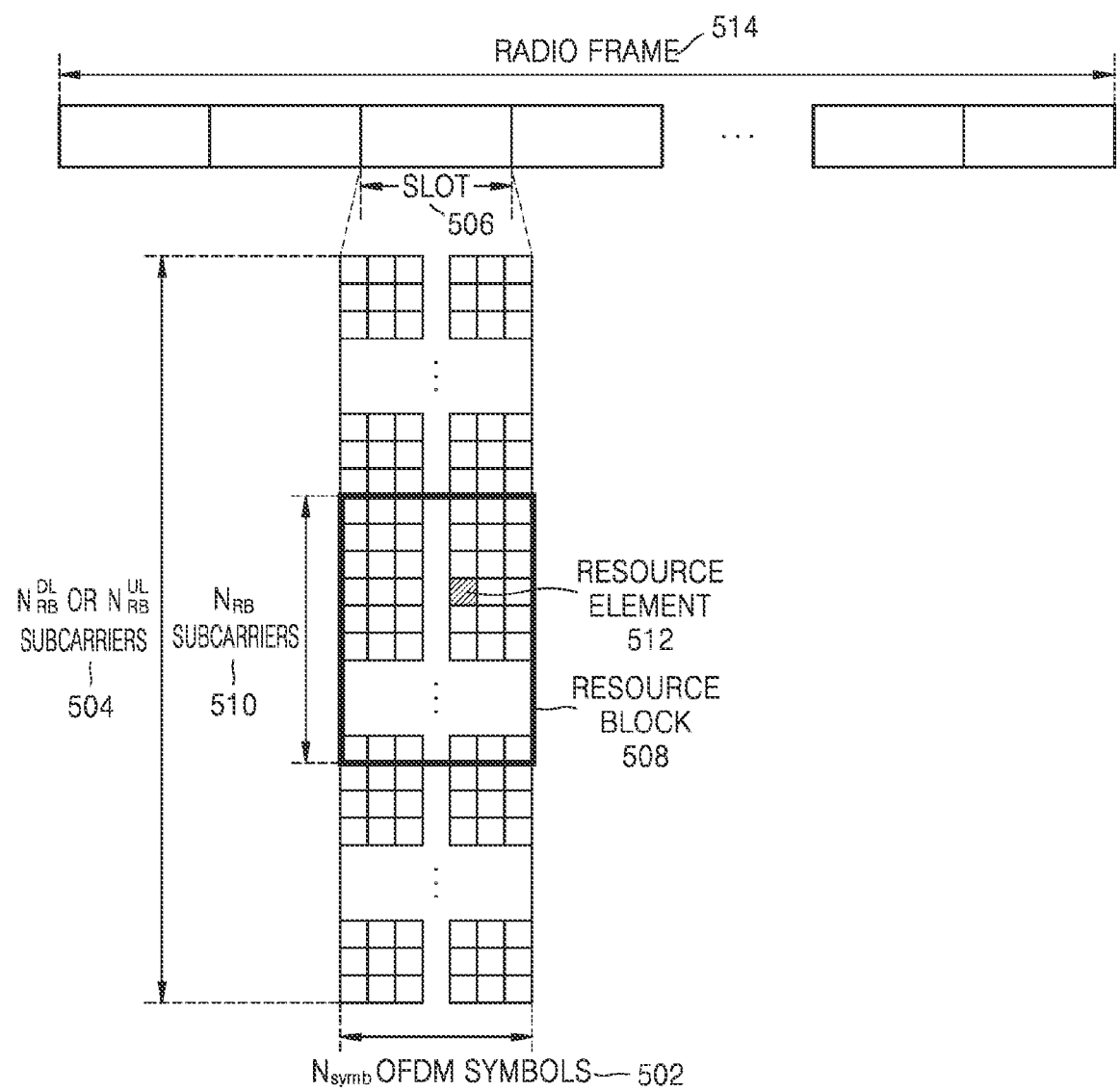
FIG. 5 is a time-frequency domain resource structure in a wireless communication system, according to various embodiments of the disclosure.

FIG. 5 is a time-frequency domain resource structure in a wireless communication system, according to various embodiments of the disclosure.

FIG. 5 illustrates a basic structure of a time-frequency domain, which is a radio resource domain in which data or a control channel is transmitted in the DL or the UL.

In FIG. 5, the horizontal axis represents the time domain, and the vertical axis represents the frequency domain. A minimum transmission unit in the time domain is an OFDM symbol, and $N_{symb}$ OFDM symbols 502 make up a slot 506. A subframe is defined to be 1.0 ms long, and a radio frame 514 is defined to be 10 ms long. A minimum transmission unit in the frequency domain is a subcarrier, and bandwidth of the whole system transmission band may be made up with a total of New subcarriers 504. Specific numerical values of $N_{symb}$, $N_{BW}$, etc., may be variously applied depending on the system.

The basic resource unit in the time-frequency domain is a resource element (RE) 512, which may be represented with an OFDM symbol index and a subcarrier index. A resource block (RB or a physical resource block (PRB)) 508 may be defined with $N_{symb}$ successive OFDM symbols 502 in the time domain and $N_{RB}$ successive subcarriers 510 in the frequency domain. Accordingly, one RB 508 includes $N_{symb} \times N_{RB}$ REs 512. Generally, a minimum data transmission unit is an RB. In the NR system, it is common that $N_{symb}=14$ and $N_{RB}=12$, and New and $N_{RB}$ are proportional to the bandwidth of a system transmission band. The data rate may increase in proportion to the number of RBs scheduled for the UE. In the NR system, for a frequency division duplex (FDD) system that operates DL and UL distinguished by frequency, a DL transmission bandwidth may differ from a UL transmission bandwidth. Channel bandwidth refers to RF bandwidth corresponding to the system transmission bandwidth. Table 1 and table 2 represent some of corresponding relationships between a system transmission bandwidth, subcarrier spacing (SCS), and a channel bandwidth defined in the NR system in frequency bands lower than 6 GHz and higher than 6 GHz, respectively. For example, the NR system having a 100 MHz channel bandwidth with 30 KHz SCS has a transmission bandwidth consisting of 273 RBs. In Table 1 and Table2, N/A may be a bandwidth-subcarrier combination not supported by the NR system.

TABLE 1

| | | channel bandwidth [MHz] | | | | | |
|---|---|---|---|---|---|---|---|
| | SCS | 5 | 10 | 20 | 50 | 80 | 100 |
| transmission bandwidth configuration $N_{RB}$ | 15 kHz | 25 | 52 | 106 | 270 | N/A | N/A |
| | 30 kHz | 11 | 24 | 51 | 133 | 217 | 273 |
| | 60 kHz | N/A | 11 | 24 | 65 | 107 | 135 |

TABLE 2

| channel bandwidth [MHz] | SCS | 50 | 100 | 200 | 400 |
|---|---|---|---|---|---|
| transmission bandwidth configuration $N_{RB}$ | 60 kHz | 66 | 132 | 264 | N/A |
| | 120 kHz | 32 | 66 | 132 | 264 |

In the NR system, scheduling information on downlink data or uplink data is transferred through downlink control information (DCI) from the BS to the UE. The DCI may be defined in various formats, and depending on each format, and based on each format, whether it is scheduling information for UL data, UL grant, or scheduling information for DL data, DL grant, whether it is compact DCI with small-sized control information, whether spatial multiplexing is applied using multiple antennas, whether it is DCI for power control, etc., may be determined. For example, DCI format 1-1 that is scheduling control information for DL data may include at least one of items as in Table 3 below.

TABLE 3

| Item | description |
|---|---|
| Carrier indicator | Indicate what frequency carrier is used for transmission |
| DCI format indicator | Identify whether DCI is for DL or UL |
| BWP (bandwidth part) indicator | Indicate what BWP is used for transmission |

TABLE 3-continued

| Item | description |
|---|---|
| Frequency domain resource allocation | Indicate RB in frequency band allocated for data transmission. Resource represented is determined based on system bandwidth and resource allocation scheme |
| Time domain resource allocation | Indicate which OFDM symbol in which slot is used for transmission of data related channel |
| VRB-to-PRB mapping | Indicate which method is used to map virtual RB (VRB) index and physical RB (PRB) |
| MCS (modulation and coding scheme) | Indicate modulation scheme and code rate used for data transmission, i.e., indicate coding rate value able to inform TBS and channel coding information along with information about whether it is QPSK, 16QAM, 64QAM, or 256QAM |
| CBG transmission information (codeblock group transmission information) | Indicate information about which CBG is transmitted when CBG retransmission is configured |
| HARQ process number | Indicate process number of HARQ |
| NDI (new data indicator) | Indicate whether it is HARQ initial transmission or retransmission |
| RV (redundancy version) | Indicate redundancy version of HARQ |
| TPC (transmit power control command) for PUCCH (physical uplink control channel) | Indicate transmit power control command for uplink control channel PUCCH |

In Table 3, for the PDSCH transmission, time domain resource allocation may be represented by information about a slot in which a PDSCH is transmitted, a start symbol position S in the slot, and the number L of symbols to which the PDSCH is mapped. Here, the S may be a relative position from the beginning of the slot, the L may be the number of successive symbols, and the S and L may be determined from a start and length indicator value (SLIV) defined as in Table 4 below.

TABLE 4 if (L-1)≤7 then
   SLIV=14·(L-1)+S
else
   SLIV=14·(14-L+11)+(14-1-S)
where 0<L≤14-S In the NR system, commonly through RRC configuration, corresponding relations between an SLIV value, a PDSCH or physical uplink shared channel (PUSCH) mapping type, and pieces of information about a slot in which the PDSCH or PUSCH is transmitted may be configured in one line. Subsequently, an index value defined in the configured corresponding relation is indicated by using time domain resource allocation in DCI, so that the BS may deliver information about an SLIV value, a PDSCH or PUSCH mapping type, and a slot in which the PDSCH or PUSCH is transmitted, to the UE.

For the NR system, the PDSCH or PUSCH mapping type is defined to be type A or type B. In the case of the PDSCH or PUSCH mapping type A, a demodulation reference signal (DMRS) symbol begins from the second or third OFDM symbol in the slot. In the case of the PDSCH or PUSCH mapping type B, a DMRS symbol begins from the first OFDM symbol of a time domain resource allocated for PUSCH transmission.

The DCI may be transmitted via a physical downlink control channel (PDCCH) after going through channel coding and modulation. The PDCCH may be used even to indicate control information itself rather than the channel. In general, the DCI is scrambled by a specific radio network temporary identifier (RNTI) or a UE identifier separately for each UE, having cyclic redundancy check (CRC) added thereto, channel-coded, and then configured and transmitted in a separate PDCCH. The PDCCH is mapped to a control resource set (CORESET) configured for the UE.

The DL data may be transmitted on a PDSCH, which is a physical channel for DL data transmission. The PDSCH may be transmitted after a control channel transmission interval, and scheduling information such as a specific mapping position in the frequency domain, modulation scheme, etc., is indicated by the DCI transmitted via the PDCCH. Through an MCS of the control information that makes up the DCI, the BS notifies the UE of a modulation scheme applied to the PDSCH for transmission and the size of data to be transmitted (transport block size; TBS). In an embodiment, the MCS may be comprised of 5 bits or more than or less than 5 bits. The TBS corresponds to the size of a transport block (TB) before channel coding for error correction is applied to the data (TB) to be transmitted by the BS.

In the disclosure, the TB may include a medium access control (MAC) header, a MAC control element (CE), one or more MAC service data units (MAC SDUs), and padding bits. Alternatively, the TB may refer to a data unit or an MAC protocol data unit (MAC PDU) sent down to the physical layer from the MAC layer.

The NR system supports the following modulation schemes: QPSK (Quadrature Phase Shift Keying), 16 QAM (Quadrature Amplitude Modulation), 64 QAM, and 256 QAM, and their respective modulation orders Qm may be 2, 4, 6, and 8. Specifically, 2 bits per symbol for the QPSK, 4 bits per symbol for the 16 QAM, and 6 bits per symbol for the 64 QAM may be transmitted, and 8 bits per symbol for the 256 QAM may be transmitted, and when 1024 QAM is supported, 10 bits per symbol for the 1024 QAM may be mapped and transmitted.

Figure 6A:
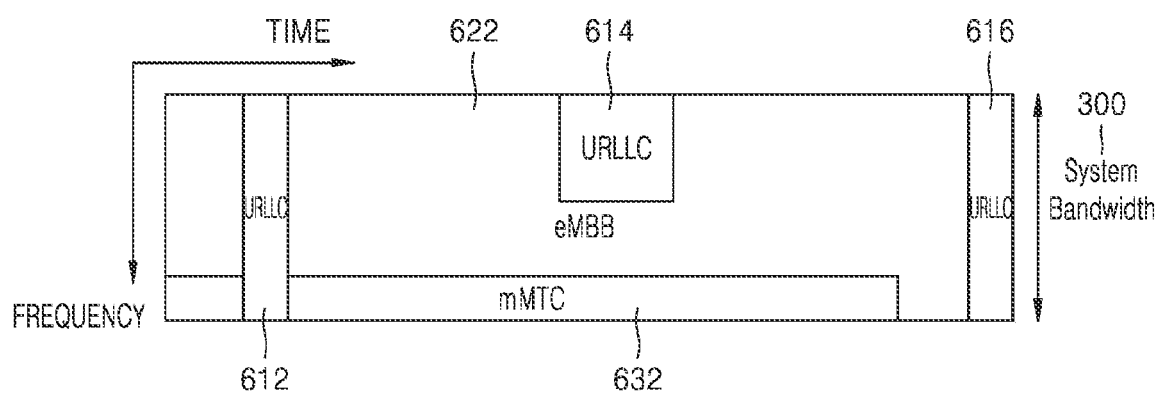
FIG. 6A illustrates data allocation per service to frequency-time resources in a wireless communication system, according to various embodiments of the disclosure.
Figure 6B:
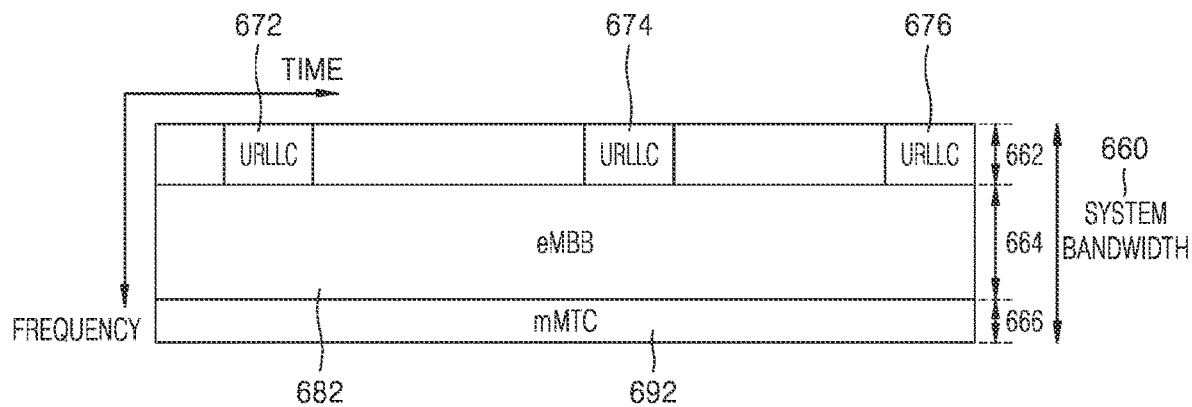
FIG. 6B illustrates another data allocation per service to frequency-time resources in a wireless communication system, according to various embodiments of the disclosure.

In terms of service, the NR system is designed to freely multiplex various services in time and frequency resources, so that a waveform/numerology, a reference signal or the like, may be dynamically or freely adjusted as required. For wireless communication to provide a best service to a UE, it is important to optimize data transmission through measurement of quality and interference of a channel, and accordingly, accurate channel state measurement is essential. However, unlike the fourth generation (4G) communication where channel and interference characteristics are not significantly changed depending on frequency resources, a 5G channel has channel and interference characteristics that significantly change depending on services, so requires support for a frequency resource group (FRG)-wise subset, which enables division of the measurement. In the meantime, service types supported in the NR system may be divided into enhanced mobile broadband (eMBB), massive machine type communications (mMTC), ultra-reliable and low-latency communications (URLLC), etc. The eMBB is a service for high rate transmission of high volume data, the mMTC is a service for least power consumption at the UE and accesses of multiple UEs, and the URLLC is a service for high reliability and low latency, without being limited thereto. Depending on the type of service applied to the UE, different requirements may be applied. Examples of resource distributions for the respective services are shown as in FIGS. 6A and 6B. Referring to FIGS. 6A and 6B, a scheme in which frequency and time resources are allocated for information transmission in each system is identified.

FIG. 6A illustrates data allocation per service to frequency-time resources in a wireless communication system, according to various embodiments of the disclosure.

Referring to FIG. 6A, in the whole system frequency band 610, resources are allocated for eMBB 610, URLLC 612, 614 and 616, and mMTC 632. When URLLC data 612, 614, and 616 occurs while eMBB data 622 and mMTC data 632 are allocated and being transmitted in a particular frequency band, the URLLC data 612, 614, and 616 may be transmitted by emptying a part already allocated for the eMBB 622 and the mMTC 632 or by not transmitting the eMBB data 622 and the mMTC 632. As URLLC requires reduced latency, a resource for transmitting the URLLC data 612, 614 and 616 may be allocated in part of the resource allocated for the eMBB 622. Of course, when the URLLC 612, 614, and 616 is additionally allocated and transmitted in the resource allocated for the eMBB 622, the eMBB data 622 may not be transmitted in the overlapping frequency-time resource and thus, the transmission performance for eMBB data 622 may be reduced. In other words, in this case, a failure of transmission of the eMBB data 622 may occur due to the allocation of the URLLC 612, 614 and 616. The scheme as shown in FIG. 6A may be referred to as a preemption scheme.

FIG. 6B illustrates another data allocation per service to frequency-time resources in a wireless communication system, according to various embodiments of the disclosure.

FIG. 6B shows an example of providing services in sub-bands 662, 664 and 665 obtained by dividing the whole system frequency band 660. Specifically, the sub-band 662 is used for URLLC data transmission 672, 674 and 676, the sub-band 664 for eMBB data transmission 682, and the sub-band 666 for mMTC data transmission 692. Information relating to configurations of the sub-bands 662, 664 and 666 may be determined in advance, and the information may be transmitted from the BS to the UE by higher layer signaling. Alternatively, without transmission of the sub-band configuration information to the UE, the BS or the network node may arbitrarily divide information about the sub-bands 662, 664, and 666 to provide services.

In various embodiments, a length of transmission time interval (TTI) used for URLLC transmission may be shorter than a TTI length used for the eMBB or mMTC transmission. Furthermore, a response to information regarding the URLLC may be transmitted faster than the eMBB or the mMTC, and accordingly, the UE that uses the URLLC may transmit or receive the information with low latency. To transmit the aforementioned three services or data, physical layer channels used for the respective types may have different structures. For example, at least one of a length of TTI, a frequency resource allocation unit, a control channel structure, and a data mapping method may be different.

The three types of services and three data types have thus far been described, but there may be more types of services and corresponding data types. Even in this case, various embodiments to be described below will be applied.

Figure 7:
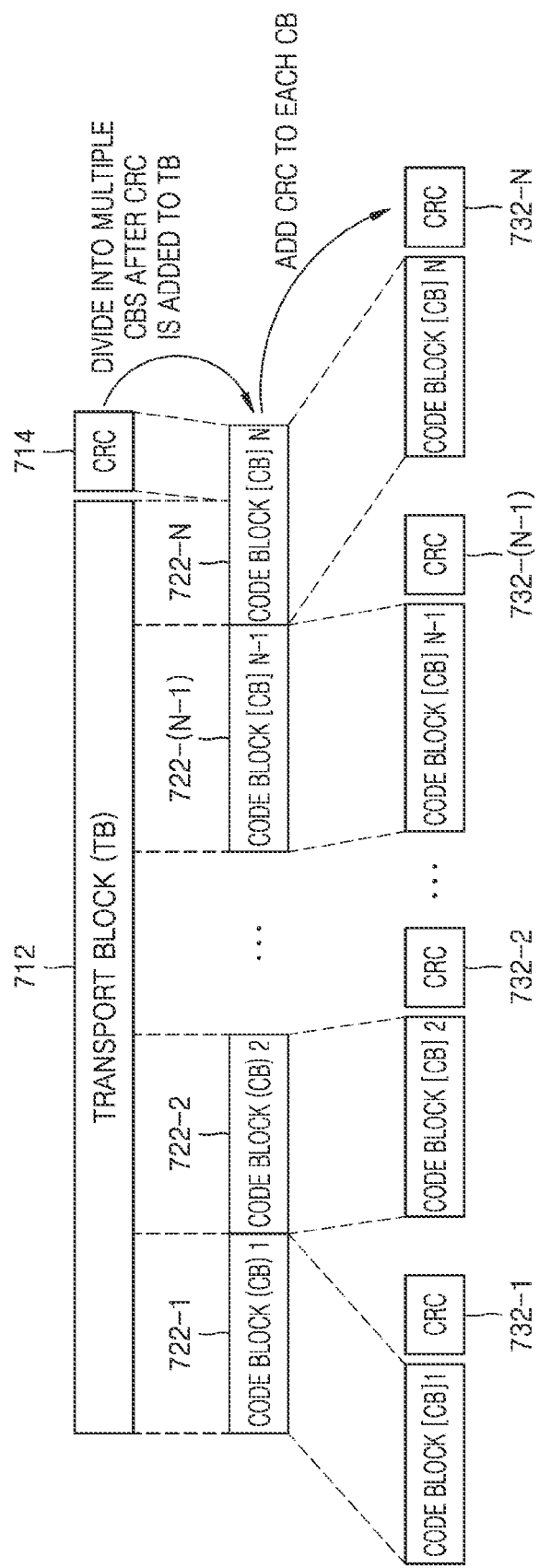
FIG. 7 illustrates a data encoding scheme in a wireless communication system, according to various embodiments of the disclosure.

FIG. 7 illustrates a data encoding scheme in a wireless communication system, according to various embodiments of the disclosure.

FIG. 7 shows an example in which one TB is segmented into several codeblocks (CBs) with a CRC added thereto.

Referring to FIG. 7, CRC 714 may be added to the last or first portion of one TB 712 to be transmitted in a UL or DL. The CRC 714 may be in 16 or 24 bits, or in a prefixed number of bits, or in a variable number of bits depending on the channel condition, and may be used to determine whether channel coding is successful. The block with the TB 712 and the CRC 714 added thereto is divided into a plurality of CBs 722-1, 722-2, 722-(N−1), and 722-N. The CB may have a predefined size, and in this case, the last CB 722-N may be configured to be smaller in size than the other CBs or have the same size as the other CBs by adding 0's, random values, or 1's. CRCs 732-1, 732-2, 732-(N−1), and 732-N may be added to the segmented code blocks, respectively. The respective CRCs 732-1, 732-2, 732-(N−1), and 732-N may be in 16 bits, 24 bits, or in a prefixed number of bits, and used to determine whether channel coding is successful at the receiver.

The TB 712 and a cyclic generator polynomial may be used to create the CRC 714. The cyclic generator polynomial may be variously defined. For example, assuming that the cyclic generator polynomial for 24-bit CRC, $g_{CRC24A}(D)=D^{24}+D^{23}+D^{18}+D^{17}+D^{14}+D^{11}+D^{10}+D^7+D^6+D^5+D^4+D^3+D+1$ and L=24, for TB data $a_0, a_1, a_2, a_3, \ldots, a_{A-1}$, CRC $p_1, p_2, \ldots, p_{L-1}$ may be determined to be a value resulting from dividing $a_0D^{A+23}+a_1D^{A+22}+ \ldots +a_{A-1}D^{24}+p_0D^{23}+p_1D^{22}+ \ldots +p_{22}D^1+p_{23}$ by $g_{CRC24A}(D)$ with the remainder being 0. Although the CRC length L is assumed as 24 in the above example, the length L may be defined to be a different one such as 12, 16, 24, 32, 40, 48, 64, etc.

After the CRC is added to the TB as described above, a combination of the TB and the CRC is divided into CBs 722-1, 722-2, 722-(N−1), and 722-N. CRCs 732-1, 732-2, 732-(N−1), and 732-N are added to the CBs 722-1, 722-2, 722-(N−1), 722-N, respectively. The CRC added to each CB may be created based on a different length of CRC or a different cyclic generator polynomial than in the case of creating the CRC added to the TB. In some embodiments, however, the CRC 714 added to the TB and CRCs 732-1, 732-2, 732-(N−1), 732-N added to the CBs 722-1, 722-2, 722-(N−1), 722-N may be omitted depending on the type of a channel code to be applied to the CB. For example, when low density parity code (LDPC) codes are applied to the CBs instead of turbo codes, the CRCs 732-1, 732-2, 732-(N−1), and 732-N that would otherwise be added to the respective CBs may be omitted. Alternatively, even when the LDPC is applied, the CRCs 732-1, 732-2, 732-(N−1), and 732-N may be added to the CBs 722-1, 722-2, 722-(N−1), and 722-N. Moreover, even when polar codes are used, the CRCs may be added or omitted.

As shown in FIG. 7, for a TB, a maximum length is defined for a CB based on the type of channel coding applied, and division of the TB and the CRC added to the TB into CBs is performed based on the maximum length of the CB. In the LTE system, a CRC for CB may be added to a segmented CB, data bits and the CRC of the CB are encoded with channel codes, and accordingly, coded bits are determined, and the number of bits to be rate-matched as agreed for the respective coded bits may be determined.

Figure 8:
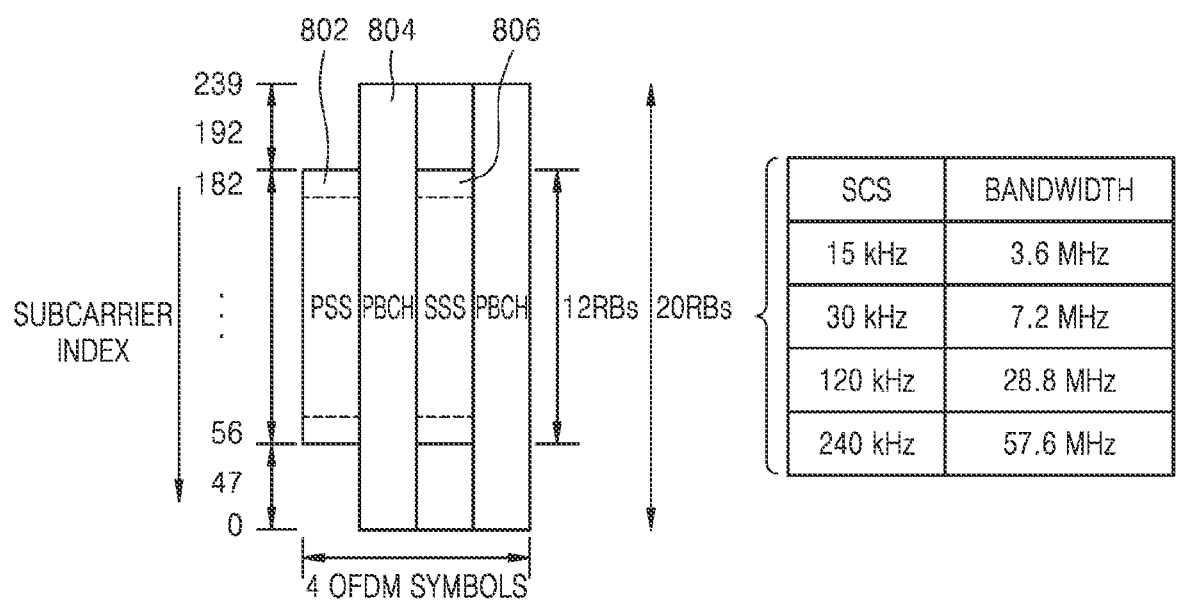
FIG. 8 illustrates mapping of a synchronization signal and a broadcast channel in a wireless communication system, according to various embodiments of the disclosure.

FIG. 8 illustrates mapping of a synchronization signal and a broadcast channel in a wireless communication system, according to various embodiments of the disclosure.

In FIG. 8, shown is an example of mapping results in the frequency and time domain of synchronization signals and physical broadcast channels (PBCHs) of a 3GPP NR system. A primary synchronization signal (PSS) 802, a secondary synchronization signal (SSS) 806, and a PBCH 804 are mapped across 4 OFDM symbols, and the PSS 802 and the SSS 806 are mapped to 12 RBs, and the PBCH 804 are mapped to 20 RBs. Frequency bandwidths of the 20 RBs depending on SCS are shown in FIG. 8. A resource region in which to deliver a set of the PSS 802, the SSS 806, the PBCH 804 or the PSS 802, the SSS 806, and the PBCH 804 may be called an SS/PBCH block or SS block (SSB).

Figure 9:
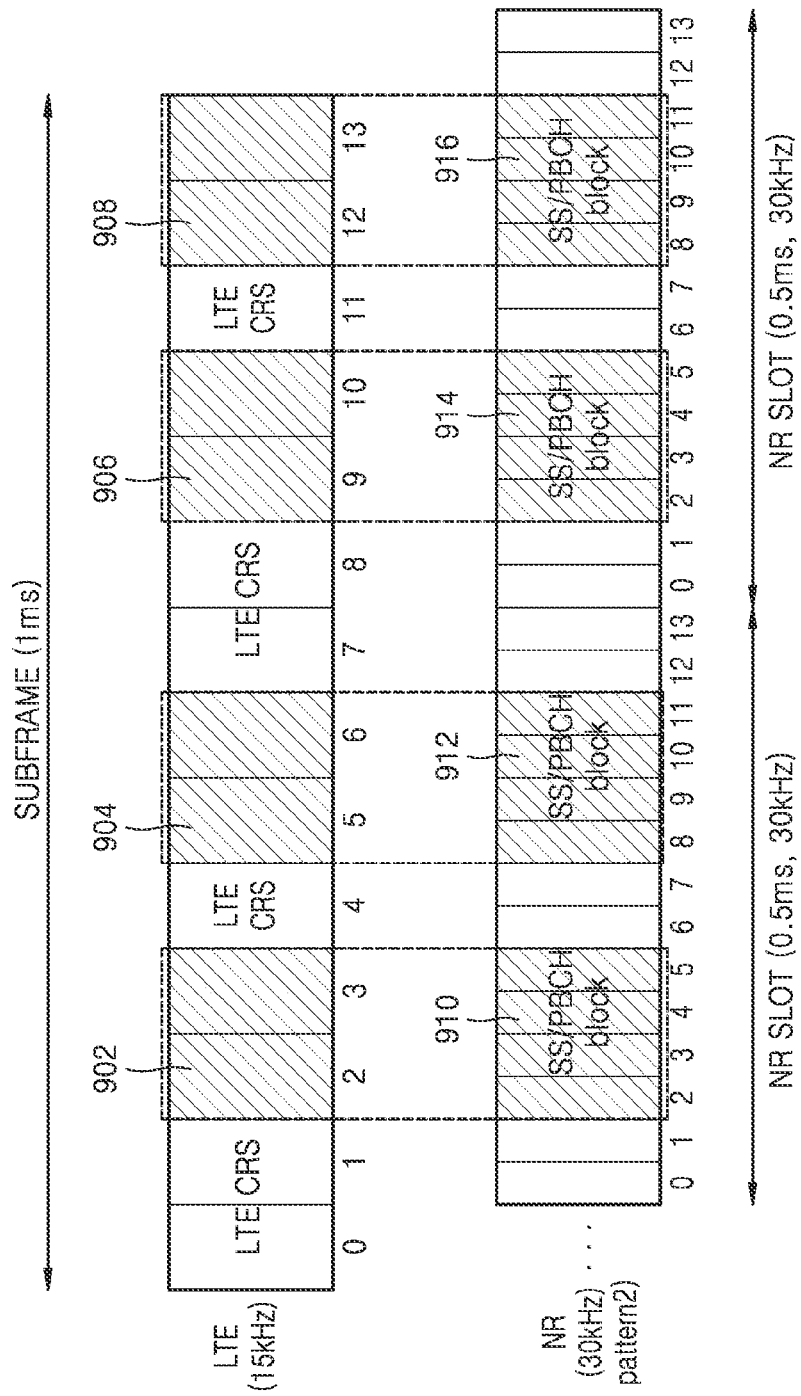
FIG. 9 illustrates arrangement of synchronization signal/physical broadcast channel blocks (SSBs) in a wireless communication system, according to various embodiments of the disclosure.

FIG. 9 illustrates SSB arrangement in a wireless communication system according to various embodiments of the disclosure.

FIG. 9 is an example of which symbols one SSB is mapped to within a slot in an LTE system using 15 kHz of SCS and an NR system using 30 kHz of SCS. Referring to FIG. 9, SSBs 910, 912, 914, and 916 of the NR system are transmitted in positions 902, 904, 906 and 908 not overlapping with cell-specific reference signals (CRSs) transmitted at all times in the LTE system. Such a design as in FIG. 9 is to make the LTE system and the NR system coexist in a frequency band.

Figure 10A:
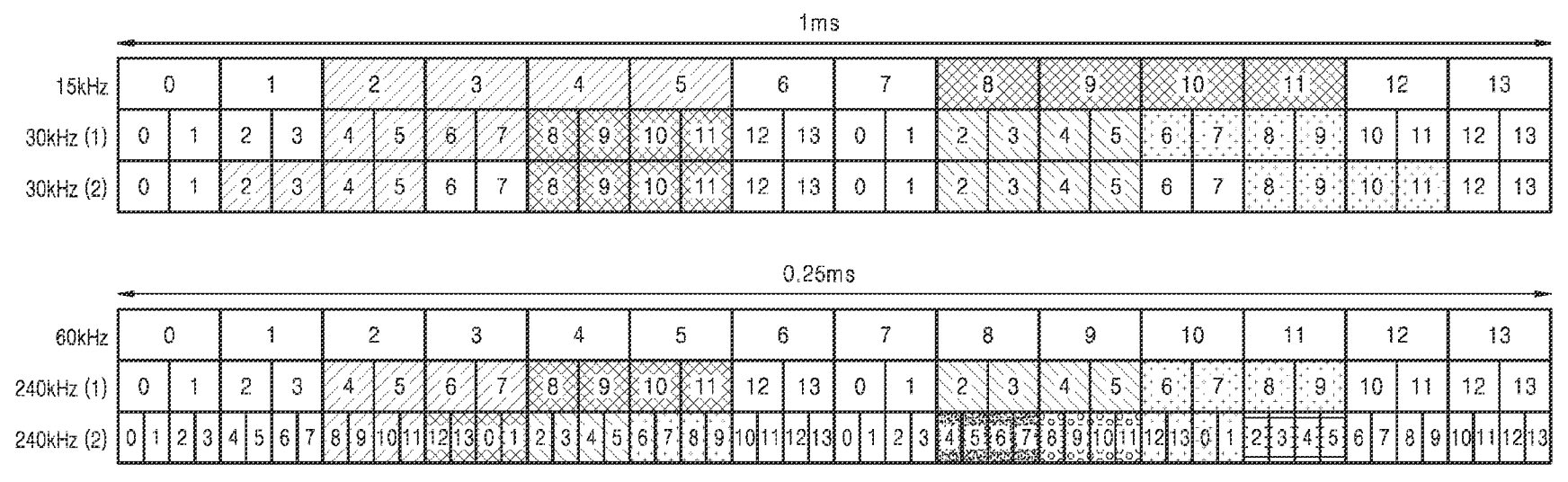
Figure 10B:
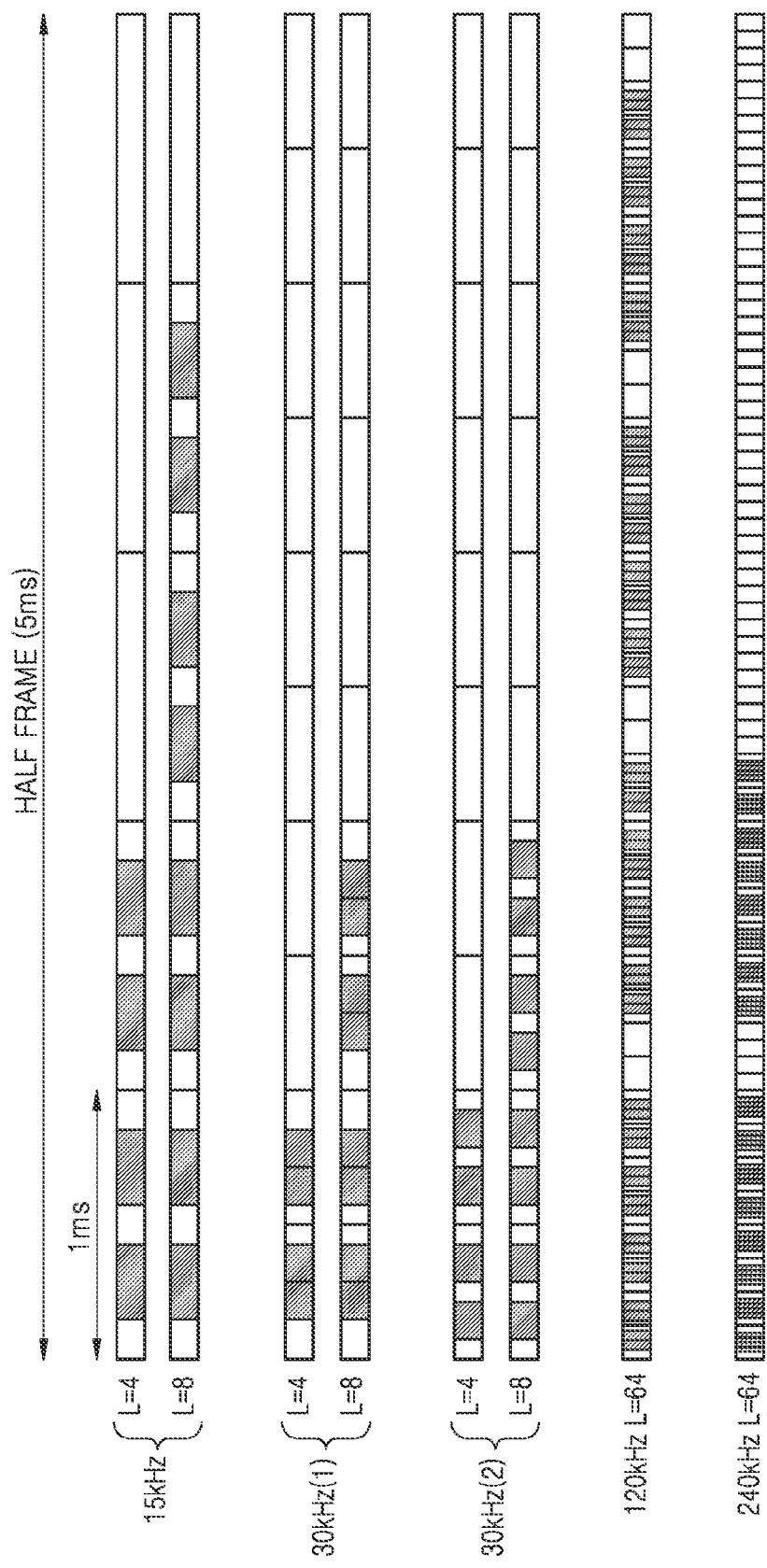
FIG. 10B illustrates positions of symbols available for transmission of an SSB based on subcarrier spacing in a wireless communication system, according to various embodiments of the disclosure.

FIGS. 10A and 10B illustrate positions of symbols available for transmission of an SSB based on subcarrier spacing in a wireless communication system, according to various embodiments of the disclosure. Symbol positions available for transmission of SSBs are illustrated in a period of 1 ms in FIG. 10A and 5 ms in FIG. 10B. An SSB is not always to be transmitted in the region available for transmission of the SSB as shown in FIGS. 10A and 10b, and the SSB may be transmitted by the BS's choice or may not be transmitted.

In a wireless communication system according to various embodiments, the size of a TB may be calculated through the following steps:

Step 1: calculate the number of RES $N_{RE}'$ allocated for PDSCH mapping within a PRB in an allocated resource. $N_{RE}'$ may be calculated to be $N_{RE}'=N_{sc}^{RB} \cdot N_{symb}^{sh} - N_{PMRS}^{PRB} - N_{oh}^{PRB}$. where $N_{sc}^{RB}$ refers to the number of subcarriers (e.g., 12) included in one RB, $N_{symb}^{sh}$ refers to the number of OFDM symbols allocated for a PDSCH, $N_{DMRS}^{PRB}$ refers to the number of REs in one PRB occupied by a DMRS in the same code division multiplexing (CDM) group, and $N_{oh}^{PRB}$ refers to the number of REs (e.g., set to be at least one of 0, 6, 12, or 18) occupied by an overhead in one PRB configured by higher layer signaling. Subsequently, a total number of RES, $N_{RE}$, allocated for the PDSCH may be calculated. $N_{RE}$ is calculated to be $N_{RE}=\min(156, N_{RE}') \cdot n_{PRB}$. $n_{PRB}$ refers to the number of PRBs allocated for the UE.

Step 2: The number of arbitrary information bits $N_{info}$ may be calculated to be $N_{info}=N_{RE} \cdot R \cdot Q_m \cdot v$. R refers to a code rate, Qm refers to a modulation order, and v refers to the number of allocated layers. The code rate and the modulation order may be delivered by using a predetermined corresponding relation with an MCS field included in the control information. A TBS may be calculated according to the following step 3 when $N_{info} \leq 3824$, or otherwise, according to the following step 4.

Step 3: $N_{info}'$ may be calculated with $$N_{info}' = \max\left(24, 2^n \cdot \left\lfloor \frac{N_{info}}{2^n} \right\rfloor\right) \text{ and } n = \max(3, \lfloor \log_2(N_{info}) \rfloor - 6).$$

The TBS may then be determined to be a value nearest to $N_{info}'$ among values not smaller than $N_{info}'$ in Table 5 below.

TABLE 5

| Index | TBS |
|-------|-----|
| 1 | 24 |
| 2 | 32 |
| 3 | 40 |
| 4 | 48 |
| 5 | 56 |
| 6 | 64 |

TABLE 5-continued

| Index | TBS |
| --- | --- |
| 7 | 72 |
| 8 | 80 |
| 9 | 88 |
| 10 | 96 |
| 11 | 104 |
| 12 | 112 |
| 13 | 120 |
| 14 | 128 |
| 15 | 136 |
| 16 | 144 |
| 17 | 152 |
| 18 | 160 |
| 19 | 168 |
| 20 | 176 |
| 21 | 184 |
| 22 | 192 |
| 23 | 208 |
| 24 | 224 |
| 25 | 240 |
| 26 | 256 |
| 27 | 272 |
| 28 | 288 |
| 29 | 304 |
| 30 | 320 |
| 31 | 336 |
| 32 | 352 |
| 33 | 368 |
| 34 | 384 |
| 35 | 408 |
| 36 | 432 |
| 37 | 456 |
| 38 | 480 |
| 39 | 504 |
| 40 | 528 |
| 41 | 552 |
| 42 | 576 |
| 43 | 608 |
| 44 | 640 |
| 45 | 672 |
| 46 | 704 |
| 47 | 736 |
| 48 | 768 |
| 49 | 808 |
| 50 | 848 |
| 51 | 888 |
| 52 | 928 |
| 53 | 984 |
| 54 | 1032 |
| 55 | 1064 |
| 56 | 1128 |
| 57 | 1160 |
| 58 | 1192 |
| 59 | 1224 |
| 60 | 1256 |
| 61 | 1288 |
| 62 | 1320 |
| 63 | 1352 |
| 64 | 1416 |
| 65 | 1480 |
| 66 | 1544 |
| 67 | 1608 |
| 68 | 1672 |
| 69 | 1736 |
| 70 | 1800 |
| 71 | 1864 |
| 72 | 1928 |
| 73 | 2024 |
| 74 | 2088 |
| 75 | 2152 |
| 76 | 2216 |
| 77 | 2280 |
| 78 | 2408 |
| 79 | 2472 |
| 80 | 2536 |
| 81 | 2600 |
| 82 | 2664 |
| 83 | 2728 |
| 84 | 2792 |
| 85 | 2856 |
| 86 | 2976 |
| 87 | 3104 |
| 88 | 3240 |
| 89 | 3368 |
| 90 | 3496 |
| 91 | 3624 |
| 92 | 3752 |
| 93 | 3824 |

Step 4: $N_{info}'$ may be calculated according to $$N_{info}' = \max\left(3840, 2^n \times \text{round}\left(\frac{N_{info} - 24}{2^n}\right)\right) \text{ and } n = \lfloor \log_2(N_{info} - 24) \rfloor - 5.$$

The TBS may then be determined by pseudo codes as in the following Table 6 and the value of $N_{info}'$.

TABLE 6 if $R \leq 1/4$ $$TBS = 8 * C * \left\lceil \frac{N_{info}' + 24}{8 * C} \right\rceil - 24, \text{ where } C = \left\lceil \frac{N_{info}' + 24}{3816} \right\rceil$$

else if $N_{info}' > 8424$ $$TBS = 8 * C * \left\lceil \frac{N_{info}' + 24}{8 * C} \right\rceil - 24, \text{ where } C = \left\lceil \frac{N_{info}' + 24}{8424} \right\rceil$$

else $$TBS = 8 * C * \left\lceil \frac{N_{info}' + 24}{8} \right\rceil - 24$$

end if
end if

When a CB is input to an LDPC encoder, it may be output with parity bits added thereto. In this case, a size of the parity bits may vary depending on an LDCP base graph. According to a rate matching scheme, all parity bits generated by LDPC coding may be fully or partially transmitted. A scheme for processing all the parity bits generated by LDPC coding to be fully delivered may be called full buffer rate matching (FBRM), and a scheme for setting a limit on the number of parity bits available for transmission may be called limited buffer rate matching (LBRM). When resources are allocated for data transmission, an LDPC encoder output is input to a circular buffer, and bits of the buffer are repeatedly transmitted as many times as allocated resources.

Assuming that a length of the circular buffer is $N_{cb}$, and the number of all the parity bits generated by LDPC coding is N, $N_{cb}=N$ in the FBRM method. In the case of LBRM method, it may be determined that $$N_{cb} = \min(N, N_{ref}), N_{ref} = \left\lfloor \frac{TBS_{LBRM}}{C \cdot R_{LBRM}} \right\rfloor,$$

and $R_{LBRM}$ is 2/3. To determine $TBS_{LBRM}$, the aforementioned method of determining a TBS may be used. In this case, C is the number of actual code blocks of a scheduled TB in scheduling. In this case, the number of layers may be assumed to be the maximum number of layers supported by the UE; the modulation order may be assumed to be a highest modulation order when configured for the UE in the cell or to be 64-QAM when not configured; the encoding rate may be assumed to be a peak encoding rate 948/1024;

$N_{RE}$ may be assumed to be $N_{RE}=156 \cdot n_{PRB}$; and $n_{PRB}$ may be assumed to be $n_{PRB}=n_{PRB,\,LBRM}$. $n_{PRB,\,LBRM}$ may be defined as in Table 7 below.

TABLE 7

| Maximum number of PRBs across all configured BWPs of a carrier | $n_{PRB,LBRM}$ |
|---|---|
| Less than 33 | 32 |
| 33 to 66 | 66 |
| 67 to 107 | 107 |
| 108 to 135 | 135 |
| 136 to 162 | 162 |
| 163 to 217 | 217 |
| Larger than 217 | 273 |

In the wireless communication system according to various embodiments, a peak data rate supported by the UE may be determined in Equation 1 below:

[Equation 1]

$$\text{data rate (in Mbps)} = 10^{-6} \cdot \sum_{j=1}^{J} \left( v_{Layers}^{(j)} \cdot Q_m^{(j)} \cdot f^{(j)} \cdot R_{max} \cdot \frac{N_{PRB}^{BW(j),\mu} \cdot 12}{T_s^\mu} \cdot (1 - OH^{(j)}) \right)$$

In Equation 1, J refers to the number of carriers grouped by carrier aggregation (CA), $R_{max}=948/1024$, $v_{Layers}^{(j)}$ is the maximum number of layers of a carrier with index j, Layers $Q_m^{(j)}$ is a highest modulation order of the carrier with index j, $f^{(j)}$ is a scaling coefficient of the carrier with index j, and μ refers to a subcarrier spacing. $f^{(j)}$ may be reported by the UE as one of 1, 0.8, 0.75, and 0.4, and μ may be given as in Table 8 below.

TABLE 8

| μ | $\Delta f = 2^\mu \cdot 15$[kHz] | Cyclic prefix |
|---|---|---|
| 0 | 15 | Normal |
| 1 | 30 | Normal |
| 2 | 60 | Normal, Extended |
| 3 | 120 | Normal |
| 4 | 240 | Normal | where $T_s^\mu$ is an average OFDM symbol length and may be calculated as $$T_s^\mu = \frac{10^{-3}}{14 \cdot 2^\mu},$$

and $N_{PRB}^{BW(j),\mu}$ is the maximum number of RBs in $BW^{(j)}$. $OH^{(j)}$ is an overhead value, which may be given as 0.14 for DL and 0.18 for UL in FR1 (e.g., a band equal to or less than 6 GHz or 7.125 GHZ), and given as 0.08 for DL and 0.10 for UL in FR2 (e.g., a band higher than 6 GHz or 7.125 GHZ). Peak data rates for DL in a cell having 100 MHz frequency bandwidth with 30 KHz subcarrier spacing may be calculated in Equation 1 as in Table 9 below.

TABLE 9

| $f^{(j)}$ | $v_{Layers}^{(j)}$ | $Q_m^{(j)}$ | Rmax | $N_{PRB}^{BW(j),\,\mu}$ | $T_s^\mu$ | $OH^{(j)}$ | data rate |
|---|---|---|---|---|---|---|---|
| 1 | 4 | 8 | 0.92578125 | 273 | 3.57143E−05 | 0.14 | 2337.0 |
| 0.8 | 4 | 8 | 0.92578125 | 273 | 3.57143E−05 | 0.14 | 1869.6 |
| 0.75 | 4 | 8 | 0.92578125 | 273 | 3.57143E−05 | 0.14 | 1752.8 |
| 0.4 | 4 | 8 | 0.92578125 | 273 | 3.57143E−05 | 0.14 | 934.8 |

On the other hand, an actual data rate that may be measured by the UE during actual data transmission may be a value obtained by dividing an amount of data by data transmission time. This may be a TBS in 1-TB transmission, or a value obtained by dividing the sum of TBSs by TTI length in 2-TB transmission. For example, actual peak data rates for DL in the cell having 100 MHz frequency bandwidth with 30 kHz subcarrier spacing may be determined as in Table 10 below based on the number of allocated PDSCH symbols.

TABLE 10

| $N_{symb}^{sh}$ | $N_{DMRS}^{PRB}$ | $N'_{RE}$ | $N_{RE}$ | $N_{info}$ | n | $N'_{info}$ | C | TBS | TTI length (ms) | data rate (Mbps) |
|---|---|---|---|---|---|---|---|---|---|---|
| 3 | 8 | 28 | 7644 | 226453.5 | 12 | 225,280 | 27 | 225,480 | 0.107143 | 2,104.48 |
| 4 | 8 | 40 | 10920 | 323505.0 | 13 | 319,488 | 38 | 319,784 | 0.142857 | 2,238.49 |
| 5 | 8 | 52 | 14196 | 420556.5 | 13 | 417,792 | 50 | 417,976 | 0.178571 | 2,340.67 |
| 6 | 8 | 64 | 17472 | 517608.0 | 13 | 516,096 | 62 | 516,312 | 0.214286 | 2,409.46 |
| 7 | 8 | 76 | 20748 | 614659.5 | 14 | 622,592 | 74 | 622,760 | 0.250000 | 2,491.04 |
| 8 | 8 | 88 | 24024 | 711711.0 | 14 | 704,512 | 84 | 704,904 | 0.285714 | 2,467.16 |
| 9 | 8 | 100 | 27300 | 808762.5 | 14 | 802,816 | 96 | 803,304 | 0.321429 | 2,499.17 |
| 10 | 8 | 112 | 30576 | 905814.0 | 14 | 901,120 | 107 | 901,344 | 0.357143 | 2,523.76 |
| 11 | 8 | 124 | 33852 | 1002865.5 | 14 | 999,424 | 119 | 999,576 | 0.392857 | 2,544.38 |
| 12 | 8 | 136 | 37128 | 1099917.0 | 15 | 1,114,112 | 133 | 1,115,048 | 0.428571 | 2,601.78 |
| 13 | 8 | 148 | 40404 | 1196968.5 | 15 | 1,212,416 | 144 | 1,213,032 | 0.464286 | 2,612.68 |
| 14 | 8 | 160 | 43680 | 1294020.0 | 15 | 1,277,952 | 152 | 1,277,992 | 0.500000 | 2,555.98 |

The peak data rates supported by the UE may be identified in Table 9, and the actual data rates based on the allocated TBS may be identified in Table 10. According to scheduling information, the actual data rate may sometimes be higher than the peak data rate.

In a wireless communication system, the new radio (NR) system in particular, data rates supported by the UE may be agreed between the BS and the UE. It may be calculated using a maximum frequency band, a highest modulation order, the maximum number of layers, etc., which are supported by the UE. However, the calculated data rate may be different from a value calculated from the size of a transport block (TB) (TBS) and TTI length used for actual data transmission. Hence, the UE may be allocated a TBS greater than a value corresponding to the data rate supported by the UE itself, and to prevent this, there may be constraints on the TBS that may be scheduled, depending on the data rate supported by the UE. This needs to be minimized, and defining an operation of the UE on this occasion may be required. Furthermore, when LBRM is applied in a communication system defined by the current NR, $TBS_{LBRM}$ is determined based on the number of layers or ranks supported by the UE, but the procedure is inefficient or obscure for parameter configuration, making it difficult to reliably apply the LBRM in the BS or the UE. Various embodiments of the disclosure to solve this problem will now be described.

Figure 11:
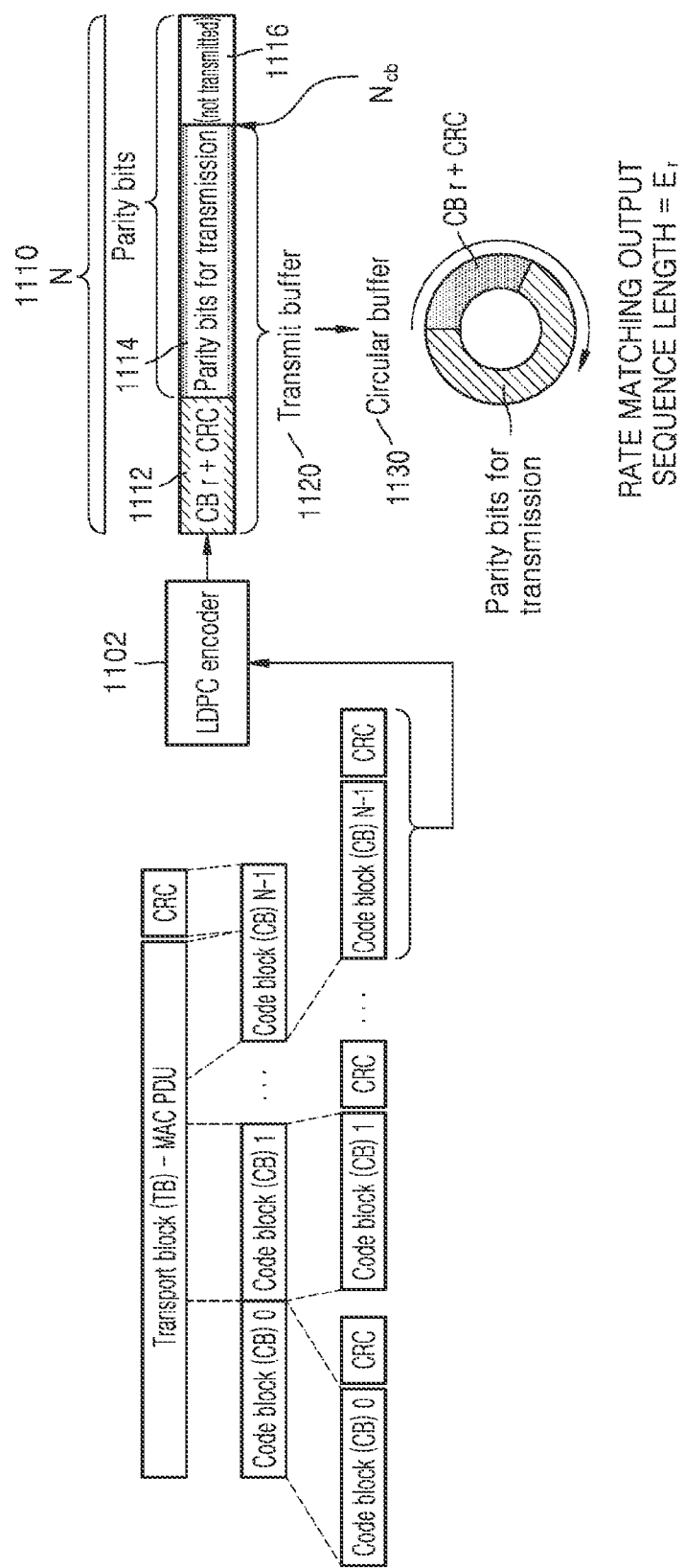
FIG. 11 illustrates generation and transmission of parity bits in a wireless communication system, according to various embodiments of the disclosure.

FIG. 11 illustrates generation and transmission of parity bits in a wireless communication system.

FIG. 11 is an example of a procedure for dividing data for transmission into code blocks, generating parity bits by applying channel coding to the segmented CBs, and determining and transmitting parity bits.

Referring to FIG. 11, one CB is sent to a channel encoder 1102, which in turn generates data bits 1112 and parity bits 1114 and 1116. For example, the channel encoder 1102 may perform encoding with LDPCs, polar codes, or other channel codes. In this case, the size of the parity bits generated may vary depending on the type of the channel codes and details. Assuming that a total length of bits 1110 generated by encoding in the channel encoder 1102 is N bits, when all the parity bits 1114 and 1116 are to be transmitted, a receiver may require a soft buffer or a memory for storing N-bit information received. In a case that the receiver uses a soft buffer having a smaller size than N bits, receiving performance may be degraded.

To reduce a required size of the soft buffer, a method may be used by which non-transmitted parity bits 1116 are determined and not to be transmitted. Specifically, the data bits 1112 and only a portion 1114 of the parity bits are input to the transmit buffer 1120 and forwarded to the circular buffer 1130 (e.g., soft buffer) for transmission. In other words, available parity bits for transmission may be limited, and the limited size may be a sum of the size of data bits 1112 and the portion 1114 of the parity bits, which may be denoted by $N_{cb}$. That $N_{cb}$ is N indicates that available parity bits for transmission is not limited, which means that all the parities generated with the channel codes may be transmitted or received in allocated resources without limitation. As such, a method of handling all the parity bits to be delivered may be called full buffer rate matching (FBRM). On the other hand, in a method by which $N_{cb}$ is determined as $N_{cb}=\min(N, N_{ref})$ and $$N_{ref}N_{ref} = \left\lfloor \frac{TBS_{LBRM}}{C \cdot R_{LBRM}} \right\rfloor,$$

available parity bits for transmission may be limited. As such, the method of setting a limit on the number of available parity bits for transmission is called limited buffer rate matching (LBRM).

In the following embodiments, the BS is an entity that performs resource allocation for the UE, and may be a BS that supports both vehicle to everything (V2X) communication and common cellular communication, or a BS that supports only V2X communication. That is, the BS may refer to a gNB, an eNB, a road site unit (RSU) or a stationary station. The UE may include not only a general user equipment or a mobile station, but also one of a vehicle that supports vehicle-to-vehicle (V2V) communication, a vehicle or a pedestrian's headset (e.g., a smartphone) that supports vehicle-to-pedestrian (V2P) communication, a vehicle that supports vehicle-to-network (V2N) communication, a vehicle that supports vehicle-to-infrastructure (V2I) communication, an RSU equipped with a UE function, an RSU equipped with a BS function, or an RSU equipped with part of the BS function and a part of the UE function.

In a V2X environment, data may be transmitted from a single UE to a plurality of UEs, or data may be transmitted from one UE to another UE. Alternatively, data may be transmitted from a BS to a plurality of UEs. The disclosure is not, however, limited thereto, and may be applied to various other cases.

In order for the UE to perform sidelink transmission or reception, the UE operates based on a resource pool predefined, configured or pre-configured between UEs. The resource pool may be a set of frequency and time domain resources available for transmission or reception of sidelink signals. In other words, for transmission or reception of sidelink signals, sidelink signals needs to be transmitted or received in predefined frequency-time resources, and such resources are defined as the resource pool. Resource pools may be defined separately for transmission and reception, or a resource pool may be defined to be shared for transmission and reception. Furthermore, the UEs may be configured with one or multiple resource pools to transmit or receive sidelink signals. Configuration information for a resource pool used for sidelink transmission or reception and other configuration information for sidelink may be pre-installed when the UE is manufactured, configured by the current BS, pre-configured by another BS or another network unit before the UE accesses the current BS, fixed, provisioned by a network, or self-constructed by the UE itself.

To indicate frequency domain resources in the resource pool, the BS may indicate a start index and a length (e.g., the number of PRBs) of PRBs belonging to the resource pool, but may not be limited thereto and may configure a resource pool by indicating PRBs by using a bitmap. Furthermore, to indicate time domain resources in the resource pool, the BS may indicate indexes of OFDM symbols or slots belonging to the resource pool based on a bitmap. Alternatively, according to another method, the system may use an equation for a set of particular slots and define slots that satisfy the equation as belonging to the resource pool. In configuring time resource resources, for example, the BS may use a bitmap to indicate which ones of slots during a specific period of time belong to a particular resource pool, in which case, whether the time resource corresponds to the resource pool in every period of time may be indicated according to the bitmap.

In the meantime, a sub-channel may be defined to be a frequency resource unit including multiple RBs. In other words, the sub-channel may be defined as integer multiple RBs. The sizes of sub-channels may be set to be the same or be different, and it is common for one sub-channel to have successive PRBs, without being limited thereto. The sub-channel may be a basic unit for resource allocation for a PSSCH or a PSCCH. Accordingly, the sub-channel size may be differently set depending on whether the channel is the PSSCH or the PSCCH. Furthermore, the term sub-channel may be replaced by other terms such as a resource block group (RBG), a set of RBGs, a set of PRBs, etc.

For example, higher layer signaling or configuration information 'startRBsub-channel' may indicate a start position of the sub-channel in frequency in the resource pool. For example, a resource block, which is a frequency resource belonging to a resource pool for a PSSCH in an LTE V2X system, may be determined in a method as in Table 11 below.

TABLE 11

The resource block pool consists of $N_{subCH}$ sub-channels where $N_{subCH}$ is given by higher layer parameter numSubchannel.
The sub-channel m for m = 0, 1, . . . , $N_{subCH}$−1 consists of a set of $n_{subCHsize}$ contiguous resource blocks with the physical resource block number $n_{PRB} = n_{subCHRBstart} + m * n_{subCHsize} + j$ for j = 0, 1, . . . , $N_{subCH}$−1 where $n_{subCHRBstart}$ and $n_{subCHsize}$ are given by higher layer parameters startRBSubchannel and sizeSubchannel, respectively Granularity in resource allocation in time to configure a resource pool may be a slot. Although the resource pool is illustrated in non-successively allocated slots in time in the disclosure, the resource pool may be allocated successively in time, or may be configured based on a symbol unit or a unit made up with multiple symbols (e.g., a mini-slot).

In another example, when higher layer signaling or configuration information 'startSlot' indicates a start position of a slot in time in the resource pool, subframes ($t_0^{SL}$, $t_1^{SL}$, . . . , $t_{T_{max}}^{SL}$ ( )), which are time resources belonging to a resource pool for a PSSCH in an LTE V2X system, may be determined in a method as in Table 12 below.

TABLE 12

● $0 \leq t_i^{SL} < 10240$,
● the subframe index is relative to subframe#0 of the radio frame corresponding to SFN 0 of the serving cell or DFN 0 (described in [11]),
● the set includes all the subframes except the following subframes,
  ■ subframes in which SLSS resource is configured,
  ■ downlink subframes and special subframes if the sidelink transmission occurs in a TDD cell,
  ■ reserved subframes which are determined by the following steps:
    1) the remaining subframes excluding $N^{slss}$ and $N^{dssf}$ subframes from the set of all the subframes are denoted by ($l_0, l_1, \ldots, l(10240 - N_{slss} - N_{dssf} - 1)$ arranged in increasing order of subframe index,
    where $N_{slss}$ is the number of subframes in which SLSS resource is configured within 10240 subframes and $N_{dssf}$ is the number of downlink subframes and special subframes within 10240 subframes if the sidelink transmission occurs in a TDD cell.
    2) a subframe $l_r$ ($0 \leq r < (10240 - N_{slss} - N_{dssf})$) belongs to the reserved
    subframes if $r = \left\lfloor \frac{m \cdot (10240 - N_{slss} - N_{dssf})}{N_{reserved}} \right\rfloor$ where m = 0, . . . , $N_{reserved} - 1$
    and $N_{reserved} = (10240 - N_{slss} - N_{dssf}) \bmod L_{bitmap}$. Here, $L_{bitmap}$ the length
    of the bitmap is configured by higher layers.
● the subframes are arranged in increasing order of subframe index.
● A bitmap ($b_0, b_1, \ldots, b_{L_{bitmap}-1}$) associated with the resource pool is used where $L_{bitmap}$ the length of the bitmap is configured by higher layers.
● A subframe $t_k^{SL}$ ($0 \leq k < (10240 - N_{slss} - N_{dssf} - N_{reserved})$) belongs
to
the subframe pool if $b_{k'} = 1$ where k' = k mod $L_{bitmap}$.

According to a procedure of Table 12, which ones of slots during a certain period of time (subframes in Table 14) except for at least one slot used for DL, belong to a resource pool is indicated, and among the slots indicated as belonging to the resource pool, which slot is actually included in the resource pool and used for sidelink transmission or reception is indicated according to the bitmap information.

A sidelink control channel may be called a physical sidelink control channel (PSCCH), and a sidelink shared channel or data channel may be called a physical sidelink shared channel (PSSCH). A broadcast channel broadcast along with a synchronization signal may be called a physical sidelink broadcast channel (PSBCH), and a channel for feedback transmission may be called a physical sidelink feedback channel (PSFCH). For the feedback transmission, however, the PSCCH or PSSCH may be used. Depending on the communication system, the channels may be called an LTE-PSCCH, an LTE-PSSCH, an NR-PSCCH, an NR-PSSCH, etc. In the disclosure, sidelink may refer to a link between UEs, and Uu link may refer to a link between the BS and the UE.

Information transmitted in sidelink may include sidelink control information (SCI), sidelink feedback control information (SFCI), sidelink channel state information (SCSI), and a sidelink shared channel (SL-SCH), which is a transmission channel.

The aforementioned information and transmission channel may be mapped to a physical channel as in Table 13 and Table 14 below.

TABLE 13

| TrCH (Transport channel) | Physical Channel |
| --- | --- |
| SL-SCH | PSSCH |

TABLE 14

| Control information | Physical Channel |
| --- | --- |
| SCI | PSCCH |
| SFCI | PSFCH |
| SCSI | PSSCH |

Alternatively, when the SCSI is transmitted in the PSFCH, transmission channel-physical channel mapping as in Table 15 and Table 16 below may be applied.

TABLE 15

| TrCH (Transport channel) | Physical Channel |
| --- | --- |
| SL-SCH | PSSCH |

TABLE 16

| Control information | Physical Channel |
| --- | --- |
| SCI | PSCCH |
| SFCI | PSFCH |
| SCSI | PSFCH |

Alternatively, when the SCSI is sent to a higher layer, e.g., using an MAC CE, it may be transmitted in the PSSCH because the higher layer signaling corresponds to the SL-SCH, and transmission channel-physical channel mapping as in Table 17 and Table 18 below may be applied.

TABLE 17

| TrCH (Transport channel) | Physical Channel |
|---|---|
| SL-SCH | PSSCH |

TABLE 18

| Control information | Physical Channel |
|---|---|
| SCI | PSCCH |
| SFCI | PSFCH |

When sidelink CSI is transmitted in an MAC CE, the receiving UE may also send at least one of the following pieces of additional information to the transmitting UE:
- information about a slot in which a sidelink CSI-RS used when CSI is measured is transmitted, i.e., information about a time at which the sidelink CSI-RS is transmitted
- information about a frequency region in which CSI is measured, i.e., information about a frequency region in which the sidelink CSI-RS is transmitted. It may include e.g., an index of a sub-channel.
- information about a rank indicator (RI) and a channel quality indicator (CQI)
- information about a preferred precoding matrix
- information about preferred beamforming
- ID information of a receiving UE having received the sidelink CSI-RS
- ID information of a transmitting UE having transmitted the sidelink CSI-RS
- ID information of a transmitting UE that transmits the sidelink CSI feedback information
- ID information of a receiving UE that receives the sidelink CSI feedback information FIG. 12A illustrates groupcast transmission in a wireless communication system, according to various embodiments of the disclosure.

Figure 12A:
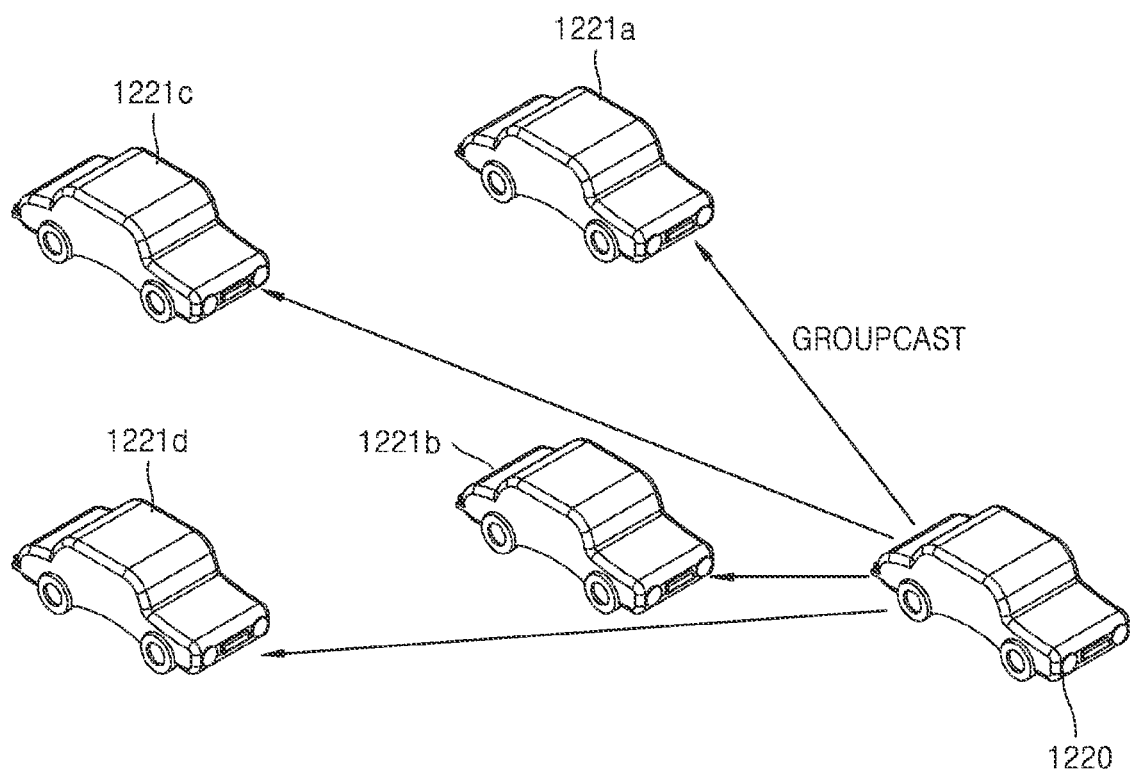
FIG. 12A illustrates groupcast transmission in a wireless communication system, according to various embodiments of the disclosure.

Referring to FIG. 12A, a UE 1220 transmits common data to a plurality of UEs 1221a, 1221b, 1221c, and 1221d, i.e., transmits data in a groupcast method. The UE 1220 and the UEs 1221a, 1221b, 1221c, and 1221d may be moving devices such as vehicles. For groupcast, at least one of extra control information (e.g., SCI), a physical control channel (e.g., a PSCCH) or data may further be transmitted.

Figure 12B:
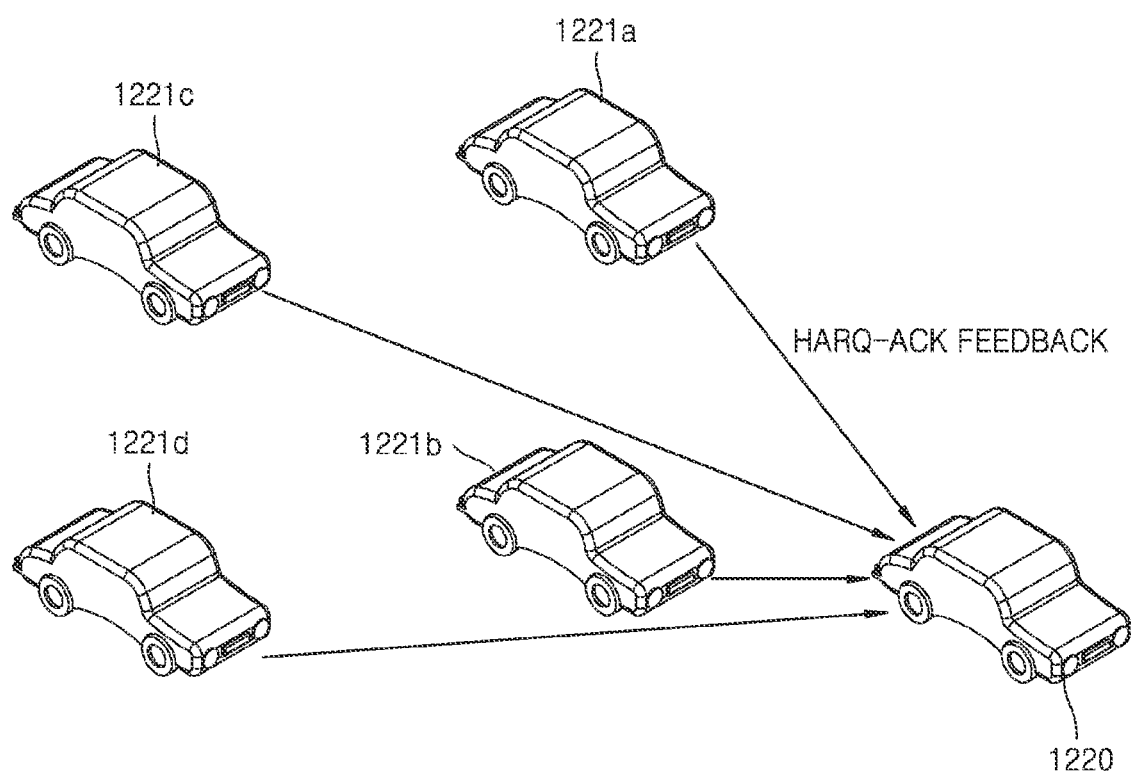
FIG. 12B illustrates hybrid automatic repeat request (HARQ) feedback transmission based on groupcast in a wireless communication system, according to various embodiments of the disclosure.

FIG. 12B illustrates HARQ feedback transmission based on groupcast in a wireless communication system, according to various embodiments of the disclosure.

Referring to FIG. 12B, the UEs 1221a, 1221b, 1221c, and 1221d that have received the common data by groupcast transmit information indicating success or failure of data reception to the UE 1220 that transmitted the data. The information indicating the success or failure of data reception may include HARQ-ACK feedback. Data transmission and feedback operations as in FIGS. 12A and 12B were performed based on groupcast. In some other embodiments, however, the data transmission and feedback operations as in FIGS. 12A and 12B may also be applied to unicast based transmission.

Figure 13:
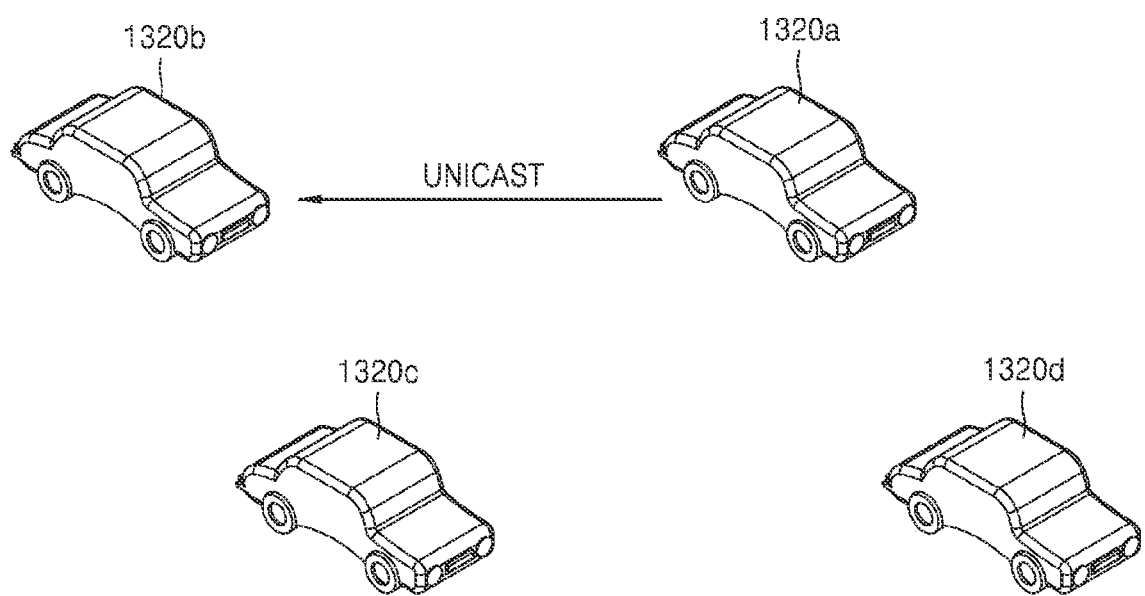
FIG. 13 illustrates unicast transmission in a wireless communication system, according to various embodiments of the disclosure.

FIG. 13 illustrates unicast transmission in a wireless communication system, according to various embodiments of the disclosure.

Referring to FIG. 13, a first UE 1320a transmits data to a second UE 1320b. In another example, the direction of data transmission may be opposite (e.g., from the second UE 1320b to the first UE 1320a). UEs 1320c and 1320d other than the first UE 1320a and the second UE 1320b are unable to receive data transmitted or received in the unicast method between the first UE 1320a and the second UE 1320b. Data transmission or reception through unicast between the first UE 1320a and the second UE 1320b may be mapped in resources agreed between the first UE 1320a and the second UE 1320, scrambled by a value agreed with each other, or transmitted using a preset value. Alternatively, control information relating to data by unicast between the first UE 1320a and the second UE 1320b may be mapped in a method agreed with each other. Alternatively, data transmission or reception by unicast between the first UE 1320a and the second UE 1320b may include an operation of identifying each other's unique ID. The UEs may be moving devices such as vehicles. At least one of extra control information, a physical control channel, or data may further be transmitted for unicast.

Figure 14A:
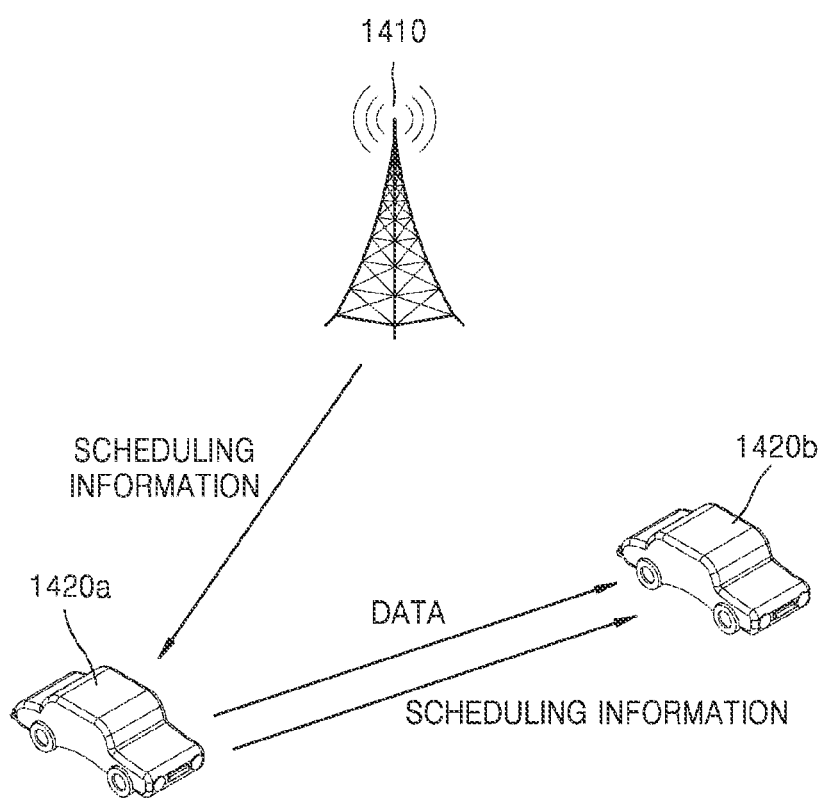
FIG. 14A illustrates sidelink data transmission based on scheduling from a BS in a wireless communication system, according to various embodiments of the disclosure.

FIG. 14A illustrates sidelink data transmission based on scheduling from a BS in a wireless communication system, according to various embodiments of the disclosure.

In FIG. 14A, mode 1 in which a UE that has received scheduling information from a BS transmits sidelink data is illustrated. A method of performing sidelink communication based on scheduling information is called the mode 1 in the disclosure, but a different name may be used to refer to the method. Referring to FIG. 14A, a UE 1420a that is going to transmit sidelink data (hereinafter, referred to as a transmitting UE) receives scheduling information for sidelink communication from a BS 1410. The transmitting UE 1420a that has received the scheduling information transmits sidelink data to another UE 1420b (hereinafter, referred to as a receiving UE) based on the scheduling information. The scheduling information for sidelink communication may be included in DCI, and the DCI may include at least one of items as in Table 19 below.

TABLE 19

| item | description |
|---|---|
| Carrier indicator | Used to schedule sidelink on different carrier when carrier aggregation (CA) is applied |
| Lowest index of sub-channel allocation for initial transmission | Used for frequency resource allocation for initial transmission |
| Information to be included in sidelink control information | Frequency resource allocation information. Include resource allocation or resource reservation information for initial transmission, retransmission and subsequent N-th transmission. Time gap information between initial transmission and retransmission |
| Information about sidelink slot structure | Include information about which slot and which symbols are used for sidelink |
| HARQ-ACK/CSI feedback timing information | Include timing information for transmit HARQ-ACK or CSI feedback in sidelink to base station |
| Receiver ID | ID information about what UE is to receive |
| QoS (quality of service) information of priority or the like | Information about what priority of data is used for data transmission |

Scheduling may be performed for one-time sidelink transmission or for periodic transmission, semi-persistent scheduling (SPS) or configured grant transmission. A scheduling method may be identified with an indicator included in the DCI, an RNTI by which to scramble CRC added to the DCI, or an ID value. The DCI for sidelink transmission may further include padding bits (e.g., 0's) to have the same size as other DCI formats such as DCI for DL scheduling or UL scheduling.

The transmitting UE 1420*a* receives DCI for sidelink scheduling from the BS 1410, transmits a PSCCH including the sidelink scheduling information to the receiving UE 1420*b*, and then transmits a PSSCH which is data corresponding to the PSCCH. The PSCCH, which is the sidelink scheduling information, includes SCI, and the SCI may include at least one of items as in Table 20 below.

TABLE 20

| item | description |
| --- | --- |
| HARQ process number | HARQ process ID for HARQ related operation of data for transmission |
| NDI (new data indicator) | Information about whether current transmission data is new data |
| RV (redundancy version) | Information about which parity bit is sent when data is channel-coded and mapped |
| Layer-1 source ID | Transmitting UE ID information in physical layer |
| Layer-1 destination ID | Receiving UE ID information in physical layer |
| Frequency-domain resource assignment for scheduling PSSCH | Frequency band resource configuration information of data for transmission |
| MCS | Modulation order and coding rate information |
| QoS indication | Include priority, target latency/delay, target distance, target error rate, etc. |
| Antenna port(s) | Antenna port information for data transmission |
| DMRS sequence initialization | Include information such as ID value for initialization of DMRS sequence |
| PTRS-DMRS association | Include information about PTRS mapping |
| CBGTI | Indicator for retransmission of CBG unit |
| Resource reservation | Information for resource reservation |
| Time gap between initial transmission and retransmission | Time gap information between initial transmission and retransmission |
| Retransmission index | Indicator identifying retransmission |
| Transmission format/cast type indicator | Indicator identifying transmission format or unicast/groupcast/broadcast |
| Zone ID | Position information of transmitting UE |
| NACK distance | Reference indicator determining whether receiving UE transmits HARQ-ACK/NACK |
| HARQ feedback indication | Indicate whether HARQ feedback is to be transmitted or is being transmitted |
| Time-domain resource assignment for scheduling PSSCH | Time domain resource information of sidelink data for transmission |
| Second SCI indication | Indicator including mapping information of second SCI in case of two step control information |
| DMRS pattern | DMRS pattern (e.g., symbol position to which DMRS is mapped) information |

Figure 14B:
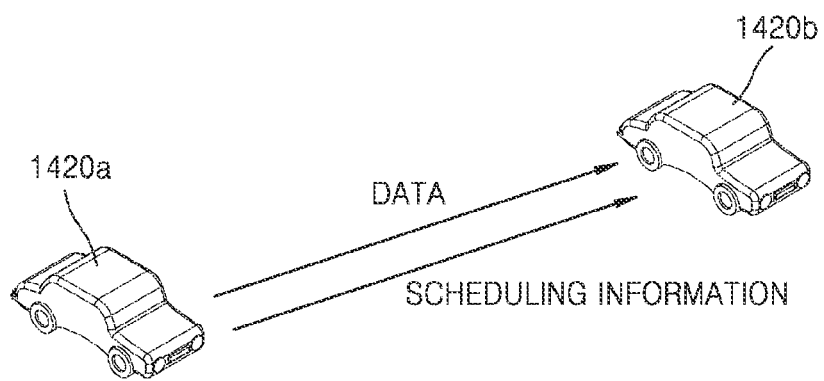
FIG. 14B illustrates sidelink data transmission without scheduling from a BS in a wireless communication system, according to various embodiments of the disclosure.

Control information including at least one of the items as in Table 20 may be included in one piece of SCI or two pieces of SCI to be sent to the receiving UE. The method of transmission divided into two pieces of SCI may be referred to as 2-stage SCI. FIG. 14B illustrates sidelink data transmission without scheduling from a BS in a wireless communication system, according to various embodiments of the disclosure. In FIG. 14B, mode 2 in which a UE transmits sidelink data without receiving scheduling information from a BS is illustrated. A method of performing sidelink communication without scheduling information is called the mode 2 in the disclosure, but a different name may be used to refer to the method. The UE 1420*a* that is going to transmit sidelink data may transmit sidelink scheduling control information and sidelink data to the receiving UE 1420*b* at its discretion without scheduling from the BS. In this case, for the sidelink scheduling control information, SCI in the same format as the SCI used in the mode 1 sidelink communication may be used. For example, the scheduling control information may include at least one of items as in Table 20.

Figure 15:
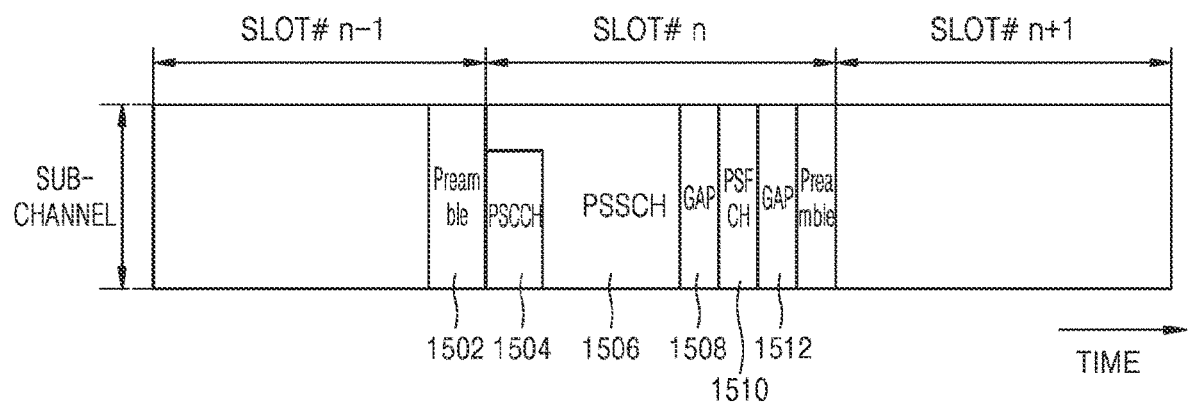
FIG. 15 illustrates a channel structure of slots used for sidelink communication in a wireless communication system, according to various embodiments of the disclosure.

FIG. 15 illustrates a channel structure of slots used for sidelink communication in a wireless communication system, according to various embodiments of the disclosure. In FIG. 15, physical channels mapped to slots for sidelink communication are illustrated. Referring to FIG. 15, a preamble 1502 is mapped to a portion before a start of a slot, i.e., an end of the previous slot. After this, from the start of the slot, a PSCCH 1504, a PSSCH 1506, a gap 1508, a PSFCH 1510, and a gap 1512 are mapped.

Before transmitting a signal in the slot, the transmitting UE transmits the preamble 1502 in one or more symbols. The preamble may be used to correctly perform automatic gain control (AGC) for controlling strength of amplification when the receiving UE amplifies power of a received signal. Furthermore, the preamble may or may not be transmitted depending on whether the transmitting UE transmits in a previous slot. Specifically, when the transmitting UE transmits a signal to the same UE within a slot (e.g., slot #n−1) before the current slot (e.g., slot #n), transmission of the preamble 1502 may be skipped. The preamble 1502 may be called a synchronization signal, a sidelink synchronization signal, a sidelink reference signal, a midamble, an initial signal, a wake-up signal, or other terms having the same meaning in the technical sense.

The PSCCH 1504 including control information may be transmitted in early symbols of the slot, and then PSSCH 1506 scheduled by the control information of the PSCCH 1504 may be transmitted. At least a portion of SCI, which is the control information, may be mapped to the PSCCH 1504. The gap 1508 comes after this, and the PSFCH 1510, a physical channel for transmitting feedback information is mapped.

The UE may be pre-configured with the position of a slot that may transmit the PSFCH. The pre-configuration may be predetermined in the process of manufacturing the UE, delivered when the UE accesses a sidelink related system, delivered from a BS when connected to the BS, or delivered from another UE.

Referring to FIG. 15, the PSFCH 1510 is shown as being located in a last portion of the slot. By securing a certain empty period of time between the PSSCH 1506 and the PSFCH 1510, i.e., the gap 1508, the UE that has transmitted or received the PSSCH 1506 is able to be prepared (e.g., switched) to receive or transmit the PSFCH 1510. A gap 1512, a certain empty period of time comes after the PSFCH 1510.

Figure 16A:
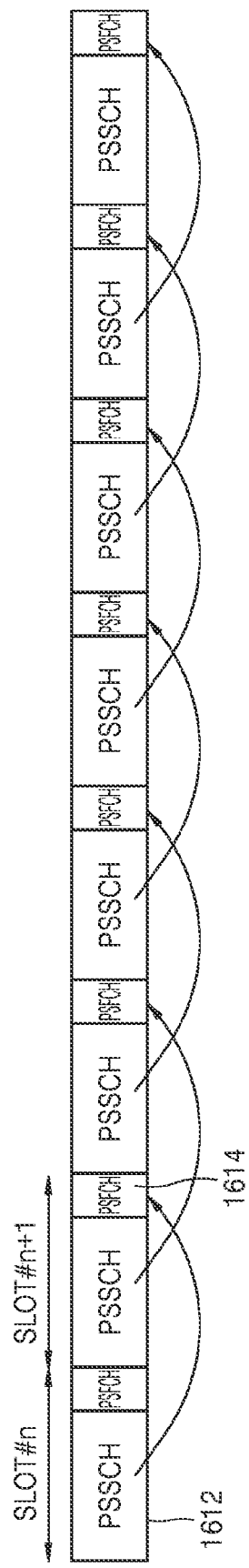
FIG. 16A illustrates a first example of feedback channel distributions in a wireless communication system, according to various embodiments of the disclosure.

FIG. 16A illustrates a first example of feedback channel distributions in a wireless communication system, according to various embodiments of the disclosure.

In FIG. 16A, shown is an occasion when a resource for transmitting or receiving a PSFCH is allocated in each slot. An arrow in FIG. 16A indicates a slot for a PSFCH in which HARQ-ACK feedback information corresponding to a PSSCH is transmitted. Referring to FIG. 16A, the HARQ-ACK feedback information for the PSSCH 1612 transmitted in slot #n is transmitted in the PSFCH 1614 in slot #n+1. As the PSFCH is allocated for every slot, the PSFCH may correspond to a slot including the PSSCH one to one. For example, when periodicity of a resource available for transmission or reception of the PSFCH is set according to a parameter such as 'periodicity_PSFCH_resource', periodicity_PSFCH_resource indicates one slot in FIG. 16A. Alternatively, the periodicity is set based on msec, and may be indicated with a value allocated for each slot depending on SCS.

Figure 16B:
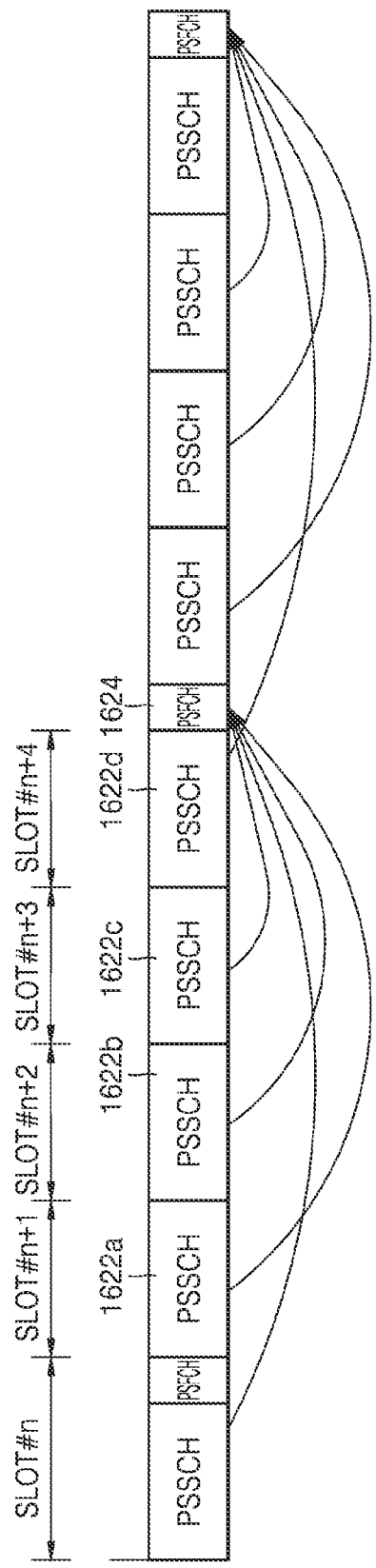
FIG. 16B illustrates a second example of feedback channel distributions in a wireless communication system, according to various embodiments of the disclosure.

FIG. 16B illustrates a second example of feedback channel distributions in a wireless communication system, according to various embodiments of the disclosure.

In FIG. 16B, shown is an occasion when a resource for transmitting or receiving a PSFCH is allocated for every 4 slots. An arrow in FIG. 16B indicates a slot for a PSFCH in which HARQ-ACK feedback information corresponding to a PSSCH is transmitted. Referring to FIG. 16B, only the last of four slots includes a PSFCH. Similarly, only the last of the next 4 slots includes the PSFCH. Accordingly, HARQ-ACK feedback information for a PSSCH 1622a in slot #n, a PSSCH 1622b in slot #n+1, a PSSCH 1622c in slot #n+2, and a PSSCH 1622d in slot #n+3 is transmitted in a PSFCH 1624 in slot #4. The indexes of the slots may be indexes for slots included in the resource pool. Specifically, the four slots are not actually physically successive slots, but may be slots located in sequence among slots included in the resource pool (or slot pool) used for sidelink communication between UEs. The reason that HARQ-ACK feedback information of the PSSCH transmitted in the fourth slot is not allowed to be transmitted in the PSFCH in the same slot may be because time is not long enough for the UE to complete decoding the PSSCH transmitted in the slot and then transmit the PSFCH in the same slot.

Transmission or reception may be correctly performed when the UE is aware of the number of bits of HARQ-ACK feedback included in the PSFCH when transmitting or receiving the PSFCH. The number of bits of HARQ-ACK feedback included in the PSFCH and for which PSSCH the HARQ-ACK bits are to be included may be determined based on one or more combinations of items represented in Table 21 below.

TABLE 21

| Item |
| --- |
| Periodicity of slot for transmit or receive PSFCH based on parameter periodicity_PSFCH_resource |
| Whether to perform bundling of HARQ-ACK, which may be a value determined by AND operation on HARQ-ACK bits of PSFCH transmitted in a certain number of slots before transmission or reception of PSFCH (i.e., even with one NACK, it is determined as NACK) |
| The number of transport blocks (TBs) included in PSSCH |
| Whether to use and configure code block group (CBG) based retransmission |
| Whether to activate HARQ-ACK feedback |
| The number of PSSCHs actually transmitted or received |
| Minimum processing time of UE to prepare PSSCH processing and PSFCH transmission |

When a resource available for transmitting the PSFCH in slot #n+x is configured or given for the UE having received the PSSCH in slot #n, the UE uses the smallest x of integers equal to or greater than K and uses the PSFCH in slot #n+x to transmit the HARQ-ACK feedback information for the PSSCH. K may be a value preset by the transmitting UE or a value set in the resource pool in which the PSSCH or the PSFCH is transmitted. To set K, each UE may exchange its capability information with the transmitting UE in advance. For example, K may be determined according to at least one of SCS, UE capability, a value set with the transmitting UE, or a configuration of the resource pool.

In an NR sidelink system, a method by which the transmitting UE does not reserve a resource for initially transmitting a TB but senses and selects the resource may be supported for operations of the mode 2. In the meantime, as a method of reserving the resource for initial transmission, a method of reserving the resource by using SCI for another TB may be supported, and this function may be enabled/disabled by (pre-) configuration (i.e., SCI1 for controlling transmission of TB1 may reserve the resource for initial transmission of TB2). For example, when the function is enabled, reservation interval information is configured in SCI1 when the previous TB (TB1) is transmitted, and the same frequency resource as the resource selected to transmit the previous TB (TB1) may be reserved for initial transmission of TB2 after a time interval set as the reservation interval.

As another method of reserving the initial transmission resource, a method of reserving the resource for initial resource transmission for the TB using SCI through stand-alone PSCCH transmission may be considered in addition to the method of reserving the resource using SCI for controlling another TB as described above.

Furthermore, a retransmission resource for the same one TB may be reserved using SCI in the initial transmission while the initial transmission is performed. In this case, information about a time gap between initial transmission and retransmission and frequency allocation information for the same TB may be transmitted in the SCI. For this, two methods may be considered: a first method by which frequency allocation sizes for resources of initial transmission and retransmission for the same TB are supported to be always constant and a second method by which changes in frequency allocation size for resources of initial transmission and retransmission are allowed. In general, the allowing of changes in frequency allocation size for resources of initial transmission and retransmission may have an advantage of selecting resources more flexibly, but make it complicated to indicate reservation information of retransmission resources in SCI including information about the retransmission resources and reduce performance of the SCI (e.g., SCI coverage may decrease or reception error rate may increase) because the number of bits transmitted in SCI increases. On the contrary, in the case of supporting the frequency allocation size for resources of initial transmission and retransmission to be always constant, resource allocation may be less flexible but there are advantages in that indication of reservation information of retransmission resources in SCI may be simple and SCI performance may be secured by reducing the number of bits transmitted in SCI. Accordingly, the aforementioned two methods each have pros and cons.

As a method of complementing the pros and cons of the two methods (i.e., a method of allowing changes in frequency allocation size for resources of initial transmission and retransmission while supporting, as simply as possible, a method of indicating reservation for retransmission resources through SCI for the same one TB during initial transmission), a method by which the initial transmission resources are fixedly transmitted in X sub-channels and associated retransmission resources are allowed to be transmitted in one or more sub-channels may be considered. According to this method, the frequency allocation size of initial transmission resources is fixed to be always constant, so only the frequency allocation size for retransmission resources needs to be indicated in SCI. When there are one or more retransmission resources reserved for the same TB, the frequency allocation size of all retransmission resources may be equally limited. Furthermore, a method of limiting the number X of sub-channels for initial transmission resources to one sub-channel (i.e., limiting X to 1) may be considered. What are described above is merely an example, and in embodiments of the disclosure, the value of X is not always limited to 1 but may be variously set. In a case that the initial transmission resource is fixedly transmitted in X sub-channels, the PSCCH and the PSSCH may be transmitted in X sub-channels, in which case SCI transmitted in the PSCCH may reserve a retransmission resource and in this case, Y sub-channels may be allocated as the size of sub-channels for the retransmission resource.

In a case that two methods are considered: a method by which the frequency allocation size is supported to be always constant for resources of initial transmission and retransmission for the same TB in the NR sidelink system (hereinafter, a first method) and a method by which the initial transmission resource is fixedly transmitted in X sub-channels and associated retransmission resources may be transmitted in one or more sub-channels (hereinafter, a second method), which one of the two methods is used may be indicated in 1-bit information in SCI. This is to interpret the resource reservation information included in SCI. The resource reservation information included in SCI will now be suggested in more detail in a case of considering the two methods. An example of a method of indicating reservation information for resources of initial transmission and one-time retransmission for the TB will now be described.

Figure 17A:
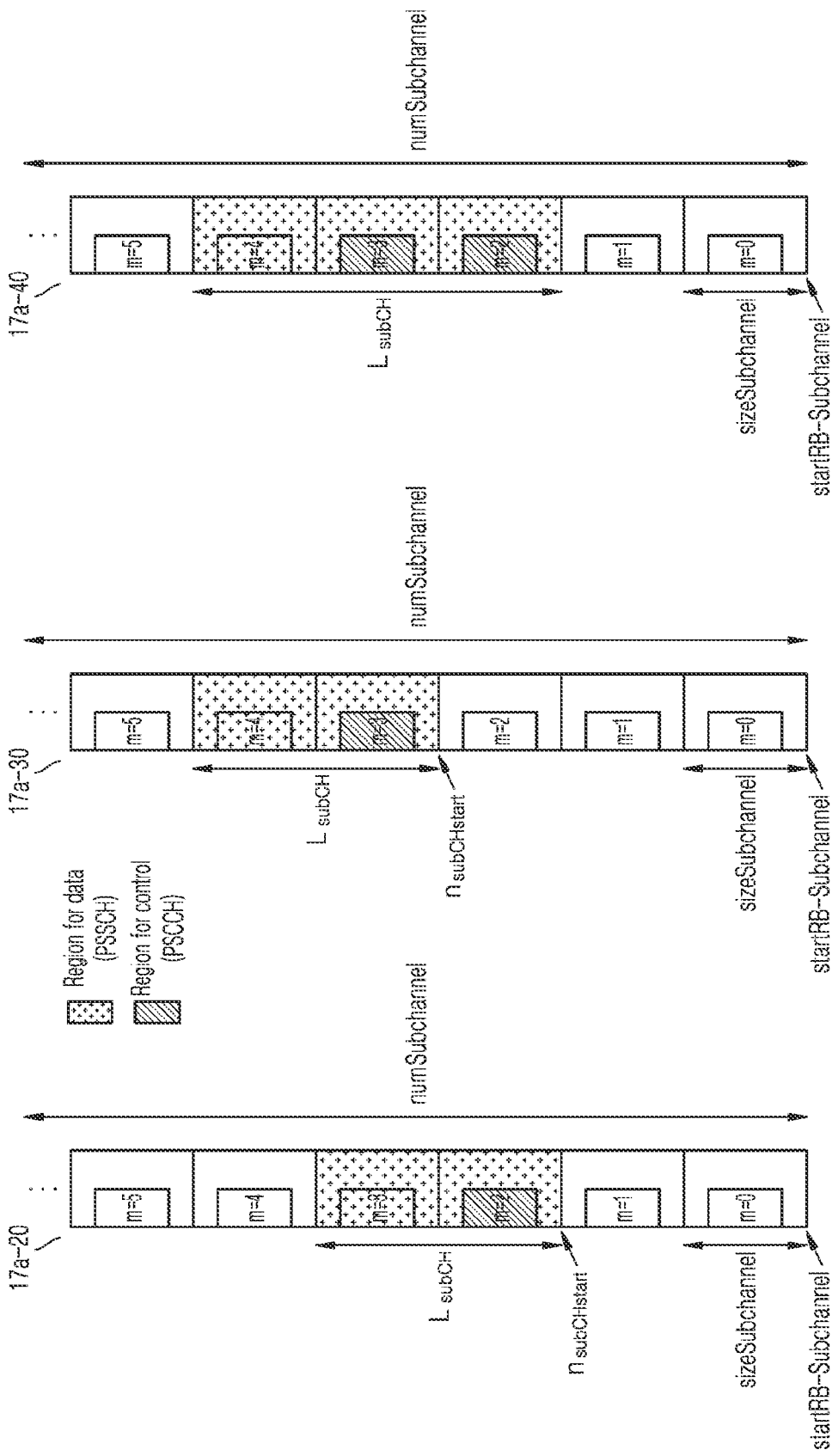
FIG. 17A illustrates methods by which resources for a PSSCH are allocated on a sub-channel basis, according to an embodiment of the disclosure.
Figure 17B:
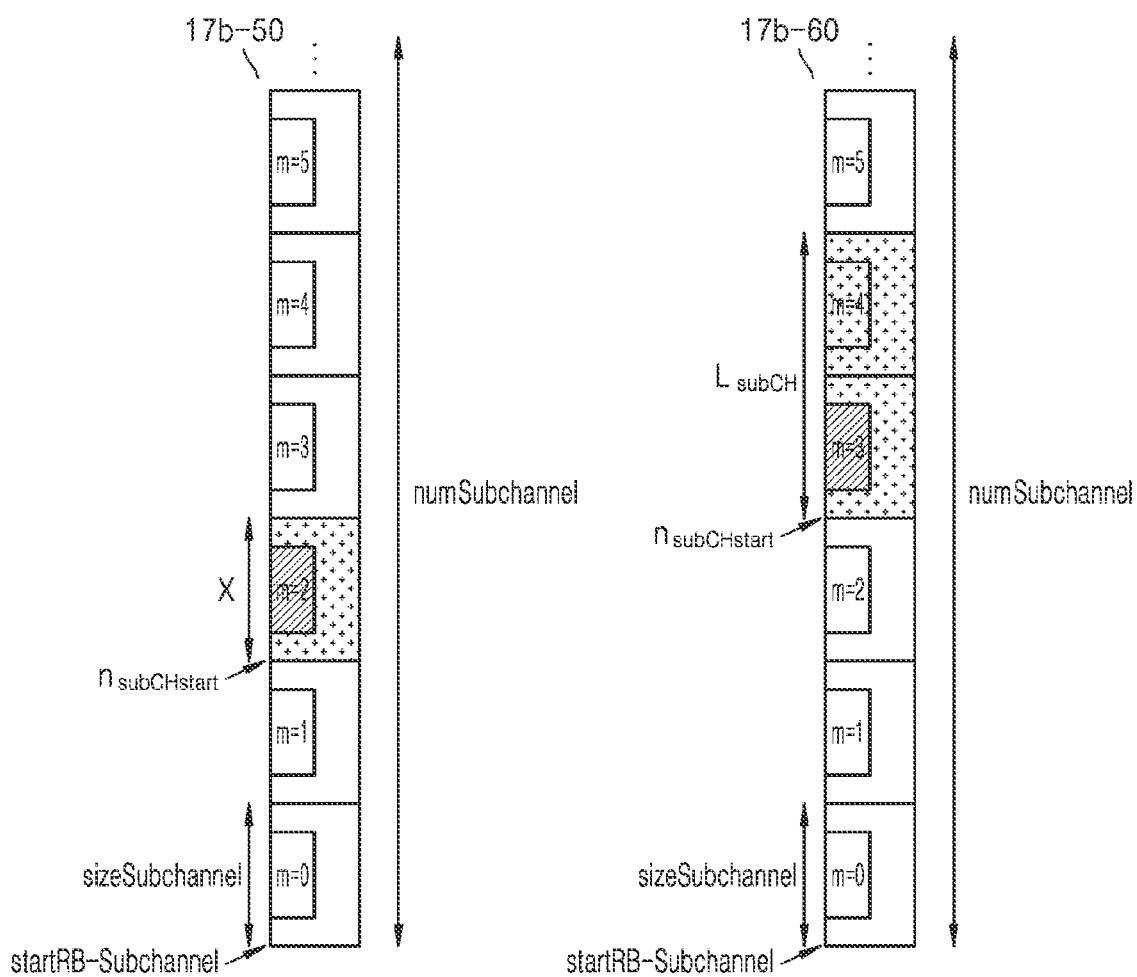
FIG. 17B illustrates methods by which resources for a PSSCH are allocated on a sub-channel basis, according to an embodiment of the disclosure.

FIGS. 17A and 17B illustrate methods by which resources for a PSSCH are allocated on a sub-channel basis, according to an embodiment of the disclosure. Referring to FIG. 17A, 17a-10 indicates a method of multiplexing a PSCCH and a PSSCH. Referring to FIGS. 17A and 17B, the PSCCH is transmitted in a sub-channel corresponding to one with a lowest sub-channel index among sub-channels allocated for the PSSCH. A method by which the PSCCH is always included and transmitted in the sub-channel may be considered. In this case, a method of transmitting the PSCCH in the sub-channel may be determined based on a size of the configured sub-channel. Furthermore, a method by which to repeat and transmit the PSCCH in the PSSCH region based on the sub-channel size may be considered (17a-40). Specifically, a method of transmitting the PSCCH in a sub-channel using the first method by which the frequency allocation size for resources of initial transmission and retransmission for the same TB is supported to be always constant is shown in 17a-20 and 17a-30 of FIG. 17A. Furthermore, a method of transmitting the PSCCH in the sub-channel using the second method by which an initial transmission resource is fixedly transmitted in the sub-channel and an associated retransmission resource may be transmitted in one or more sub-channels is shown in 17b-50 and 17b-60 of FIG. 17B. Referring to FIGS. 17A and 17B, the UE may be configured with startRB-sub-channel, sizesub-channel, and numsub-channel as frequency configuration information for the resource pool. First, an example of indicating resource reservation information through SCI when the method by which the frequency allocation size for resources of initial transmission and retransmission for the same TB is supported to be always constant is used will be described. Specifically, the following method is a chain reservation method of indicating resource allocation for the current transmission and subsequent retransmission, and the resource reservation information for the PSSCH indicated by SCI in slot tn allocated in one pool may be determined as follows:

in a case that a time gap (SFgap) between the current transmission and the subsequent retransmission is 0 (no retransmission), time and frequency allocation positions for the PSSCH are as follows (17a-20):
sub-channel(s) nsubCHstart, nsubCHstart+1, . . . , nsubCHstart+LsubCH-1 in slot tn in a case that a time gap (SFgap) between the current transmission and the subsequent retransmission is not 0 (corresponding to the current transmission), time and frequency allocation positions for the PSSCH are as follows:
sub-channel(s) nsubCHstart, nsubCHstart+1, . . . , nsubCHstart+LsubCH-1 in slot tn (17a-20)
sub-channel(s) nsubCHstart (RE), nsubCHstart (RE)+1, . . . , nsubCHstart (RE)+LsubCH-1 in slot tn+SFgap (17a-30)

in a case that a time gap (SFgap) between the current transmission and the subsequent retransmission is not 0 (corresponding to the subsequent retransmission), time and frequency allocation positions for the PSSCH are as follows:
sub-channel(s) nsubCHstart, nsubCHstart+1, . . . , nsubCHstart+LsubCH-1 in slot tn-SFgap
sub-channel(s) nsubCHstart (RE), nsubCHstart (RE)+1, . . . , nsubCHstart (RE)+LsubCH-1 in slot tn The LsubCH indicates a length of the sub-channel allocated for the PSSCH, and nsubCHstart ♀l-nsubCHstart (RE) indicate start positions of the sub-channel allocated for the PSSCH for initial transmission and retransmission, respectively. nsubCHstart and nsubCHstart (RE) information may be included in SCI.

Unlike this, when the method by which an initial transmission resource may be fixedly transmitted in X sub-channels and an associated retransmission resource may be transmitted in one or more sub-channels is used, an example of indicating the resource reservation information through SCI will now be described. Specifically, the following method is a chain reservation method of indicating resource allocation for the current transmission and subsequent retransmission, and the resource reservation information for the PSSCH indicated by SCI in slot tn allocated in one pool may be determined as follows:

in a case that a time gap (SFgap) between the current transmission and the subsequent retransmission is 0 (no retransmission), time and frequency allocation positions for the PSSCH are as follows (17b-50):
sub-channel(s) nsubCHstart, nsubCHstart+1, . . . , nsubCHstart+X-1 in slot tn in a case that a time gap (SFgap) between the current transmission and the subsequent retransmission is not 0 (corresponding to the current transmission), time and frequency allocation positions for the PSSCH are as follows:
sub-channel(s) nsubCHstart, nsubCHstart+1, . . . , nsubCHstart+X-1 in slot tn (17b-50)
sub-channel(s) nsubCHstart (RE), nsubCHstart (RE)+1, . . . , nsubCHstart (RE)+LsubCH-1 in slot tn+SFgap (17b-60)

in a case that a time gap (SFgap) between the current transmission and the subsequent retransmission is not 0 (corresponding to the subsequent retransmission), time and frequency allocation positions for the PSSCH are as follows:
sub-channel(s) nsubCHstart, nsubCHstart+1, . . . , nsubCHstart+X-1 in slot tn-SFgap
sub-channel(s) nsubCHstart (RE), nsubCHstart (RE)+1, . . . , nsubCHstart (RE)+LsubCH-1 in slot tn where X indicates a length of the sub-channel allocated for the PSSCH in initial transmission, and LsubCH indicates a length of the sub-channel allocated for the PSSCH in retransmission. As described above, a method in which X is fixed to 1 may be considered. Furthermore, nsubCHstart and nsubCHstart (RE) indicate start positions of the sub-channel allocated for the PSSCH for initial transmission and retransmission, respectively, and nsubCHstart and nsubCHstart (RE) information may be included in SCI.

In a case of indicating the resource allocation information in frequency according to the above two methods, the start position nsubCHstart of the sub-channel allocated for the PSSCH for initial transmission is not separately indicated in SCI but may be replaced by a value of PSCCH resource m (see FIG. 17B). This may be supported when it is possible to connect the PSCCH one-to-one to regions in which the PSSCH is transmitted. In a case of indicating only the start position nsubCHstart (RE) of the sub-channel allocated for the PSSCH for retransmission through SCI, a resource indicator value (RIV) may be defined as follows:

if $(L_{subCH} - 1) \leq \lfloor N_{subCH}/2 \rfloor$ then
$\quad RIV = N_{subCH}(L_{subCH} - 1) + n_{subCH}^{start}$
else
$\quad RIV = N_{subCH}(N_{subCH} - L_{subCH} + 1) + (N_{subCH} - 1 - n_{subCH}^{start})$ where $N_{subCH}$ indicates a total number of sub-channels configured in the resource pool by a higher layer.

Figure 18:
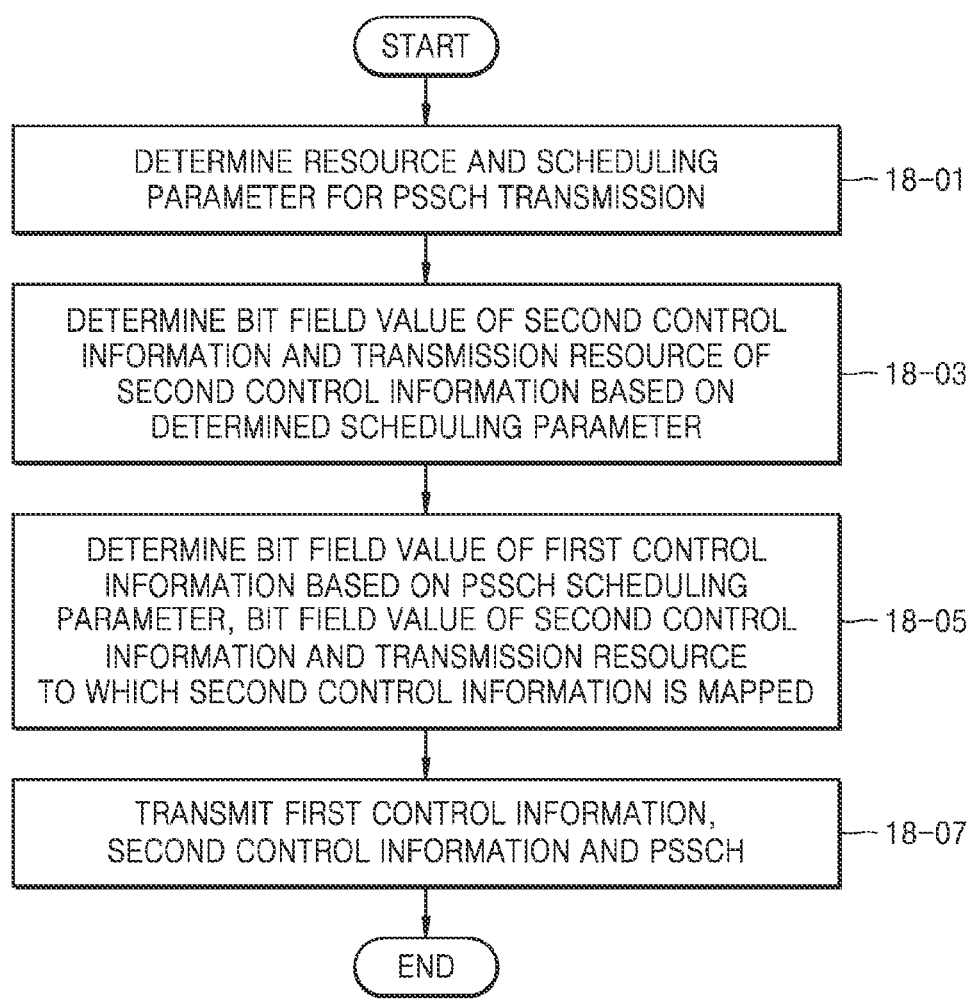
FIG. 18 is a flowchart illustrating a method by which a transmitting UE determines values of bit fields of first control information and second control information, according to an embodiment of the disclosure.

FIG. 18 is a flowchart illustrating a method by which a transmitting UE determines values of bit fields of first control information and second control information, according to an embodiment of the disclosure. Referring to FIG. 18, the transmitting UE determines a resource for transmitting a PSSCH in the aforementioned method such as channel occupancy, channel reservation, etc., in operation 18-01. The transmitting UE determines scheduling parameters to be included in SCI based on the resource for transmitting the PSSCH. The scheduling parameter may include frequency and time resources of the PSSCH, a modulation and coding scheme (MCS), RV, a new data indicator (NDI), an H17RQ process ID, etc. The transmitting UE determines a value of bit fields of the second control information based on the scheduling parameter and determines transmission resources about where to map the second control information, in operation 18-03. Furthermore, the transmitting UE determines values of bit fields of the first control information based on the scheduling parameter of the PSSCH, the bit field value of the second control information, and the transmission resource to which the second control information is mapped, in operation 18-05. This is because the first control information may include information for decoding the second control information. Furthermore, the transmitting UE determines a transmission resource to which the first control information is to be mapped, based on the scheduling parameter of the PSSCH, the bit field value of the second control information, and the transmission resource to which the second control information is mapped. The transmitting UE transmits the first control information, the second control information, and the PSSCH based on the determined information, in operation 18-07.

Figure 19:
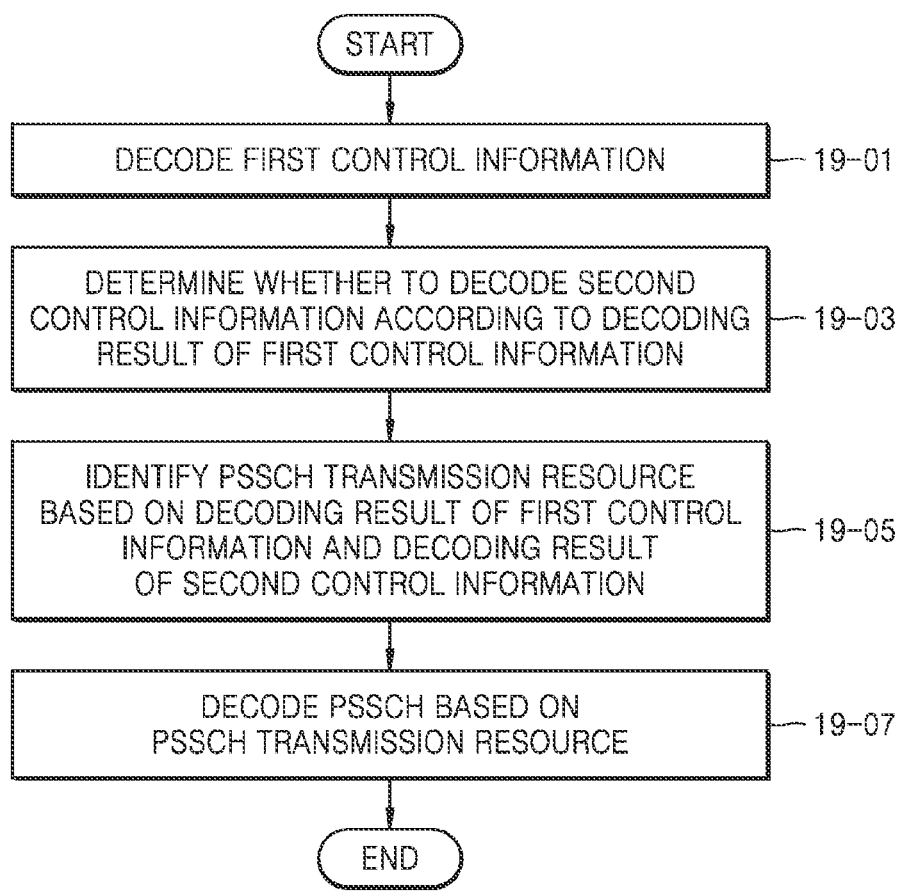
FIG. 19 is a flowchart illustrating a method by which a receiving UE decodes first control information and second control information sequentially and based on the decoded first and second control information, decodes a PSSCH, according to an embodiment of the disclosure.

FIG. 19 is a flowchart illustrating a method by which a receiving UE decodes first control information and second control information sequentially and based on this, decodes a PSSCH, according to an embodiment of the disclosure.

Referring to FIG. 19, the receiving UE attempts to decode the first control information based on e.g., pre-configured information, in operation 19-01. The receiving UE determines whether to decode the second control information based on a bit field value of the first control information that has been successfully decoded, determine which resource the second control information is mapped to when decoding of the second control information is required, and performs decoding, in operation 19-03. The reason of determining whether to decode the second control information is because in a certain transmission type or transmission mode, it may be possible to decode the PSSCH only by decoding the first control information. Subsequently, the receiving UE identifies a PSSCH transmission resource and other scheduling information based on the bit field values of the first control information (SCI 1) and the second control information (SCI 2) which have been decoded, in operation 19-05. The receiving UE decodes the PSSCH and performs a subsequent required operation by using the identified scheduling information, in operation 19-07.

As described above, the UE may not need to decode the second control information after successfully decoding the first control information. That the control information has been successfully decoded may refer to a success of CRC checking.

Figure 20:
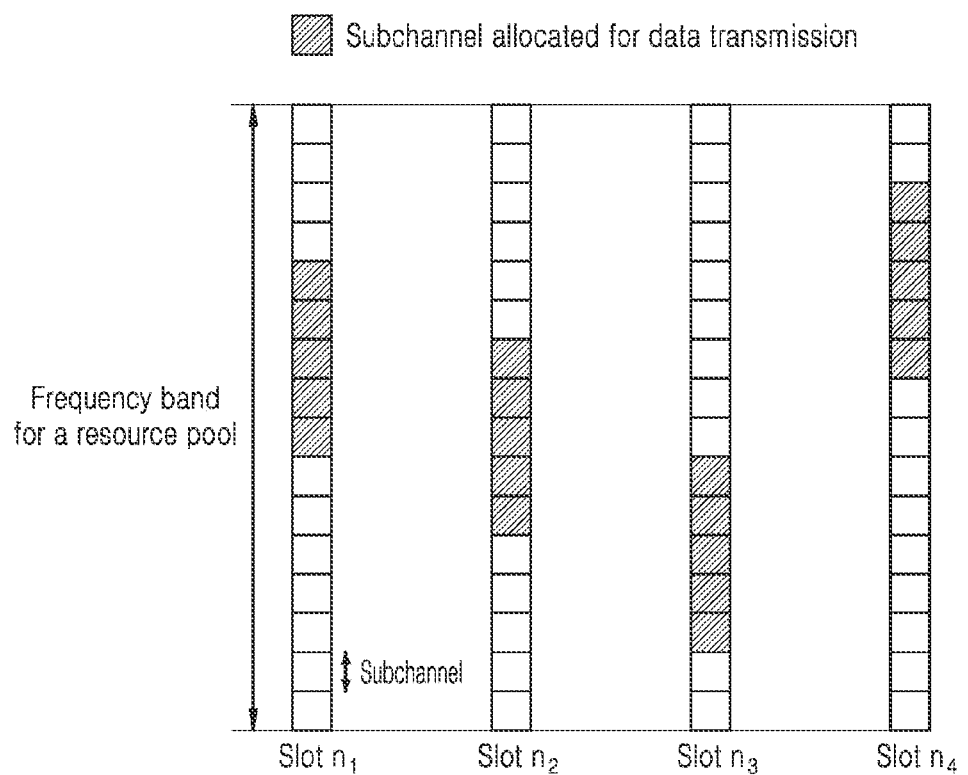
FIG. 20 illustrates sub-channel based division of a frequency band in a given resource pool and resource allocation for sub-channel based data transmission, according to an embodiment of the disclosure.

FIG. 20 illustrates sub-channel based division of a frequency band in a given resource pool and resource allocation for sub-channel based data transmission, according to an embodiment of the disclosure.

The number of sub-channels in a resource pool is assumed to be Nsubchannel. One sub-channel may be made up with one or more PRBs, and Nsubchannel may be (pre-) configured in the resource pool or calculated by a particular parameter. The data as herein used may be one transmitted in the PSSCH, and resource allocation for data transmission may refer to indicating a resource region used for PSSCH mapping.

When initial transmission is performed in slot $n_1$ and retransmission is performed in slot $n_2$, control information transmitted in slot $n_1$ may include resource allocation information for the initial transmission and one-time retransmission. This may be time domain resource information for slot $n_2$, or frequency domain information of slots $n_1$ and $n_2$. Assuming that the number of sub-channels in the frequency domain used for initial transmission is equal to that for retransmission, when information of the first sub-channel from which mapping of the PSSCH begins in the slot is determined from a mapping position of the control information transmitted in the same slot, the control information transmitted in the initial transmission needs to include information about the number of sub-channels used for PSSCH for retransmission mapping and the first sub-channel to which the PSSCH is mapped. In this case, the following bit field of the following size (or a size smaller or larger than this by a few bits) may be used in the control information to send the frequency domain resource allocation information of the PSSCH for initial transmission and retransmission:

$$\left\lceil \log_2 \frac{N_{subchannel} \times (N_{subchannel} + 1)}{2} \right\rceil$$

The bit field of this size may be one for indicating the number of sub-channels to which the PSSCH is mapped and a position of a start sub-channel of the retransmission PSSCH, and $$\frac{N_{subchannel} \times (N_{subchannel} + 1)}{2}$$

may indicate the number of possible combinations of the number of sub-channels to which the PSSCH is mapped and the position of the start sub-channel of the retransmission PSSCH. The logarithm to the base 2 may be used to calculate the number of bits to indicate a number of possible cases. $\lceil x \rceil$ may indicate the smallest of integers greater than x, which is to represent a size of required bit fields with the integer.

To indicate information about a frequency resource to which the PSSCH is mapped for initial transmission and three retransmissions as shown in FIG. 20, at least one of the following methods may be used to calculate the size of bit fields for frequency resource allocation:

method 1: a bit field of the following size (or a size smaller or larger than this by a few bits) may be used in the control information to send the frequency domain resource allocation information of the PSSCH for initial transmission and three retransmissions:

$$\left\lceil \log_2 \frac{(N_{subchannel})^3 \times (N_{subchannel} + 1)}{2} \right\rceil$$

For example, as the number of possible cases of the start sub-channel position of the PSSCH transmitted in slots $n_3$ and $n_4$ may be represented by $(N_{subchannel})^2$ in FIG. 20, the bit field size may be determined as in the method 1.

method 2: a bit field of the following size (or a size smaller or larger than this by a few bits) may be used in the control information to send the frequency domain resource allocation information of the PSSCH for initial transmission and three retransmissions:

$$\left\lceil \log_2 \frac{N_{subchannel} \times (N_{subchannel} + 1)}{2} \right\rceil + 2 \times \lceil \log_2 N_{subchannel} \rceil$$

For example, as the number of possible cases of the start sub-channel position of the PSSCH transmitted in slots $n_3$ and $n_4$ may each be $N_{subchannel}$ in FIG. 20, the bit field size may be determined as in the method 2. The method 2 may be a method of sending information of the start sub-channel positions of the PSSCH transmitted in slots $n_3$ and $n_4$ in separate bits.

method 3: a bit field of the following size (or a size smaller or larger than this by a few bits) may be used in the control information to send the frequency domain resource allocation information of the PSSCH for initial transmission and three retransmissions:

$$\left\lceil \log_2 \frac{N_{subchannel} \times (N_{subchannel} + 1)}{2} \right\rceil + \lceil 2 \times \log_2 N_{subchannel} \rceil$$

For example, as the number of possible cases of the start sub-channel position of the PSSCH transmitted in slots $n_3$ and $n_4$ may each be $N_{subchannel}$ in FIG. 20, the bit field size may be determined as in the method 3. The method 3 may be a method of sending the start sub-channel positions of the PSSCH transmitted in slots $n_3$ and $n_4$ together in several bits.

Embodiments of the disclosure for performing a method of sidelink data transmission and reception will now be described. Specifically, a slot structure for sidelink transmission and a method and apparatus for data transmission or reception in the slot structure are provided.

First Embodiment

In the first embodiment of the disclosure, a structure of a slot in which sidelink control channels and data are transmitted or received is provided.

In the process of receiving a signal in a UE in a wireless communication system, the magnitude of the signal may need to be amplified. For this, the received signal is processed after the magnitude of the signal is amplified through an amplifier, and in this case, an amplifier capable of changing the degree of amplification of the signal may be used. For each amplifier, an input range or an output range having linearity between input and output may be determined. When amplification is performed at much too high amplification degree, an output may come in a range out of the linearity, which may deform the received signal, causing degradation of reception performance. Hence, to guarantee the performance, the degree of amplification may need to be operated in a range having linearity between input and output of the amplifier. Furthermore, when the degree of amplification is set to be too low, the received signal is not sufficiently amplified, so the reception performance may not be guaranteed. Accordingly, the degree of amplification may be constantly and automatically adjusted so that amplification is performed to the maximum in a region having the linearity between input and output of the amplifier, and this is called automatic gain control (AGC). The UE may find a suitable degree of amplification by performing the AGC, and finding the suitable degree of amplification requires a certain period of time, which is called an AGC training time. A signal received during the AGC training time may not be used in receiving actual control and data signals, and the AGC training time may be determined according to an initial value setting for the degree of amplification to perform AGC. In the sidelink communication where the UE that transmits a signal may constantly change, the receiving UE needs to keep performing the AGC and may require the AGC training time for every signal reception. The more the AGC training time required for the UE is reduced, the better the reception performance is because the range of received signals available for signal processing increases.

A transmitting UE may transmit a preamble signal in one or more symbols before transmitting a sidelink control channel and data. The preamble signal may be used to correctly perform AGC for controlling magnitude of amplification when the receiving UE amplifies power of the received signal. The PSCCH including the control information may be transmitted in early symbols of the slot, and a PSSCH scheduled in the control information of the PSCCH may be transmitted. Part of SCI which is the control information may be mapped to and transmitted in the PSSCH. Although the preamble signal for performing AGC in a physical channel structure in the sidelink slot may be transmitted separately, it is possible to duplicate and transmit the sidelink channel and signal to be transmitted in the second symbol in the first symbol, and based on this, the receiver may even perform AGC.

A position of a symbol in which the DMRS is transmitted as described in the embodiment may be applied in combination with a pattern of another position based on an allocated length of the PSSCH. The allocated length of the PSSCH may be the number of symbols used for PSSCH transmission including a DMRS but AGC symbols. Furthermore, in a method provided in the embodiment, the PSSCH may be mapped to the DMRS symbol depending on the presence of available resources. Moreover, in a method provided in the embodiment, part of the control information may be mapped to the DMRS symbol depending on the presence of available resources or a resource of the PSSCH. A DMRS pattern provided in the embodiment may be a physically absolute symbol position, but in another embodiment, may be a relative symbol position. For example, the position of the DMRS symbol may be changed according to positions of symbols used for sidelink in the slot. Specifically, assuming that p is an index of the first symbol of the PSCCH, the position of the DMRS symbol provided in the embodiment may be given as a relative offset value from p.

Figure 21:
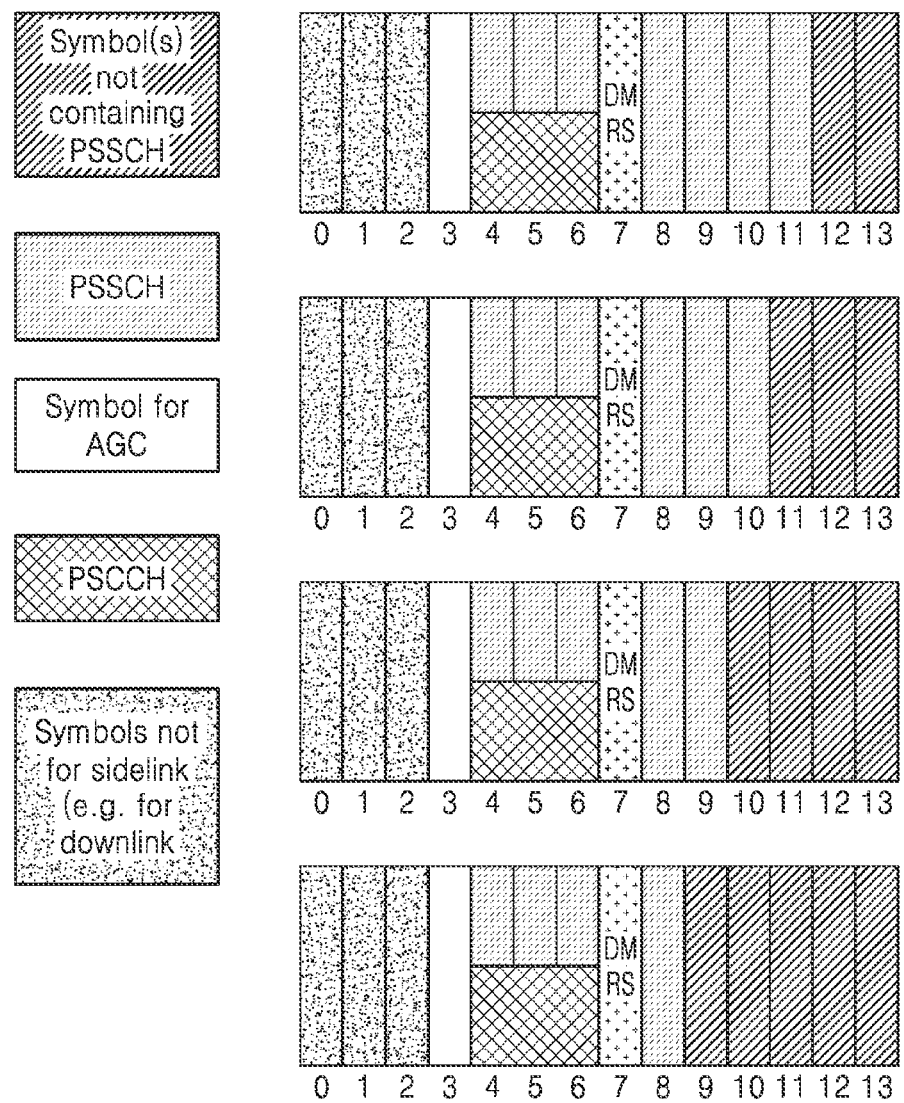
FIG. 21 illustrates demodulation reference signals (DMRSs) for a sidelink control channel and data when first three symbols within a slot are used for DL, according to an embodiment of the disclosure.
Figure 22A:
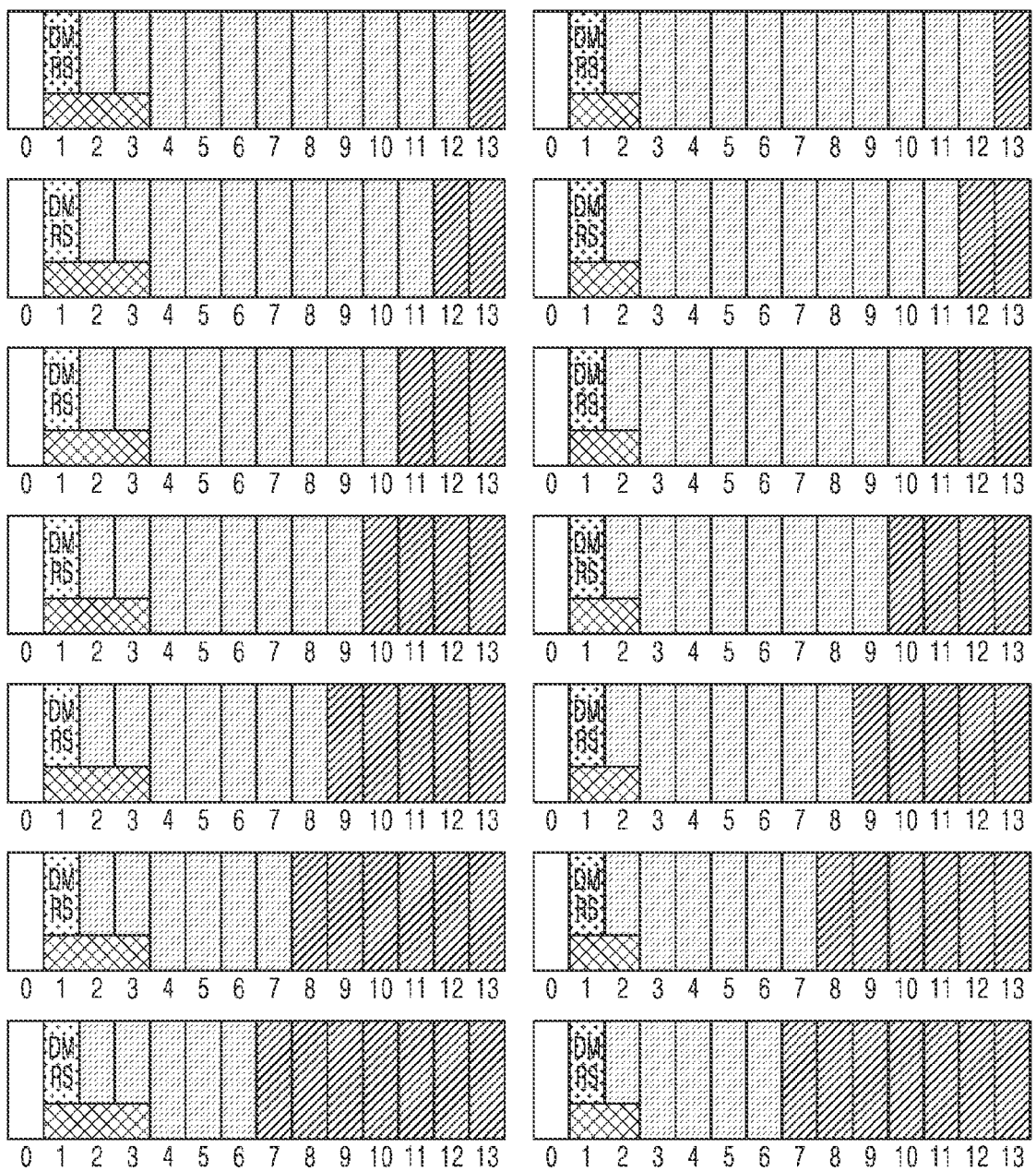
FIG. 22A illustrates a pattern including one DMRS, according to an embodiment of the disclosure.
Figure 22B:
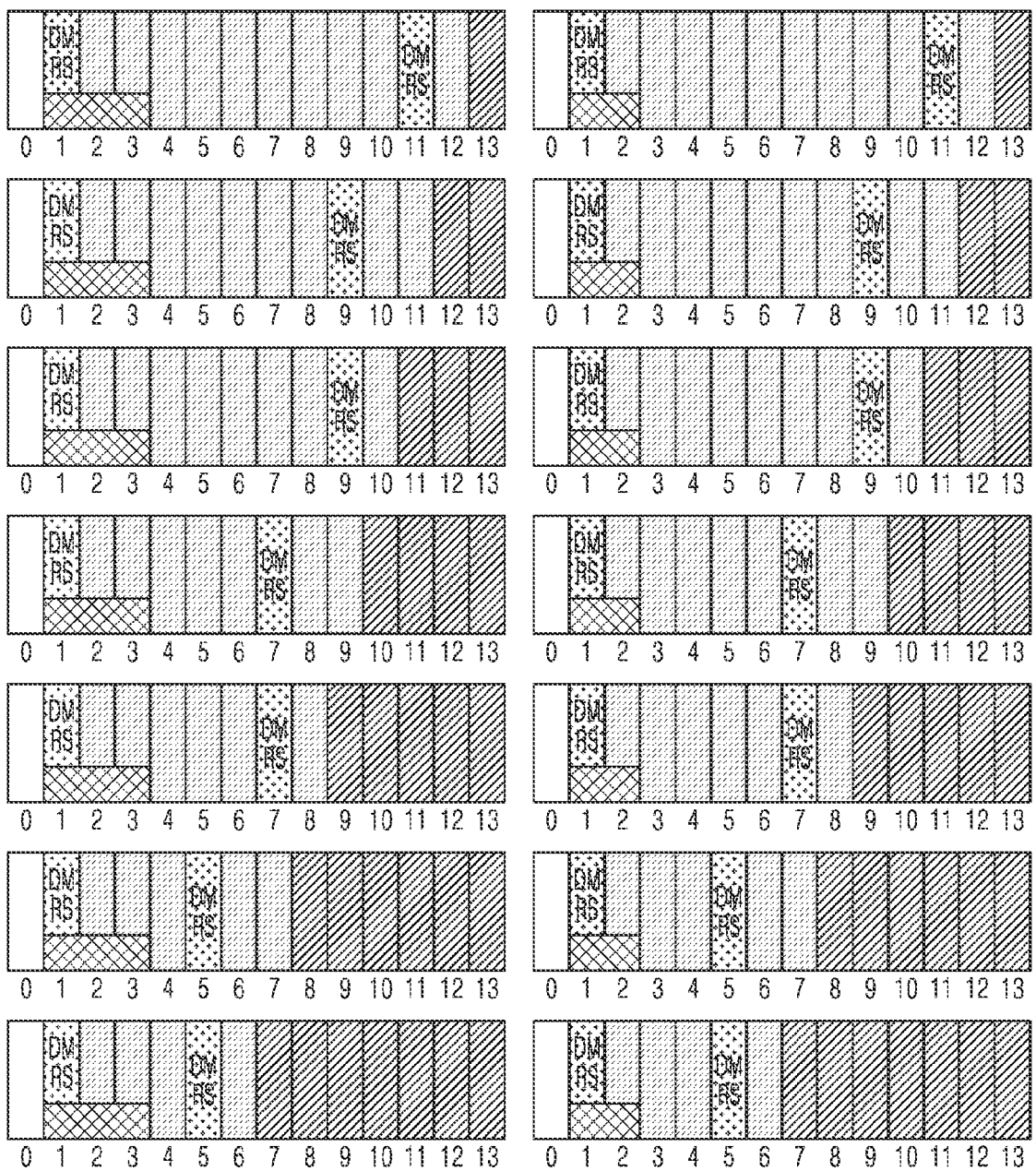
FIG. 22B illustrates a pattern including two DMRSs, according to an embodiment of the disclosure.
Figure 22C:
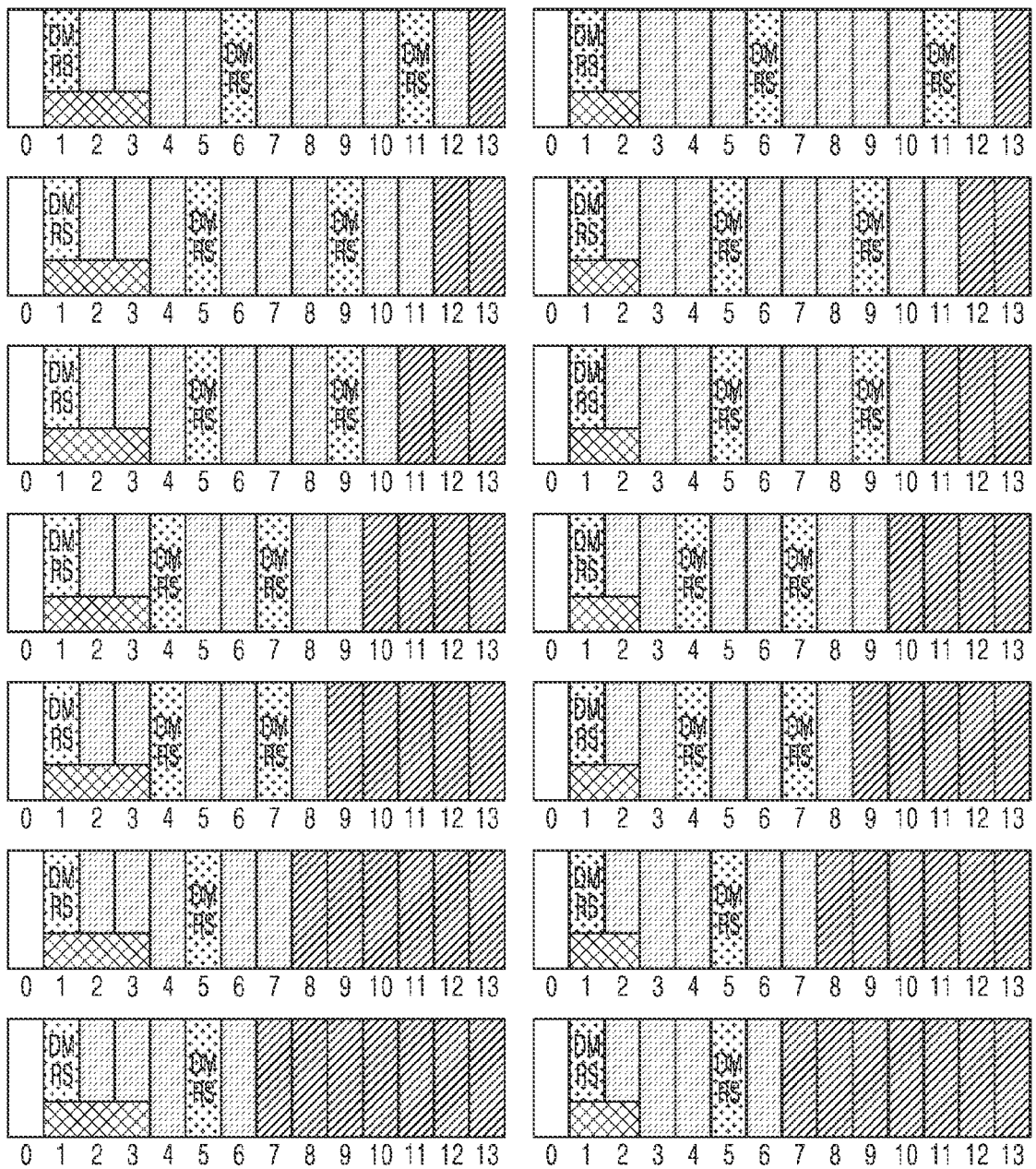
FIG. 22C illustrates a pattern including three DMRSs, according to an embodiment of the disclosure.
Figure 22D:
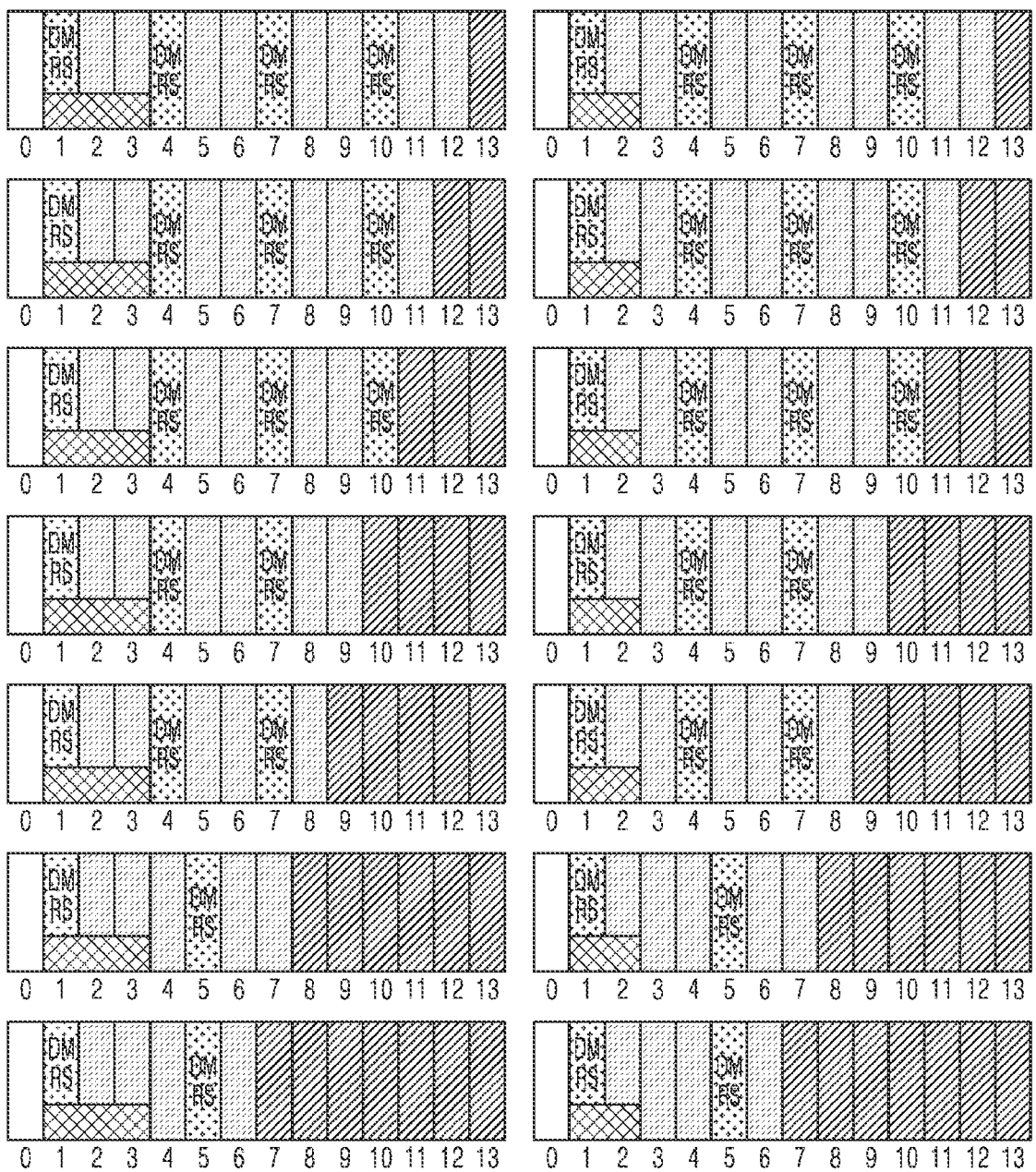
FIG. 22D illustrates a pattern including four DMRSs, according to an embodiment of the disclosure.

FIG. 21 illustrates DMRSs for a sidelink control channel and data when first three symbols within a slot are used for DL, according to an embodiment of the disclosure.

In the embodiment, provided is an example of reusing a relative position of a DL DMRS symbol, i.e., a DMRS symbol of the PDSCH as much as possible in the NR system. Furthermore, in the embodiment, provided is an example of reusing a relative position of a UL DMRS symbol, i.e., a DMRS symbol of the PUSCH as much as possible in the NR system. The DMRS symbol of the PUSCH as mentioned above may be changed according to the PUSCH type in the NR system: for a PUSCH type A, the position of the DMRS symbol is equal to the position of the DMRS symbol of the DL PDSCH, and for a PUSCH type B, the position of the DMRS symbol is different from the position of the DMRS symbol of the downlink PDSCH.

When the position of the DMRS of the PUSCH type B defined in the NR system within a slot is considered a relative position from the first symbol of the PSCCH, which is a control channel transmitted in the sidelink slot, examples as illustrated in FIGS. 22A to 22d may be possible.

FIGS. 22A, 22B, 22C, and 22D illustrate patterns including 1, 2, 3, and 4 DMRS symbols, respectively, according to an embodiment of the disclosure.

Each of the patterns illustrated in FIGS. 22A to 22D may be a pattern used based on a value of a parameter such as dmrs_number or dmrs-AdditionalPosition and the number of symbols used for PSSCH mapping. For example, when dmrs-AdditionalPosition=pos2 (dmrs-AdditionalPosition may refer to the number of additional symbols in addition to one, and for example, pos2 may refer to a total of three DMRS symbols. That is, posX may be a parameter value that indicates a total of X+1 symbols), one of the DMRS patterns shown in FIG. 22C may be selected and used according to the number of PSSCH symbols.

In the disclosure, a position of the first symbol of the PSCCH, which is a control channel transmitted in the sidelink slot may refer to a second symbol used for sidelink in the slot.

In the disclosure, a value of a parameter such as dmrs_number or dmrs-AdditionalPosition may be a value sent in the control information (SCI) or in the first control information (first state SCI). Alternatively, the value of the parameter such as dmrs_number or dmrs-AdditionalPosition may be a value configured in the resource pool or a value indicated in the SCI among the values set in the resource pool. For example, a 2-bit indicator may be carried in the SCI, and the 2-bit indicator may indicate a value of dmrs-AdditionalPosition.

Figure 23A:
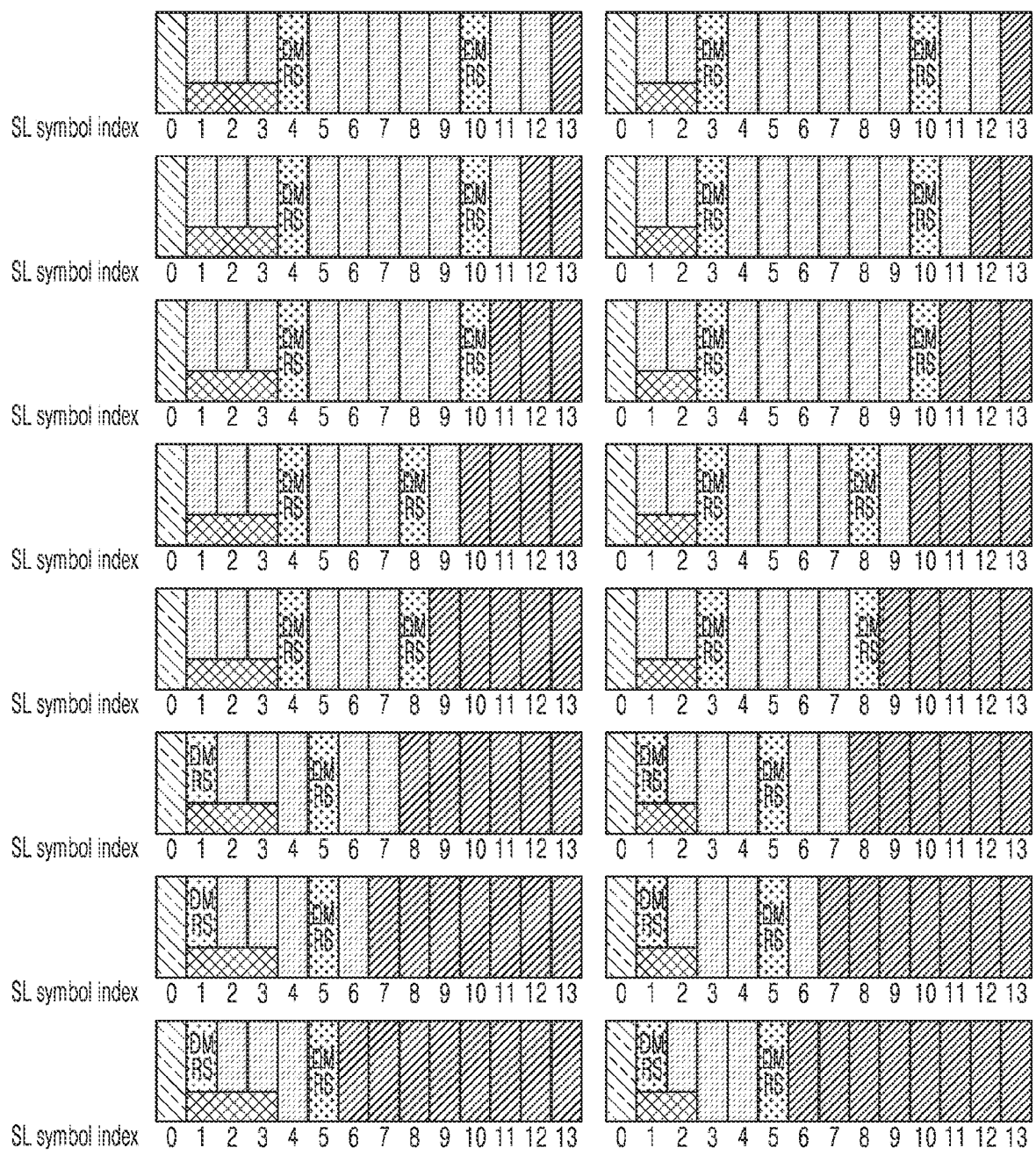
FIG. 23A illustrates a modified DMRS pattern, according to an embodiment of the disclosure.
Figure 23B:
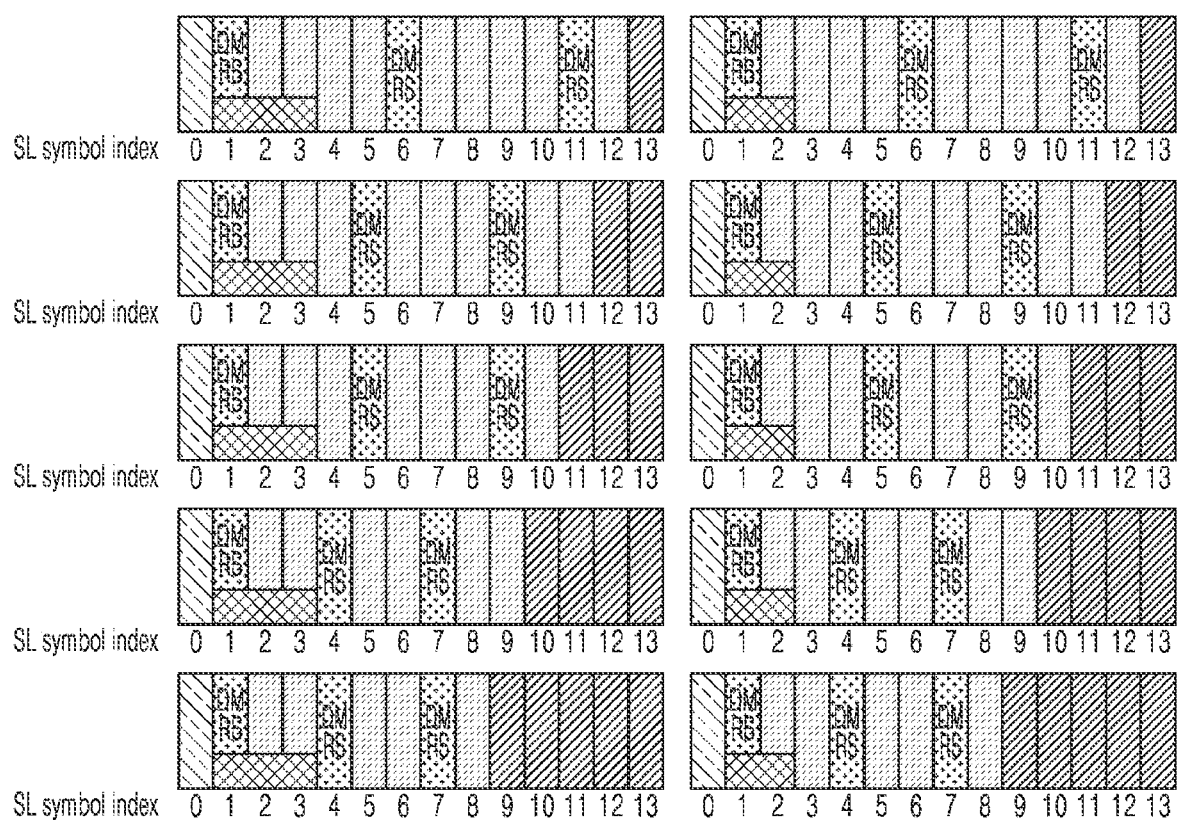
FIG. 23B illustrates a modified DMRS pattern, according to an embodiment of the disclosure.
Figure 23B:
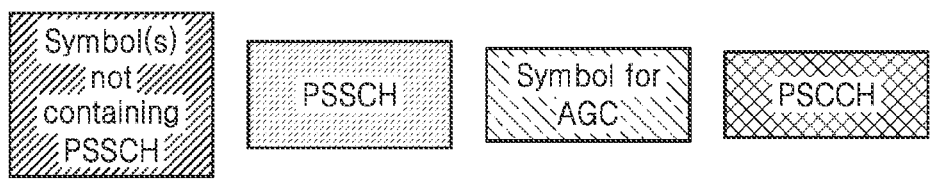
Figure 23C:
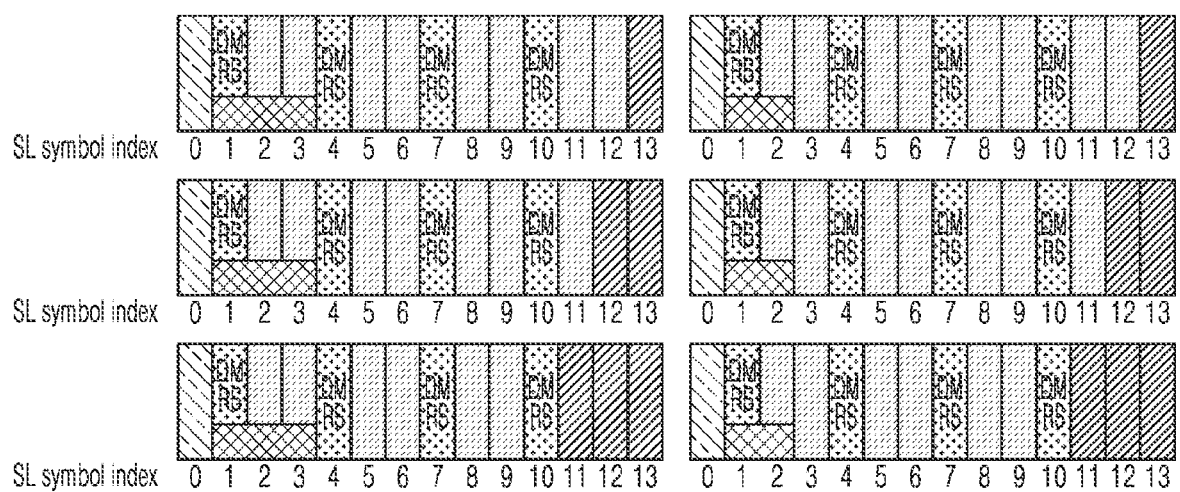
FIG. 23C illustrates a modified DMRS pattern, according to an embodiment of the disclosure.
Figure 23C:
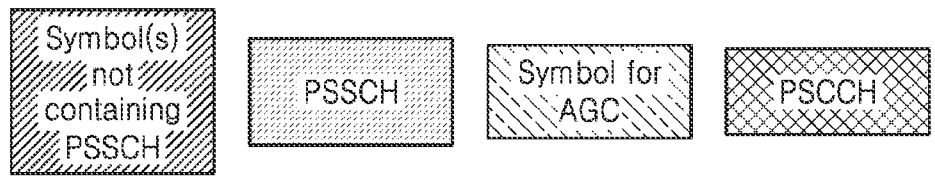

Patterns shown in FIGS. 22A to 22D may be further modified and supported for sidelink. For example, the DMRS pattern of FIG. 22B including 2 symbol DMRSs for sidelink may be modified and applied as shown in FIG. 23A. Similarly, the DMRs pattern of FIG. 22C including 3 symbol DMRSs for sidelink may be modified and used, and the DMRs pattern of FIG. 22D including 4 symbol DMRSs for sidelink may be modified and used. For example, the DMRS patterns of FIGS. 22C and 22D may be modified to those as shown in FIGS. 23B and 23C, respectively.

According to an embodiment of the disclosure, among the patterns provided according to the PSSCH length and the PSCCH length as shown in FIGS. 22A to 22D and FIGS. 23A to 23C, parts or a combination of the parts may be used.

For the position of a symbol in which the DMRS is transmitted as described in the embodiment, available positions that are different according to SCS may be applied. For example, among the patterns provided according to the PSSCH length and the PSCCH length as shown in FIGS. 22A to 22D and FIG. 23A, parts or a combination of the parts may be used differently according to the SCS.

A position of the symbol in which the DMRS is transmitted as described in the embodiment may be applied in combination with a pattern of another position based on an allocated length of the PSSCH. The allocated length of the PSSCH may be the number of symbols used for PSSCH transmission including a DMRS but AGC symbols.

Furthermore, in a method provided in the embodiment, the PSSCH may be mapped to the DMRS symbol depending on the presence of available resources.

Moreover, in a method provided in the embodiment, part of the control information may be mapped to the DMRS symbol depending on the presence of available resources or a resource of the PSSCH.

A DMRS pattern provided in the embodiment may be a physically absolute symbol position, but in another embodiment, may be a relative symbol position. In other words, the position of the DMRS symbol may be changed according to positions of symbols used for sidelink in the slot. For example, assuming that p is an index of the first symbol of the PSCCH, the position of the DMRS symbol provided in the embodiment may be given as a relative offset value from p. For example, FIG. 21 shows an embodiment in which part of FIG. 23A is applied when first three symbols of a slot are used for DL.

Embodiment 1-1

In embodiment 1-1, provided is a method and apparatus for mapping a DMRS for decoding a PSSCH and also mapping the PSSCH for sidelink data transmission or reception.

Figure 24:
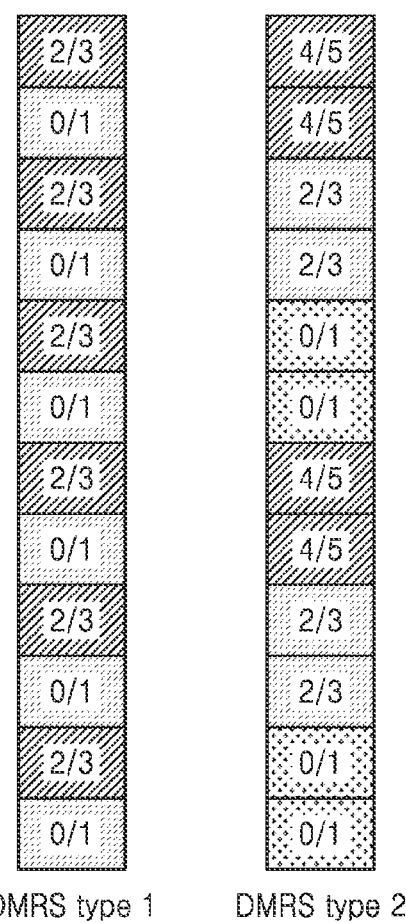
FIG. 24 illustrates mapping of DMRSs for PSSCH decoding to symbols to be mapped in sidelink data transmission or reception, according to an embodiment of the disclosure.

FIG. 24 illustrates mapping of DMRSs for PSSCH decoding to symbols to be mapped in sidelink data transmission and reception, according to an embodiment of the disclosure. Referring to FIG. 24, PSSCH DMRS type 1 and PSSCH DMRS type 2 have different mapping resource positions. One block refers to one RE, and a number therein may be a layer number or an antenna port number. For example, in FIG. 24, mapping of type 1 may be performed by mapping DMRSs corresponding to layer numbers 2 and 3 or antenna port numbers 2 and 3 to first, third, fifth, seventh, ninth and eleventh REs from the top, and mapping DMRSs corresponding to layer numbers 0 and 1 or antenna port numbers 0 and 1 to second, fourth, sixth, eighth, tenth, and twelfth REs. As sidelink may support transmission of up to two layers, not all REs in one symbol may be used for DMRS mapping when the DMRS is used according to the set number.

When different transmitting UEs transmit with different RE positions, the REs for the DMRS may not overlap even when PSSCH transmission frequency resources of the two UEs overlap, so channel estimation or channel sensing performance may become better. For example, when UE A and UE B each use one layer to transmit data, in which case DMRSs are transmitted using REs all corresponding to layer number 0 in the DMRS type 1 mapping as shown in FIG. 24, and even when UE A and UE B transmit the PSSCH and/or DMRS in the same PRB, REs of the DMRSs transmitted by the two UEs overlap. On the other hand, when UE A and UE B each use one layer to transmit data, in which case UE A transmits the PSSCH and/or DMRS using REs corresponding to layer number 0 and UE B transmits the PSSCH and/or DMRS using REs corresponding to layer number 2 in the DMRS type 1 mapping as shown in FIG. 24, and even when UE A and UE B transmit the PSSCH and/or DMRS in the same PRB, REs of the DMRSs transmitted by the two UEs do not overlap. Accordingly, this case may have better channel estimation performance. In this case, operations may be changed depending on how to use a CDM group. As for the CDM, for example, in the type 1 of FIG. 24, REs denoted by 0/1 are one CMD group and REs denoted by 2/3 are the other CDM group. In the type 2 of FIG. 24, REs denoted by 0/1 are one CDM group, REs denoted by 2/3 are another CDM group, and REs denoted by 4/5 are the other CDM group. When two CDM groups are to be used and 1- or 2-port transmission is performed, data (PSSCH) is not mapped to the other CDM group and the PSSCH may be transmitted with the other CDM group empty. When one CDM group is to be used and 1- or 2-port transmission is performed, PSSCH may be transmitted with data (PSSCH) mapped to the other CDM group.

As described above, in a case that the DMRS is transmitted in different CDM groups when different UEs transmit the PSSCH and/or DMRS, even when the PSSCH and DMRS are transmitted in the same PRB, the DMRS REs may not overlap. Specifically, it may be a method by which, when UE A and UE B both perform one-port transmission and use different CMD groups, UE B transmits the DMRS in first, third, fifth, seventh, ninth and eleventh REs and UE A transmit the DMRS in second, fourth, sixth, eighth, tenth, and twelfth REs. For example, the CDM group may be determined between transmitting and receiving UEs according to at least one of the following methods:

method 1: The CDM group may be determined according to a CRC bit value of the PSCCH. Specifically, when the CRC bit value is converted into a decimal number, which corresponds to an odd number, the PSSCH DMRS may be transmitted in a first CDM group, and when the CRC bit value is converted into a decimal number, which corresponds to an even number, the PSSCH DMRS may be transmitted in a second CDM group. For example, the CDM group may be determined according to a least significant bit (LSB) or most significant bit (MSB) of the CRC bits. When the LSB (or MSB or an N-th bit) value of the CRC bits is 0, the PSSCH DMRS is transmitted in the first CDM group, and when the LSB (or MSB or an N-th bit) value of the CRC bits is 1, the PSSCH DMRS is transmitted in the second CDM group.

method 2: The CDM group may be determined according to a lowest (or highest) index value of the PRB in which the PSCCH is transmitted. Specifically, when the lowest (or highest) index value of the PRB in which the PSCCH is transmitted is an odd number, the PSSCH DMRS may be transmitted in the first CDM group, and when the lowest (or highest) index value of the PRB in which the PSCCH is transmitted is an even number, the PSSCH DMRS may be transmitted in the second CDM group.

Whether to map the PSSCH to REs to which the DMRS is not mapped in the symbol in which the DMRS is transmitted may be determined according to the number of CDM groups. Specifically, for the DMRS type 1, when the number of CDM groups is 1, the PSSCH is mapped to and transmitted in the remainder of the CDM group, and when the number of CDM groups is 2, the PSSCH is not mapped to REs corresponding to the remainder of the CDM group. For the DMRS type 2, when the number of CDM groups is 1, the PSSCH is mapped to and transmitted in the remainder of the CDM group, and when the number of CDM groups is 2 or 3, the PSSCH is not mapped to REs corresponding to the remainder of the CDM group.

Second Embodiment

In the second embodiment, a method and apparatus for transmitting or receiving control information and data in the UE for sidelink is provided.

A UE that is going to transmit data in a sidelink resource pool first performs searching for a resource to determine which sidelink resource is used to transmit the data. This may be called channel sensing, and the channel sensing may be to search for a resource in advance for initial transmission and retransmission of particular data, TB, or CB. In this channel sensing procedure, sizes of resources in the frequency domain found for initial transmission and retransmission may be different. Specifically, there may be an occasion when only 1 sub-channel or 10 PRBs may be used for initial transmission, and 4 sub-channels or 40 PRBs may be used for retransmission.

In this case, a TB transmitted in 1 sub-channel in initial transmission may need to have the same size as a TB transmitted in retransmission. Hence, the UE may require a method of determining a suitable TB size (TBS). The UEs for transmitting and receiving control information and data may use one or a combination of the following methods to determine the size of a TB for transmission and reception.

The following methods may be to determine $n_{PRB}$ in an equation of $N_{RE}=\min(156, N_{RE}')\cdot n_{PRB}$ required for calculating ARE among the aforementioned methods of determining the TBS. The method of determining the TBS may be summarized as in the following steps 1 to 4.

step 1: calculate the number of RES $N_{RE}'$ allocated for PDSCH mapping within a PRB in an allocated resource. $N_{RE}'$ may be calculated to be $N_{RE}'=N_{sc}^{RB}\cdot N_{symb}^{sh}-N_{DMRS}^{PRB}-N_{oh}^{PRB}$, where $N_{sc}^{RB}$ refers to the number of subcarriers (e.g., 12) included in one RB, $N_{symb}^{sh}$ refers to the number of OFDM symbols allocated for a PDSCH, $N_{DMRS}^{PRB}$ refers to the number of REs in one PRB occupied by a DMRS in the same code division multiplexing (CDM) group, and $N_{oh}^{PRB}$ refers to the number of REs (e.g., set to be at least one of 0, 6, 12, or 18) occupied by an overhead in one PRB configured by higher layer signaling. Subsequently, a total number of RES, $N_{RE}$, allocated for the PDSCH may be calculated. $N_{RE}$ is calculated to be $N_{RE}=\min(156, N_{RE}')\cdot n_{PRB}$. $n_{PRB}$ refers to the number of PRBs allocated for the UE.

step 2: The number of arbitrary information bits $N_{info}$ may be calculated to be $N_{info}=N_{RE}\cdot R\cdot Q_m\cdot v$. R refers to a code rate, Qm refers to a modulation order, and v refers to the number of allocated layers. The code rate and the modulation order may be delivered by using a predetermined corresponding relation with an MCS field included in the control information. A TBS may be calculated according to the following step 3 when $N_{info}\leq 3824$, or otherwise, according to the following step 4.

step 3: $N_{info}'$ may be calculated with $$N_{info}' = \max\left(24, 2^n \cdot \left\lfloor \frac{N_{info}}{2^n} \right\rfloor\right) \text{ and } n = \max(3, \lfloor \log_2(N_{info}) \rfloor - 6).$$

The TBS may then be determined to be a value nearest to $N_{info}'$ among values not smaller than $N_{info}'$ in Table 5.

step 4: $N_{info}'$ may be calculated according to $$N_{info}' = \max\left(3840, 2^n \times \text{round}\left(\frac{N_{info} - 24}{2^n}\right)\right) \text{ and } n = \lfloor \log_2(N_{info} - 24) \rfloor - 5.$$

The TBS may then be determined by pseudo codes as in Table 6 and the value of $N_{info}'$.

In the methods of determining the TBS in sidelink transmission or reception, a value smaller than 156 instead of 156, e.g., 144, in the equation $N_{RE} = \min(156, N_{RE}') \cdot n_{PRB}$ may be used. The value used instead of 156 may be determined depending on the slot belonging to the resource pool, and for example, may be determined depending on whether the slot includes a PSFCH resource. For example, when a PSFCH resource is not included in the slot, 144 may be used instead of 156, and when a PSFCH resource is included in the slot, 120 may be used instead of 156. Alternatively, there may be a method of determining the TBS by using a value X set based on the resource pool in a method like $N_{RE} = \min(X, N_{RE}') \cdot n_{PRB}$. For example, the X may be set to a value including such a value as X=144 or 120 through an indicator made up with at least one bit. Furthermore, it may be represented by $N_{RE} = \min(12 \times Y, N_{RE}') \cdot n_{PRB}$, and may be determined using a suitable integer value Y, where $0 < Y \leq 13$. For example, the Y may be set to a value (symbol unit) including such a value as Y=12 or 10 through an indicator made up with at least one bit. This is because as described in the first embodiment, the number of symbols used for data mapping in the slot for sidelink transmission or reception may be smaller than that used for UL or DL transmission with the BS. The reason may be that the first symbol duplicates the second symbol to be used for AGC for the sidelink data transmission or reception and at least the last symbol is a gap symbol, which is not used for data transmission.

In the embodiment, as a method of calculating the number of REs to which a PSSCH is mapped within one slot, a method applied in the following step 1 is proposed.

step 1: calculate the number of RES $N_{RE}'$ allocated for PSSCH mapping within a PRB in an allocated resource. $N_{RE}'$ may be calculated to be $N_{RE}' = N_{sc}^{RB} \cdot N_{symb}^{sh} - N_{DMRS}^{PRB} - N_{oh}^{PRB}$, where $N_{sc}^{RB}$ refers to the number of subcarriers (e.g., 12) included in one RB, $N_{symb}^{sh}$ refers to the number of OFDM symbols allocated to a PSSCH, $N_{DMRS}^{PRB}$ refers to the number of REs in one PRB occupied by a DMRS in the same CDM group, and $N_{oh}^{PRB}$ refers to the number of REs (e.g., set to be at least one of 0, 6, 12, or 18) occupied by an overhead in one PRB configured by higher layer signaling. Subsequently, a total number of RES, $N_{RE}$, allocated for the PSSCH may be calculated. $N_{RE}$ is calculated to be $N_{RE} = \min(156, N_{RE}') \cdot n_{PRB}$. $n_{PRB}$ refers to the number of PRBs allocated for the UE.

The number of OFDM symbols $N_{symb}^{sh}$ allocated for the PSSCH may be determined according to at least one of the following methods:

method A-1: determines as the number of symbols to which the PSSCH is mapped within a slot in which the PSSCH is transmitted.

method A-2: determines the largest of the numbers of symbols available for sidelink PSSCH transmission among slots configured in the resource pool in which the PSSCH is transmitted. For example, when the PSFCH is configured for every two slots in the resource pool, the determination is made based on a slot with no PSFCH.

method A-3: determines the smallest of the numbers of symbols available for sidelink PSSCH transmission among slots configured in the resource pool in which the PSSCH is transmitted. For example, when the PSFCH is configured for every two slots in the resource pool, the determination is made based on a slot with the PSFCH.

method A-4: determines an average value of the numbers of symbols available for sidelink PSSCH transmission among slots configured in the resource pool in which the PSSCH is transmitted. For example, when the PSFCH is configured for every two slots in the resource pool, the average of numbers of symbols available for the PSSCH in slots with the PSFCH and slots without the PSFCH is determined.

method A-5: determines a value of the ceiling function (rounding up) of the average of the numbers of symbols available for sidelink PSSCH transmission among slots configured in the resource pool in which the PSSCH is transmitted.

method A-6: determines a value of the flooring function (rounding down) of the average of the numbers of symbols available for sidelink PSSCH transmission among slots configured in the resource pool in which the PSSCH is transmitted.

method A-7: determines a value of the rounding function (rounding off) of the average of the numbers of symbols available for sidelink PSSCH transmission among slots configured in the resource pool in which the PSSCH is transmitted.

The first sidelink symbol available for the purpose of e.g., AGC is not included in the above methods. However, what are described above are merely examples, and embodiments of the disclosure are not limited thereto, and the aforementioned methods of determining the number of OFDM symbols $N_{symb}^{sh}$ may be applied even with the first sidelink symbol included.

The following methods will be applied when the size of frequency resources allocated for initial transmission is different from the size of frequency resources allocated for retransmission. Alternatively, the following methods will be applied when the size of frequency resources allocated for initial transmission corresponds to 1 sub-channel. Alternatively, the following methods will be applied when the size of frequency resources allocated for initial transmission corresponds to 1 sub-channel and the size of frequency resources allocated for retransmission is greater than 1 sub-channel. A 1-bit indicator may be included in the first control information or the second control information to indicate which one of the aforementioned cases matches the size of the allocated frequency resources, and whether the 1-bit indicator is included may be included in configuration or pre-configuration information corresponding to the resource pool, sent to and used by the UE.

method 1-1: $n_{PRB}$ used to calculate the TBS may be determined to be the number of PRBs included in sub-channels allocated for sidelink retransmission.

method 1-2: $n_{PRB}$ used to calculate the TBS may be determined to be a sum of the number of PRBs included in sub-channels allocated for sidelink retransmission and the number of PRBs included in 1 sub-channel allocated for initial transmission.

method 1-3: $n_{PRB}$ used to calculate the TBS may be the number of PRBs included in the number of sub-channels obtained from an RIV value interpreted from a resource allocation bit field included in the first control information used for scheduling in sidelink data transmission.

That it is determined to be the number of PRBs obtained from the number of sub-channels may mean that it is determined to be $n_{PRB}=n_{subchannel} \times N_{PRB\_per\_subchannel}$. $n_{subchannel}$ may be the number of sub-channels used for data allocation or PSSCH allocation, or a value induced from the RIV obtained from the first control information, and $N_{PRB\_per\_subchannel}$ is the number of PRBs included in one sub-channel, which may be a value included in a resource pool configuration or a value induced from the resource pool configuration information.

Third Embodiment

The third embodiment of the disclosure provides a method and apparatus by which the UE selects an MCS for sidelink data transmission.

For sidelink data transmission or reception, an initial transmission resource of a TB may be fixedly transmitted in X sub-channels, and likewise, an associated retransmission resource may be transmitted using the X sub-channels. In this case, for the initial transmission and retransmission, to put MCS index information into the control information, the UE may need to use an MCS index that includes information about both a modulation order and a coding rate.

According to an embodiment of the disclosure, MCS indexes available for the transmitting UE may be limited. For example, as a method of limiting the MCS indexes for the transmitting UE, at least one of Table 22, Table 23 or Table 24 below related to the MCS may be used. According to Table 22 below related to the MCS, the MCS index may be limited so that the UE uses only MCS indexes having values equal to or smaller than 28. This is for the receiving UE to accurately know of the TBS in retransmission even when the receiving UE misses control information in initial transmission. When the receiving terminal fails to receive the control information (SCI) in the initial transmission, and the transmitting UE uses a value greater than 28 for the MCS index in the control information in the retransmission (for example, when the transmitting UE informs only Qm in the retransmission), the receiving UE may not know of the TBS because the receiving UE is unable to know of the target code rate (or a coding rate), and therefore, is unable to decode data.

TABLE 22

| MCS Index $I_{MCS}$ | Modulation Order $Q_m$ | Target code Rate R × [1024] | Spectral efficiency |
|---|---|---|---|
| 0 | 2 | 120 | 0.2344 |
| 1 | 2 | 157 | 0.3066 |
| 2 | 2 | 193 | 0.3770 |
| 3 | 2 | 251 | 0.4902 |
| 4 | 2 | 308 | 0.6016 |
| 5 | 2 | 379 | 0.7402 |
| 6 | 2 | 449 | 0.8770 |
| 7 | 2 | 526 | 1.0273 |

TABLE 22-continued

| MCS Index $I_{MCS}$ | Modulation Order $Q_m$ | Target code Rate R × [1024] | Spectral efficiency |
|---|---|---|---|
| 8 | 2 | 602 | 1.1758 |
| 9 | 2 | 670 | 1.3262 |
| 10 | 4 | 340 | 1.3281 |
| 11 | 4 | 378 | 1.4766 |
| 12 | 4 | 434 | 1.6953 |
| 13 | 4 | 490 | 1.9141 |
| 14 | 4 | 553 | 2.1602 |
| 15 | 4 | 610 | 2.4063 |
| 16 | 4 | 658 | 2.5703 |
| 17 | 6 | 438 | 2.5664 |
| 18 | 6 | 466 | 2.7305 |
| 19 | 6 | 517 | 3.0293 |
| 20 | 6 | 567 | 3.3223 |
| 21 | 6 | 616 | 3.6094 |
| 22 | 6 | 666 | 3.9023 |
| 23 | 6 | 719 | 4.2129 |
| 24 | 6 | 772 | 4.5234 |
| 25 | 6 | 822 | 4.8164 |
| 26 | 6 | 873 | 5.1152 |
| 27 | 6 | 910 | 5.3320 |
| 28 | 6 | 948 | 5.5547 |
| 29 | 2 | reserved | |
| 30 | 4 | reserved | |
| 31 | 6 | reserved | |

According to Table 23 below related to the MCS, the MCS index may be limited so that the UE uses only MCS indexes having values equal to or smaller than 27.

TABLE 23

| MCS Index $I_{MCS}$ | Modulation Order $Q_m$ | Target code Rate R × [1024] | Spectral efficiency |
|---|---|---|---|
| 0 | 2 | 120 | 0.2344 |
| 1 | 2 | 193 | 0.3770 |
| 2 | 2 | 308 | 0.6016 |
| 3 | 2 | 449 | 0.8770 |
| 4 | 2 | 602 | 1.1758 |
| 5 | 4 | 378 | 1.4766 |
| 6 | 4 | 434 | 1.6953 |
| 7 | 4 | 490 | 1.9141 |
| 8 | 4 | 553 | 2.1602 |
| 9 | 4 | 616 | 2.4063 |
| 10 | 4 | 658 | 2.5703 |
| 11 | 6 | 466 | 2.7305 |
| 12 | 6 | 517 | 3.0293 |
| 13 | 6 | 567 | 3.3223 |
| 14 | 6 | 616 | 3.6094 |
| 15 | 6 | 666 | 3.9023 |
| 16 | 6 | 719 | 4.2129 |
| 17 | 6 | 772 | 4.5234 |
| 18 | 6 | 822 | 4.8164 |
| 19 | 6 | 873 | 5.1152 |
| 20 | 8 | 682.5 | 5.3320 |
| 21 | 8 | 711 | 5.5547 |
| 22 | 8 | 754 | 5.8906 |
| 23 | 8 | 797 | 6.2266 |
| 24 | 8 | 841 | 6.5703 |
| 25 | 8 | 885 | 6.9141 |
| 26 | 8 | 916.5 | 7.1602 |
| 27 | 8 | 948 | 7.4063 |
| 28 | 2 | reserved | |
| 29 | 4 | reserved | |
| 30 | 6 | reserved | |
| 31 | 8 | reserved | |

According to Table 24 below related to the MCS, the MCS index may be limited so that the UE uses only MCS indexes having values equal to or smaller than 28.

TABLE 24

| MCS Index $I_{MCS}$ | Modulation Order $Q_m$ | Target code Rate R × [1024] | Spectral efficiency |
|---|---|---|---|
| 0 | 2 | 30 | 0.0586 |
| 1 | 2 | 40 | 0.0781 |
| 2 | 2 | 50 | 0.0977 |
| 3 | 2 | 64 | 0.1250 |
| 4 | 2 | 78 | 0.1523 |
| 5 | 2 | 99 | 0.1934 |
| 6 | 2 | 120 | 0.2344 |
| 7 | 2 | 157 | 0.3066 |
| 8 | 2 | 193 | 0.3770 |
| 9 | 2 | 251 | 0.4902 |
| 10 | 2 | 308 | 0.6016 |
| 11 | 2 | 379 | 0.7402 |
| 12 | 2 | 449 | 0.8770 |
| 13 | 2 | 526 | 1.0273 |
| 14 | 2 | 602 | 1.1758 |
| 15 | 4 | 340 | 1.3281 |
| 16 | 4 | 378 | 1.4766 |
| 17 | 4 | 434 | 1.6953 |
| 18 | 4 | 490 | 1.9141 |
| 19 | 4 | 553 | 2.1602 |
| 20 | 4 | 616 | 2.4063 |
| 21 | 6 | 438 | 2.5664 |
| 22 | 6 | 466 | 2.7305 |
| 23 | 6 | 517 | 3.0293 |
| 24 | 6 | 567 | 3.3223 |
| 25 | 6 | 616 | 3.6094 |
| 26 | 6 | 666 | 3.9023 |
| 27 | 6 | 719 | 4.2129 |
| 28 | 6 | 772 | 4.5234 |
| 29 | 2 | reserved | |
| 30 | 4 | reserved | |
| 31 | 6 | reserved | |

Fourth Embodiment

In the fourth embodiment, a method and apparatus by which the UE transmits or receives control information or data for sidelink is provided.

A UE that is going to transmit data in a sidelink resource pool first performs searching for a resource to determine which sidelink resource is used to transmit the data. This may be called channel sensing, and the channel sensing may be to search for a resource in advance for initial transmission and retransmission of particular data, TB, or CB. In this channel sensing procedure, sizes of resources in the frequency domain found for initial transmission and retransmission may be different. Specifically, there may be an occasion when only 1 sub-channel or 10 PRBs may be used for initial transmission, and 4 sub-channels or 40 PRBs may be used for retransmission.

In this case, a TB transmitted in 1 sub-channel in initial transmission may need to have the same size as a TB transmitted in retransmission. Hence, the UE may require a method of determining a suitable TB size (TBS). The UEs for transmitting and receiving control information and data may use one or a combination of the following methods to determine the size of a TB for transmission and reception.

The following methods may be to determine $n_{PRB}$ in an equation of $N_{RE} = \min(156, N_{RE}') \cdot n_{PRB}$ required for calculating ARE among the aforementioned methods of determining the TBS. The method of determining the TBS may be summarized as in the following steps 1 to 4.

step 1: calculate the number of RES $N_{RE}'$ allocated for PDSCH mapping within a PRB in an allocated resource. $N_{RE}'$ may be calculated to be $N_{RE}' = N_{sc}^{RB} \cdot N_{symb}^{sh} - N_{DMRS}^{PRB} - N_{oh}^{PRB}$. where $N_{sc}^{RB}$ refers to the number of subcarriers (e.g., 12) included in one RB, $N_{symb}^{sh}$ refers to the number of OFDM symbols allocated for a PDSCH, $N_{DMRS}^{PRB}$ refers to the number of REs in one PRB occupied by a DMRS in the same code division multiplexing (CDM) group, and $N_{oh}^{PRB}$ refers to the number of REs (e.g., set to be at least one of 0, 6, 12, or 18) occupied by an overhead in one PRB configured by higher layer signaling. Subsequently, a total number of RES, $N_{RE}$, allocated for the PDSCH may be calculated. $N_{RE}$ is calculated to be $N_{RE} = \min(156, N_{RE}') \cdot n_{PRB}$. $n_{PRB}$ refers to the number of PRBs allocated for the UE.

step 2: the number of arbitrary information bits $N_{info}$ may be calculated to be $N_{info} = N_{RE} \cdot R \cdot Q_m \cdot v$. R refers to a code rate, Qm refers to a modulation order, and v refers to the number of allocated layers. The code rate and the modulation order may be delivered by using a predetermined corresponding relation with an MCS field included in the control information. A TBS may be calculated according to the following step 3 when $N_{info} \leq 3824$, or otherwise, according to the following step 4.

step 3: $N_{info}'$ may be calculated with $$N_{info}' = \max\left(24, 2^n \cdot \left\lfloor \frac{N_{info}}{2^n} \right\rfloor\right) \text{ and } n = \max(3, \lfloor \log_2(N_{info}) \rfloor - 6).$$

The TBS may then be determined to be a value nearest to $N_{info}'$ among values not smaller than $N_{info}'$ in Table 5.

step 4: $N_{info}'$ may be calculated according to $$N_{info}' = \max\left(3840, 2^n \times \text{round}\left(\frac{N_{info} - 24}{2^n}\right)\right) \text{ and } n = \lfloor \log_2(N_{info} - 24) \rfloor - 5.$$

The TBS may then be determined by pseudo codes as in Table 6 and the value of $N_{info}'$.

In the methods of determining the TBS in sidelink transmission or reception, a value smaller than 156 instead of 156, e.g., 144, in the equation $N_{RE} = \min(156, N_{RE}') \cdot n_{PRB}$ may be used. The value used instead of 156 may be determined depending on the slot belonging to the resource pool, and for example, may be determined depending on whether the slot includes a PSFCH resource. For example, when a PSFCH resource is not included in the slot, 144 may be used instead of 156, and when a PSFCH resource is included in the slot, 120 may be used instead of 156. Alternatively, there may be a method of determining the TBS by using a value X set based on the resource pool in a method like $N_{RE} = \min(X, N_{RE}') \cdot n_{PRB}$. For example, the value X may be set including such a value as X=144 or 120 through an indicator made up with at least e.g., one bit. Furthermore, it may be represented by $N_{RE} = \min(12 \times Y, N_{RE}') \cdot n_{PRB}$, and may be determined using a suitable integer value Y, where $0 < Y \leq 13$. For example, the Y may be set to a value (symbol unit) including such a value as Y=12 or 10 through an indicator made up with at least one bit. This is because as described in the first embodiment, the number of symbols used for data mapping in the slot for sidelink transmission or reception may be smaller than that used for UL or DL transmission with the BS. The reason may be that the first symbol duplicates the second symbol to be used for AGC for the sidelink data transmission or reception and at least the last symbol is a gap symbol, which is not used for data transmission.

In the embodiment, as a method of calculating the number of REs to which a PSSCH is mapped within one slot, a method applied in the following step 1 is proposed.

step 1: calculate the number of RES $N_{RE}'$ allocated for PSSCH mapping within a PRB in an allocated resource. $N_{RE}'$ may be calculated to be $N_{RE}' = N_{symb}^{RB} \cdot N_{symb}^{sh} - N_{DMRS}^{PRB} - N_{oh}^{PRB} - N_{symb}^{PSCCH\_RB} \cdot N_{symb}^{PSCCH}$. In this case, $N_{sc}^{RB}$ is the number of subcarriers included in one RB (e.g., 12), $N_{symb}^{sh}$ is the number of OFDM symbols allocated for the PSSCH, $N_{DMRS}^{PRB}$ is the number of REs in one PRB occupied by a DMRS in the same CDM group, $N_{oh}^{PRB}$ refers to the number of REs occupied by an overhead in one PRB configured by higher layer signaling (e.g., one of 0, 6, 12, and 18). This value may be a (pre) set value in the resource pool.

$N_{symb}^{PSCCH\_RB}$ is the number of RBs used for the PSCCH, which may be a (pre) set value in the resource pool.

$N_{symb}^{PSCCH}$ is the number of symbols used for the PSCCH, which does not include an AGC symbol (i.e., the first symbol used for sidelink). This value may be a (pre) set value in the resource pool.

Subsequently, a total number of RES, $N_{RE}$, allocated for the PSSCH may be calculated. $N_{RE}$ is calculated to be $N_{RE} = \min(156, N_{RE}') \cdot n_{PRB}$. $n_{PRB}$ refers to the number of PRBs allocated for the UE.

The number of OFDM symbols $N_{symb}^{sh}$ allocated for the PSSCH may be determined according to at least one of the following methods:

method A-1: determines as the number of symbols to which the PSSCH is mapped within a slot in which the PSSCH is transmitted.

method A-2: determines the largest of the numbers of symbols available for sidelink PSSCH transmission among slots configured in the resource pool in which the PSSCH is transmitted. For example, when the PSFCH is configured for every two slots in the resource pool, the determination is made based on a slot with no PSFCH.

method A-3: determines the smallest of the numbers of symbols available for sidelink PSSCH transmission among slots configured in the resource pool in which the PSSCH is transmitted. For example, when the PSFCH is configured for every two slots in the resource pool, the determination is made based on a slot with the PSFCH.

method A-4: determines an average value of the numbers of symbols available for sidelink PSSCH transmission among slots configured in the resource pool in which the PSSCH is transmitted. For example, when the PSFCH is configured for every two slots in the resource pool, the average of the numbers of symbols available for the PSSCH in slots with the PSFCH and slots without the PSFCH is determined.

method A-5: determines a value of the ceiling function (rounding up) of the average of the numbers of symbols available for sidelink PSSCH transmission among slots configured in the resource pool in which the PSSCH is transmitted.

method A-6: determines a value of the flooring function (rounding down) of the average of the numbers of symbols available for sidelink PSSCH transmission among slots configured in the resource pool in which the PSSCH is transmitted.

method A-7: determines a value of the rounding function (rounding off) of the average of the numbers of symbols available for sidelink PSSCH transmission among slots configured in the resource pool in which the PSSCH is transmitted.

The first sidelink symbol available for the purpose of e.g., AGC is not included in the above methods. Symbols defined to be gap symbols is not included, either. However, what are described above are merely examples, and embodiments of the disclosure are not limited thereto, and the aforementioned methods of determining the number of OFDM symbols $N_{symb}^{sh}$ may be applied even with the first sidelink symbol included. It may also be applied to a case that includes symbols defined to be gap symbols. Furthermore, a region to which second SCI or the like is mapped may be considered, and may be additionally excluded in determining the number of OFDM symbols $N_{symb}^{sh}$ allocated for the PSSCH.

Moreover, $N_{oh}^{PRB}$ refers to the number of REs occupied by an overhead in one PRB configured by higher layer signaling. This value may be a (pre) set value in the resource pool. For the values to be preset as $N_{oh}^{PRB}$, not only 0, 6, 12, and 18 used by the traditional NR system but also greater values may be applied because the second SCI may be taken into account. For example, a value of $N_{oh}^{PRB}$ may be set from among 0, 6, 12, 18, 24, 30, 36, and 42, or set to be one of 0, 6, 12, 18, 36, 60, 84, and 108.

Fifth Embodiment

In the fifth embodiment, a method and apparatus by which the UE transmits or receives control information or data for sidelink is provided. For mapping of the second SCI in the PSSCH during 2-layer transmission in particular, a method and apparatus for mapping the same modulation symbol to two layers is provided.

First, the UE may perform the following scrambling or descrambling operations for the PSSCH. In the embodiment, the UE is an entity for performing sidelink transmission or reception, and for example, the UE may be an RSU or the like.

for a single codeword q=0, a block of bits $b^{(q)}(0), \ldots, b^{(q)}(M_{bit}^{(q)}-1)$ needs to be scrambled before being modulated. where $M_{bit}^{(q)} = M_{bit,SCI2}^{(q)} + M_{bit,data}^{(q)}$, and $M_{bit}^{(q)}$ refers to the number of coded bits of the q-th codeword transmitted in the physical channel. $M_{bit,SCI2}^{(q)}$ is the number of coded bits of the second control information, and $M_{bit,data}^{(q)}$ is the number of coded bits of data or TB to be transmitted.

assume that there are scramble sequence $c^{(q)}(i)$ and the following sequence $\tilde{M}^{(q)}$. (a sequence provided in section 5.2.1 of TS38.211 (based on Release 16), which is one of 5G NR standards, may be used for the sequence $c^{(q)}(i)$.)

--- for $0 \leq i < M_{bit,SCI2}^{(q)}$
- $\tilde{M}^{(q)} = 0$
  (scramble sequence generator may be initialized according to $c_{init,SCI2}$)
for $M_{bit,SCI2}^{(q)} \leq i < M_{bit}^{(q)}$
- $\tilde{M}^{(q)} = M_{bit,SCI2}^{(q)}$
  (scramble sequence general may be initialized according to $c_{init,data}$)

--- where $\tilde{M}^{(q)}$ may be represented by $\tilde{M}^{(q)}(i)$ based on index i. $c_{init,SCI2}$ and $c_{init,data}$ may be set to the same value. Alternatively, $c_{init,SCI2}$ and $c_{init,data}$ may be set to different values. $c_{init,SCI2}$ and $c_{init,data}$ may be set based on a CRC of SCI1 or preset information.

scrambling may be performed based on the following pseudo code scheme.

```
set i = 0
while i < M_bit^(q)
    b̃^(q)(i) = (b^(q)(i) + c^(q)(i − M̃^(q))) mod 2
    i = i + 1
end while
```

The scrambling scheme is performed such that different scrambling schemes are not applied depending on the value of b (q) (i) but the same scrambling scheme is applied regardless of the value of b (q) (i). For example, whether the value of b (q) (i) is a particular placeholder bit (or value) or not is determined to apply different scrambling schemes to the respective cases, but in the embodiment, it may be seen that one scrambling scheme is applied.

For the single codeword q=0, the UE may perform modulation such that a block of scrambled bits becomes the following block of complex-valued modulation symbols: $d^{(q)}(0), \ldots, d^{(q)}(M_{symb}^{(q)}-1)$ (where $M_{symb}^{(q)}=M_{symb,1}^{(q)}++M_{symb,2}^{(q)}$). Furthermore, actual modulation may be performed according to the content described in section 5.1 of TS38.211, which is one of 5G NR standards, and may have the following characteristics:

for $0 \leq i < M_{bit,SCI2}^{(q)}$, $\{b̃^{(q)}(2i), b̃^{(q)}(2i+1)\}$ bit pairs become u QPSK modulation symbols ($v \in \{1,2\}$), and the QPSK symbol becomes $d^{(q)}(i)$ when u=1 and $d^{(q)}(2i)$, $d^{(q)}(2i+1)$ when u=2. (where $M_{symb,1}^{(q)}=vM_{bit,SCI2}^{(q)}/2$.)

in a case of $M_{bit,SCI2}^{(q)} \leq i < M_{bit}^{(q)}$, modulation is performed using one of QPSK, 16QAM, 64QAM, and 256QAM modulation schemes. (where modulation orders $Q_m$ of the modulation schemes are 2, 4, 6, and 8, respectively, and $M_{symb,2}^{(q)}=M_{bit,data}^{(q)}/Q_m$.)

The UE may perform layer mapping for the number of layers $v \in \{1,2\}$, according to the content described in section 7.3.1.3 of TS38.211, and a result of layer mapping of the complex-valued modulation symbols, x(i) may be represented by $x(i)=[x^{(0)}(i) \ldots x^{(v-1)}(i)]^T$, and $i=0,1, \ldots, M_{symb}^{layer}-1$. Furthermore, the UE may perform precoding for the vector block $[x^{(0)}(i) \ldots x^{(v-1)}(i)]^T$, according to the description in section 6.3.1.5 of TB38.211, where precoding matrix W corresponds to an identity matrix, and $M_{symb}^{ap}=M_{symb}^{layer}$.

Subsequently, the UE may perform mapping for a virtual resource block as follows:

To conform to the transmission power specified in TS38.213, which is one of the 5G NR standards, a block of the complex-valued symbols, $z^{(p)}(0), \ldots, z^{(p)}(M_{symb}^{ap}-1)$, may be multiplied by an amplitude scaling factor $\beta_{DM-RS}^{PSSCH}$ for each antenna port, and may also be mapped to resource elements $(k',l)_{p,\mu}$ in a virtual resource block allocated for transmission. (where k'=0 refers to the first subcarrier in the lowest-numbered virtual resource block allocated for transmission.) There may be a need to satisfy the following criteria for the mapping of the virtual resource block:

the complex-valued symbols are in a virtual resource allocated for transmission.

corresponding resource elements in the corresponding physical resource blocks are not used for transmission of associated DM-RS, PT-RS, CSI-RS, or PSCCH.

In an embodiment of the disclosure, a specific mapping operation may be performed in a procedure of the following two steps:

first, the complex-valued symbols corresponding to the bit for the 2nd-stage SCI need to be arranged (mapped) in increasing order of subcarrier index k' on the allocated virtual resource blocks. Furthermore, mapping is performed from the first symbol in which a DMRS of the PSSCH is transmitted in increasing order starting from time domain symbol index 1 of the allocated resource block. (first, the complex-valued symbols corresponding to the bit for the 2nd-stage SCI shall be in increasing order of first the index k' over the assigned virtual resource blocks and then the index I, starting a the first PSSCH symbol carrying an associated DM-RS)

secondly, the complex-valued symbols not corresponding to the second state SCI need to increase in the order of subcarrier index k' for the allocated virtual resource block first, and then increase in the order of the time domain symbol index I in the start position given by TS 38.214. Resource elements used for the second stage SCI are prevented from being used for mapping in this step. (secondly, the complex-valued modulation symbols not corresponding to the $2^{nd}$-stage SCI shall be in in increasing order of first the index k' over the assigned virtual resource blocks, and then the index I with the starting position given by [6, TS 38.214]. Resource elements used for $2^{nd}$-stage SCI in the first step shall not be used for mapping in this step.)

In the above mapping operation, the resource element used for the PSSCH in the first OFDM symbol needs to be duplicated from an OFDM symbol right before the first OFDM symbol in mapping. (The resource elements used for the PSSCH in the first OFDM symbol in the mapping operation above shall be duplicated in the OFDM symbol immediately preceding the first OFDM symbol in the mapping.) The is the case not only for the PSSCH but also for a PSSCH, a PSCCH, a DMRS or the like, in which case the second symbol used for sidelink may be duplicated into the first symbol as it is and mapped even to the first symbol.

Subsequently, a procedure for mapping virtual resource blocks to physical resource blocks may be performed according to a non-interleaved mapping scheme in which interleaving is not applied. In the case of using the mapping scheme in which interleaving is not applied, for VRB-to-PRB mapping, virtual resource block n may be mapped to physical resource block n.

Sixth Embodiment

In the sixth embodiment, a method and apparatus by which the UE transmits or receives control information or data for sidelink is provided. For mapping of the second SCI in the PSSCH during 2-layer transmission in particular, a method and apparatus for mapping the same modulation symbol to two layers is provided.

First, the UE may perform the following scrambling or descrambling operations for the PSSCH. In the embodiment, the UE is an entity for performing sidelink transmission or reception, and for example, the UE may be an RSU or the like.

for a single codeword q=0, a block of bits $b^{(q)}(0), \ldots, b^{(q)}(M_{bit}^{(q)}-1)$ needs to be scrambled before being modulated, where $M_{bit}^{(q)}=M_{bit,SCI2}^{(q)}+M_{bit,data}^{(q)}$, and $M_{bit}^{(q)}$ refers to the number of coded bits of the q-th codeword transmitted in the physical channel. $M_{bit,SCI2}^{(q)}$ is the number of coded bits of the second control information, and $M_{bit,data}^{(q)}$ is the number of coded bits of data or TB to be transmitted.

scrambling may be performed based on the following pseudo code scheme.

```
set i = 0
while i < M_bit^(q)
    if 0 ≤ i < M_bit,SCI2^(q)
        b̃^(q)(i) = (b^(q)(i) + c^(q)(i)) mod 2
        (scramble sequence generator may be initialized according to c_init,SCI2)
    else
        b̃^(q)(i) = (b^(q)(i) + c^(q)(i)) mod 2
        (scramble sequence generator may be initialized according to c_init,data)
    end if
    i = i + 1
end while
```

(a sequence provided in section 5.2.1 of TS38.211 (based on Release 16), which is one of 5G NR standards may be used for the scrambling sequence $c^{(q)}(i)$.)

$c_{init,SCI2}$ and $c_{init,data}$ may be set to the same value. Alternatively, $c_{init,SCI2}$ and $c_{init,data}$ may be set to different values. $c_{init,SCI2}$ and $c_{init,data}$ may be set based on a CRC of SCI1 or preset information.

The scrambling scheme is performed such that different scrambling schemes are not applied depending on the value of $b^{(q)}(i)$ but the same scrambling scheme is applied regardless of the value of $b^{(q)}(i)$. However, for initialization values for generating a scrambling sequence, different values like $c_{init,SCI2}$ and $c_{init,data}$ may be applied according to the second SCI or data. (It is natural that the initialization values may have the same value.) Furthermore, the initialization values may be equally used, and even different scrambling schemes may be applied.

Subsequent steps, e.g., modulation and layer mapping, precoding, virtual resource block mapping and physical resource block mapping methods are the same as what are described above in the fifth embodiment, so the contents described in the fifth embodiment may be applied in this case analogically (equally).

Seventh Embodiment

According to section 6.2 of TS38.212 (based on Release 16), which is one of 5G NR standard documents, processing of an SL-SCH transport channel is almost the same as processing of UL-SCH, but may differ in terms of how to multiplex data and control information, which will be described as follows:

First, assume that encoded bits for SL-SCH are $g_0^{SL-SCH}$, $g_1^{SL-SCH}$, $g_2^{SL-SCH}$, $g_3^{SL-SCH}$, ..., $g_{G^{SL-SCH}-1}^{SL-SCH}$, and encoded bits for SCI format 0-2 are $g_0^{SCI2}$, $g_1^{SCI2}$, $g_2^{SCI2}$, $g_3^{SCI2}$, ..., $g_{G^{SL-SCH}-1}^{SCI2}$. Furthermore, assume that a bitstream of the encoded bits of multiplexed data and control information is $g_0, g_1, \ldots, g_{G-1}$. (G refers to a total number of encoded bits for transmission.)

The encoded bits $g_0, g_1, \ldots, g_{G-1}$ of the multiplexed data and control information may be obtained according to the following pseudo code scheme.

```
for i = 0 to G^SCI2 + G^SL-SCH - 1
    if 0 ≤ i < G^SCI2
        g_i = g_i^SCI2
    end if
    if G^SCI2 ≤ i ≤ G^SCI2 + G^SL-SCH - 1
        g_i = g_{i-G^SCI2}^SL-SCH
    end if
end for
```

There may be a method of performing multiplexing based on the number $N_L$ of layers to which the SL-SCH transport block is mapped or a modulation order $Q_m^{SCI}2$ of the SCI format 0-2. In the seventh embodiment, multiplexing may be performed regardless of the number $N_L$ of layers or the modulation order $Q_m^{SCI}2$ of the SCI format 0-2.

Eighth Embodiment

In the eighth embodiment, a method and apparatus by which the UE transmits or receives control information or data for sidelink is provided. For mapping of the second SCI in the PSSCH during 2-layer transmission in particular, a method and apparatus for mapping the same modulation symbol to two layers is provided.

First, the UE may perform the following scrambling or descrambling operations for the PSSCH. In the embodiment, the UE is an entity for performing sidelink transmission or reception, and for example, the UE may be an RSU or the like.

for a single codeword q=0, a block of bits $b^{(q)}(0), \ldots, b^{(q)}(M_{bit}^{(q)}-1)$ needs to be scrambled before being modulated, where $M_{bit}^{(q)} = M_{bit,SCI2}^{(q)} + M_{bit,data}^{(q)}$, and $M_{bit}^{(q)}$ refers to the number of coded bits of the q-th codeword transmitted in the physical channel. $M_{bit,SCI2}^{(q)}$ is the number of coded bits of the second control information, and $M_{bit,data}^{(q)}$ is the number of coded bits of data or TB to be transmitted.

assume that there are scramble sequence $c^{(q)}(i)$ and the following sequence $\tilde{M}^{(q)}$. (a sequence provided in section 5.2.1 of TS38.211 (based on Release 16), which is one of 5G NR standards, may be used for the sequence $c^{(q)}(i)$.)

```
for 0 ≤ i < M_bit,SCI2^(q)
    - M̃^(q) = 0
    (scramble sequence generator may be initialized according to c_init,SCI2)
for M_bit,SCI2^(q) ≤ i < M_bit^(q)
    - M̃^(q) = M_bit,SCI2^(q)
    (scramble sequence general may be initialized according to c_init,data)
``` where $\tilde{M}^{(q)}$ may be represented by $\tilde{M}^{(q)}(i)$ based on index i. $c_{init,SCI2}$ and $c_{init,data}$ may be set to the same value. Alternatively, $c_{init,SCI2}$ and $c_{init,data}$ may be set to different values. $c_{init,SCI2}$ and $c_{init,data}$ may be set based on a CRC of SCI1 or preset information.

scrambling may be performed based on the following pseudo code scheme.

```
set i = 0
while i < M_bit^(q)
    if b^(q)(i) = x        // SCI placeholder bits
        b̃^(q)(i) = (b̃^(q)(i - 2)
    else
        b̃^(q)(i) = (b^(q)(i) + c^(q)(i - M̃^(q))) mod 2
    else
    i = i + 1
end while
```

The scrambling scheme corresponds to an embodiment in which different scrambling schemes are applied depending on the value of $b^{(q)}(i)$, in which case whether the value of $b^{(q)}(i)$ is a particular placeholder bit (or value) or not is determined to apply a predetermined scrambling scheme to each case.

For the single codeword q=0, the UE may perform modulation such that a block of scrambled bits becomes the following block of complex-valued modulation symbols: $d^{(q)}(0), \ldots, d^{(q)}(M_{symb}^{(q)}-1)$ (where $M_{symb}^{(q)}=M_{symb,1}^{(q)}+M_{symb,2}^{(q)}$). Furthermore, actual modulation may be performed according to the content described in section 5.1 of TS38.211, which is one of 5G NR standards, and may have the following characteristics:

for $0 \leq i < M_{bit,SCI2}^{(q)}$, each $\{\tilde{b}^{(q)}(2i), \tilde{b}^{(q)}(2i+1)\}$ bit pair becomes QPSK modulation symbol $d^{(q)}(i)$. (where $M_{symb,1}^{(q)}=M_{bit,SCI2}^{(q)}/2$.) (That is, a bit pair generates one QPSK symbol or corresponds to one QPSK symbol.)

in a case of $M_{bit,SCI2}^{(q)} \leq i < M_{bit}^{(q)}$, modulation is performed using one of QPSK, 16QAM, 64QAM, and 256QAM modulation schemes. (where modulation orders $Q_m$ of the modulation schemes are 2, 4, 6, and 8, respectively, and $M_{symb,2}^{(q)}=M_{bit,data}^{(q)}/Q_m$.)

Subsequent steps, e.g., layer mapping, precoding, virtual resource block mapping and physical resource block mapping methods are the same as what are described above in the fifth embodiment, so the contents described in the fifth embodiment may be applied in this case analogically (equally).

According to section 6.2 of TS38.212 (based on Release 16), which is one of 5G NR standard documents, processing of an SL-SCH transport channel is almost the same as processing of UL-SCH, but may differ in terms of how to multiplex data and control information, which will be described as follows:

First, assume that encoded bits for SL-SCH are $g_0^{SL-SCH}$, $g_1^{SL-SCH}$, $g_2^{SL-SCH}$, $g_3^{SL-SCH}$, ..., $g_{G^{SL-SCH}-1}^{SL-SCH}$, and encoded bits for SCI format 0-2 are $g_0^{SCI}2$, $g_1^{SCI}2$, $g_2^{SCI}2$, $g_3^{SCI}2$, ..., $g_{G^{SL-SCH}-1}^{SCI}2$. Furthermore, assume that a bitstream of the encoded bits of multiplexed data and control information is $g_0, g_1, \ldots, g_{G-1}$. (G refers to a total number of encoded bits for transmission.)

Assuming that $N_L$ is the number of layers to which the SL-SCH transport block is mapped and $Q_m^{SCI}2$ is a modulation order of the SCI format 0-2, encoded bits $g_0, g_1, \ldots, g_{G-1}$ of the multiplexed data and control information may be obtained according to the following pseudo code scheme.

```
if N_L = 1,
    for i = 0 to G^SCI2 + G^SL-SCH - 1
        if 0 ≤ i < G^SCI2
            g_i = g_i^SCI2
        end if
        if G^SCI2 ≤ i ≤ G^SCI2 + G^SL-SCH - 1
            g_i = g_{i-G^SCI2}^SL-SCH
        end if
    end for
end if
if N_L = 2,
    let M_count,SCI2^RE = G^SCI2 / Q_m^SCI2
    set m_count^RE = 0
    for i = 0 to M_count,SCI2^RE - 1
        for v = 0 to N_L - 1
            for q = 0 to Q_m^SCI2 - 1
                if v = 0
                    g_{m_count}^RE = g_{i·Q_m SCI2+ q}^SCI2
                else
                    g_{m_count}^RE = x  // placeholder bit
                end if
                m_count^RE = m_count^RE + 1
            end for
        end for
    end for
```

```
    for i = 0 to G^SL-SCH - 1
        g_{m_count}^RE = g_i^SL-SCH
        m_count^RE = m_count^RE + 1
    end for
end if
```

As such, there may be a method of performing multiplexing based on the number $N_L$ of layers to which the SL-SCH transport block is mapped or a modulation order $Q_m^{SCI}2$ of the SCI format 0-2.

Although the first to seventh embodiments of the disclosure are separately described for convenience of explanation, it is possible to combine two or more of the embodiments because each embodiment includes mutually-related functions. Furthermore, methods of receiving control and data information in initial transmission and retransmission when there is HARQ-ACK feedback and embodiments thereof are described in the disclosure, but the methods and apparatuses proposed in the disclosure may be equally applied to a system without HARQ-ACK feedback.

Moreover, although methods of receiving control and data information in consideration of initial transmission and retransmission and embodiments thereof are described in the disclosure for convenience of explanation, the same methods or their embodiments may be equally applied to an occasion when repeated transmission for the initial transmission is used instead of retransmission. The repeated transmission refers to an additional transmission corresponding to a TB used in the initial transmission after the initial transmission.

Figure 25:
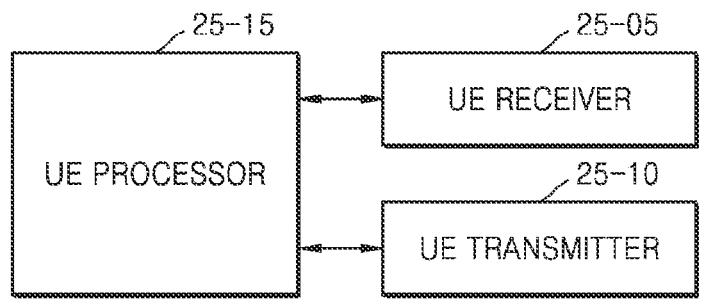
FIG. 25 is a block diagram illustrating an internal configuration of a UE, according to an embodiment of the disclosure.
Figure 26:
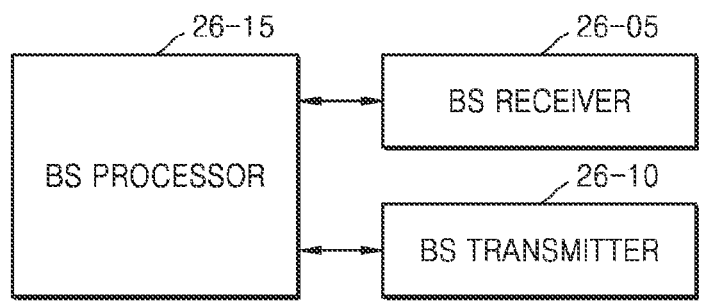
FIG. 26 is a block diagram of an internal configuration of a BS, according to an embodiment of the disclosure.

Transmitters, receivers, and processors of the UE and the BS to implement the embodiments of the disclosure are shown in FIG. 25 (and FIG. 27) and FIG. 26 (and FIG. 28), respectively. Transmission or reception methods between the BS and the UE or between a transmitting UE and a receiving UE to perform operations for determining signal transmission or reception as described in the first to fourth embodiments are described, and to perform the methods, transmitters, receivers, and processors of the UE and the BS may operate according to the respective embodiments.

FIG. 25 is a block diagram illustrating an internal configuration of a UE, according to an embodiment of the disclosure.

Referring to FIG. 25, a UE may include a UE receiver 25-05, a UE transmitter 25-10, and a UE processor 25-15. The UE receiver 25-05 and the UE transmitter 25-10 may be collectively called a transceiver in the embodiments of the disclosure. The transceiver may transmit or receive signals to or from a BS. The signals may include control information and data. For this, the transceiver may include an RF transmitter for up-converting the frequency of a signal to be transmitted and amplifying the signal and an RF receiver for low-noise amplifying a received signal and down-converting the frequency of the received signal. In addition, the transceiver may receive a signal on a wireless channel and output the signal to the UE processor 25-15, or transmit a signal output from the UE processor 25-15 on a wireless channel. The UE processor 25-15 may control a series of processes for the UE to be operated according to the embodiments of the disclosure. For example, the UE receiver 25-05 may receive control information from the BS in a DL, and the UE processor 25-15 may determine an HARQ ID according to the control information and accordingly, be able to prepare for transmission or reception. Subsequently, the UE transmitter 25-10 may send scheduled signals to the BS.

FIG. 26 is a block diagram of an internal configuration of a BS, according to an embodiment of the disclosure.

Referring to FIG. 26, the BS may include a BS receiver 26-05, a BS transmitter 26-10, and the BS processor 26-15. The BS receiver 26-05 and the BS transmitter 26-10 may be collectively called a transceiver in the embodiments of the disclosure. The transceiver may transmit or receive signals to or from a UE. The signals may include control information and data. For this, the transceiver may include an RF transmitter for up-converting the frequency of a signal to be transmitted and amplifying the signal and an RF receiver for low-noise amplifying a received signal and down-converting the frequency of the received signal. In addition, the transceiver may receive a signal on a wireless channel and output the signal to the BS processor 26-15, or transmit a signal output from the BS processor 26-15 on a wireless channel. The BS processor 26-15 may control a series of processes for the BS to be operated according to the embodiments of the disclosure. For example, the BS processor 25-15 may transmit DL control signal to the UE as needed, based on configuration information configured by itself. Subsequently, the BS transmitter 26-10 transmits related scheduling control information and data, and the BS receiver 26-05 receives feedback information from the UE.

Figure 27:
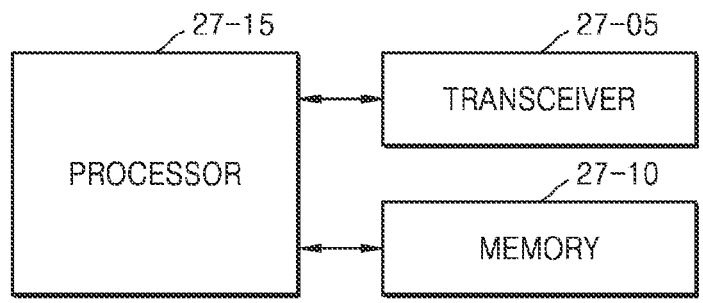
FIG. 27 is a block diagram of a UE, according to an embodiment of the disclosure.

FIG. 27 is a block diagram of a UE, according to an embodiment of the disclosure.

Referring to FIG. 27, the UE may include a transceiver 27-05, a memory 27-10, and a processor 27-15. The transceiver 27-05, the processor 27-15, and the memory 27-10 of the UE may operate according to the aforementioned communication method of the UE. Components of the UE are not, however, limited thereto. For example, the UE may include more or fewer elements than described above. In addition, the transceiver 27-05, the processor 27-15, and the memory 27-10 may be implemented in a single chip. The processor 27-15 may include one or more processors.

A receiver and a transmitter of the BS 1800 are collectively called the transceiver 27-05, which may transmit or receive signals to or from a network entity, a BS or another UE. The signals to be transmitted to or received from the network entity, the BS, or the other UE may include control information and data. For this, the transceiver 27-05 may include an RF transmitter for up-converting the frequency of a signal to be transmitted and amplifying the signal and an RF receiver for low-noise amplifying a received signal and down-converting the frequency of the received signal. It is merely an example of the transceiver 27-05, and the elements of the transceiver 27-05 are not limited to the RF transmitter and RF receiver.

In addition, the transceiver 27-05 may receive a signal on a wireless channel and output the signal to the processor 27-15, or transmit a signal output from the processor 27-15 on a wireless channel.

The memory 27-10 may store a program and data required for operation of the UE. Furthermore, the memory 27-10 may store control information or data included in a signal obtained by the UE. The memory 27-10 may include a storage medium such as a read only memory (ROM), a random access memory (RAM), a hard disk, a compact disc ROM (CD-ROM), and a digital versatile disk (DVD), or a combination of storage mediums. Alternatively, the memory 27-10 may not be separately present but integrated into the processor 27-15.

The processor 27-15 may control a series of processes for the UE to be operated according to the embodiments of the disclosure. For example, the processor 27-15 may receive control signals and data signals through the transceiver 27-05 and process the received control signals and data signals. The processor 27-15 may transmit the processed control signal and data signal through the transceiver 27-05. The processor 27-15 may also control the components of the UE so that the UE receives DCI including two layers to receive multiple PDSCHs at the same time. The processor 27-15 may be provided in the plural, which may perform operations for controlling the components of the UE by carrying out a program stored in the memory 27-10.

Figure 28:
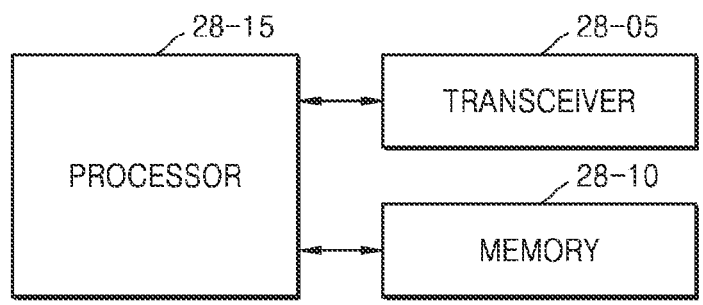
FIG. 28 is a block diagram of a BS, according to an embodiment of the disclosure.

FIG. 28 is a block diagram of a BS, according to an embodiment of the disclosure.

Referring to FIG. 28, the BS may include a transceiver 28-05, a memory 28-10, and a processor 28-15. The transceiver 28-05, the processor 28-15, and the memory 28-10 of the BS may operate according to the aforementioned communication method of the BS. Components of the BS are not, however, limited thereto. For example, the BS may include more or fewer elements than described above. In addition, the transceiver 28-05, the processor 28-15, and the memory 28-10 may be implemented in a single chip. The processor 28-15 may include one or more processors.

A receiver and a transmitter of the BS are collectively called the transceiver 28-05, which may transmit or receive signals to or from a UE or a network entity. The signals to be transmitted to or received from the UE or the network entity may include control information and data. For this, the transceiver 28-05 may include an RF transmitter for up-converting the frequency of a signal to be transmitted and amplifying the signal and an RF receiver for low-noise amplifying a received signal and down-converting the frequency of the received signal. It is merely an example of the transceiver 28-05, and the elements of the transceiver 28-05 are not limited to the RF transmitter and RF receiver.

In addition, the transceiver 28-05 may receive a signal on a wireless channel and output the signal to the processor 28-15, or transmit a signal output from the processor 28-15 on a wireless channel.

The memory 28-10 may store a program and data required for operation of the BS. Furthermore, the memory 28-10 may store control information or data included in a signal obtained by the BS. The memory 28-10 may include a storage medium such as a ROM, a RAM, a hard disk, a CD-ROM, and a DVD, or a combination of storage mediums. Alternatively, the memory 28-10 may not be separately present but integrated into the processor 28-15.

The processor 28-15 may control a series of processes for the BS to be operated according to the embodiments of the disclosure. For example, the processor 28-15 may receive control signals and data signals through the transceiver 28-05 and process the received control signals and data signals. The processor 28-15 may transmit the processed control signal and data signal through the transceiver 28-05. The processor 28-15 may configure downlink control information (DCI) including allocation information of a PDSCH and control the respective components to transmit the DCI. The processor 28-15 may be provided in the plural, which may perform operations for controlling the components of the BS by carrying out a program stored in the memory 28-10.

Several embodiments of the disclosure have been described, but a person of ordinary skill in the art will understand and appreciate that various modifications can be made without departing the scope of the disclosure. Thus, it will be apparent to those of ordinary skill in the art that the disclosure is not limited to the embodiments of the disclosure described, which have been provided only for illustrative purposes. Furthermore, the embodiments may be operated by being combined with one another if necessary. Although the embodiments of the disclosure are proposed based on an LTE system, a 5G system, etc., modifications to the embodiments of the disclosure, which do not deviate from the scope of the disclosure, may be applicable.

Methods according to the claims of the disclosure or the embodiments of the disclosure described in the specification may be implemented in hardware, software, or a combination of hardware and software.

When implemented in software, a computer-readable storage medium storing one or more programs (software modules) may be provided. The one or more programs stored in the computer-readable storage medium are configured for execution by one or more processors in an electronic device. The one or more programs may include instructions that cause the electronic device to perform the methods in accordance with the claims of the disclosure or the embodiments described in the specification.

The programs (software modules, software) may be stored in a RAM, a non-volatile memory including a flash memory, a ROM, an electrically erasable programmable ROM (EEPROM), a magnetic disc storage device, a CD-ROM, a DVD or other types of optical storage device, and/or a magnetic cassette. Alternatively, the programs may be stored in a memory including a combination of some or all of them. There may be a plurality of memories.

The program may also be stored in an attachable storage device that may be accessed over a communication network including the Internet, an intranet, a local area network (LAN), a wide LAN (WLAN), or a storage area network (SAN), or a combination thereof. The storage device may be connected to an apparatus performing the embodiments of the disclosure through an external port. In addition, a separate storage device in the communication network may be connected to the apparatus performing the embodiments of the disclosure.

In the embodiments of the disclosure, a component is represented in a singular or plural form. It should be understood, however, that the singular or plural representations are selected appropriately according to the situations presented for convenience of explanation, and the disclosure is not limited to the singular or plural form of the component. Further, the component expressed in the plural form may also imply the singular form, and vice versa.

Several embodiments of the disclosure have thus been described, but it will be understood that various modifications can be made without departing the scope of the disclosure. Thus, it will be apparent to those ordinary skilled in the art that the disclosure is not limited to the embodiments described, but can encompass not only the appended claims but the equivalents.

The invention claimed is:

1. A method performed by a first user equipment (UE) in a wireless communication system, the method comprising:
identifying a set of demodulation reference signal (DMRS) time domain patterns associated with a physical sidelink shared channel (PSSCH):
identifying a number of resource elements (REs) allocated for the PSSCH within a physical resource block (PRB) based on the set of DMRS time domain patterns;
identifying a total number of REs allocated for the PSSCH within a slot based on the number of REs allocated for the PSSCH within the PRB and a number of PRBs allocated for the PSSCH;
identifying a size of a transport block based on the total number of REs; and
transmitting, to a second UE, sidelink control information (SCI) via a physical sidelink control channel (PSCCH) and the transport block via the PSSCH based on the size of the transport block,
wherein a DMRS time domain pattern for the PSSCH corresponds to positions of DMRS symbols associated with the PSSCH,
wherein the positions of the DMRS symbols associated with the PSSCH are given according to a number of symbols for the PSSCH and a number of symbols for the PSCCH, and
wherein the SCI indicates the DMRS time domain pattern for the PSSCH.

2. The method of claim 1, wherein the number of REs allocated for the PSSCH within the PRB is identified based on a number of sidelink symbols for transmitting the PSSCH within the slot.

3. The method of claim 2, wherein the number of sidelink symbols for transmitting the PSSCH within the slot corresponds to a number of symbols except a first symbol and a last symbol within the slot.

4. The method of claim 1, wherein the identifying of the number of REs allocated for the PSSCH within the PRB comprises:
determining whether the slot includes REs corresponding to a resource configured for a physical sidelink feedback channel (PSFCH); and
identifying the number of REs allocated for the PSSCH within the PRB based on the REs corresponding to the resource configured for the PSFCH.

5. A method performed by a second user equipment (UE) in a wireless communication system, the method comprising:
receiving, from a first UE, sidelink control information (SCI) via a physical sidelink control channel (PSCCH);
identifying a number of resource elements (REs) allocated for the PSSCH within a physical resource block (PRB) based on a set of demodulation reference signal (DMRS) time domain patterns associated with a physical sidelink shared channel (PSSCH);
identifying a total number of REs allocated for the PSSCH within a slot based on the number of REs allocated for the PSSCH within the PRB and a number of PRBs allocated for the PSSCH;
identifying a size of a transport block based on the total number of REs; and
receiving, from the first UE, the transport block via the PSSCH based on the size of the transport block,
wherein a DMRS time domain pattern for the PSSCH corresponds to positions of DMRS symbols associated with the PSSCH,
wherein the positions of the DMRS symbols associated with the PSSCH are given according to a number of symbols for the PSSCH and a number of symbols for the PSCCH, and
wherein the SCI indicates the DMRS time domain pattern for the PSSCH.

6. The method of claim 5, wherein the number of REs allocated for the PSSCH within the PRB is identified based on a number of sidelink symbols for receiving the PSSCH within the slot.

7. The method of claim 6, wherein the number of sidelink symbols for receiving the PSSCH within the slot corresponds to a number of symbols except a first symbol and a last symbol within the slot.

8. The method of claim 5, wherein the identifying of the number of REs allocated for the PSSCH within the PRB comprises:
determining whether the slot includes REs corresponding to a resource configured for a physical sidelink feedback channel (PSFCH); and
identifying the number of REs allocated for the PSSCH within the PRB based on the REs corresponding to the resource configured for the PSFCH.

9. A first user equipment (UE) in a wireless communication system, the first UE comprising:
a transceiver; and
at least one processor coupled with the transceiver,
wherein the at least one processor is configured to:
identify a set of demodulation reference signal (DMRS) time domain patterns associated with a physical sidelink shared channel (PSSCH),
identify a number of resource elements (REs) allocated for the PSSCH within a physical resource block (PRB) based on the set of DMRS time domain patterns,
identify a total number of REs allocated for the PSSCH within a slot based on the number of REs allocated for the PSSCH within the PRB and a number of PRBs allocated for the PSSCH,
identify a size of a transport block based on the total number of REs, and
control the transceiver to transmit, to a second UE, sidelink control information (SCI) via a physical sidelink control channel (PSCCH) and the transport block via the PSSCH based on the size of the transport block,
wherein a DMRS time domain pattern for the PSSCH corresponds to positions of DMRS symbols associated with the PSSCH,
wherein the positions of the DMRS symbols associated with the PSSCH are given according to a number of symbols for the PSSCH and a number of symbols for the PSCCH, and
wherein the SCI indicates the DMRS time domain pattern for the PSSCH.

10. The first UE of claim 9, wherein the at least one processor is configured to identify the number of REs allocated for the PSSCH within the PRB based on a number of sidelink symbols for transmitting the PSSCH within the slot.

11. The first UE of claim 10, wherein the number of sidelink symbols for transmitting the PSSCH within the slot corresponds to a number of symbols except a first symbol and a last symbol within the slot.

12. The first UE of claim 9, wherein the at least one processor is further configured to:
determine whether the slot includes REs corresponding to a resource configured for a physical sidelink feedback channel (PSFCH), and
identify the number of REs allocated for the PSSCH within the PRB based on the REs corresponding to the resource configured for the PSFCH.

13. A second user equipment (UE) in a wireless communication system, the second UE comprising:
a transceiver; and
at least one processor coupled with the transceiver,
wherein the at least one processor is configured to:
control the transceiver to receive, from a first UE, sidelink control information (SCI) via a physical sidelink control channel (PSCCH),
identify a number of resource elements (REs) allocated for the PSSCH within a physical resource block (PRB) based on a set of demodulation reference signal (DMRS) time domain patterns associated with a physical sidelink shared channel (PSSCH),
identify a total number of REs allocated for the PSSCH within a slot based on the number of REs allocated for the PSSCH within the PRB and a number of PRBs allocated for the PSSCH,
identify a size of a transport block based on the total number of REs, and
control the transceiver to receive, from the first UE, the transport block via the PSSCH based on the size of the transport block,
wherein a DMRS time domain pattern for the PSSCH corresponds to positions of DMRS symbols associated with the PSSCH,
wherein the positions of the DMRS symbols associated with the PSSCH are given according to a number of symbols for the PSSCH and a number of symbols for the PSCCH, and
wherein the SCI indicates the DMRS time domain pattern for the PSSCH.

14. The second UE of claim 13, wherein the at least one processor is configured to identify the number of REs allocated for the PSSCH within the PRB based on a number of sidelink symbols for receiving the PSSCH within the slot.

15. The second UE of claim 13, wherein the at least one processor is further configured to:
determine whether the slot includes REs corresponding to a resource configured for a physical sidelink feedback channel (PSFCH), and
identify the number of REs allocated for the PSSCH within the PRB based on the REs corresponding to the resource configured for the PSFCH.

16. The second UE of claim 14, wherein the number of sidelink symbols for receiving the PSSCH within the slot corresponds to a number of symbols except a first symbol and a last symbol within the slot.

* * * * *